United States Patent [19]
Fukushima

[11] Patent Number: 5,459,587
[45] Date of Patent: Oct. 17, 1995

[54] PROCESSING APPARATUS CAPABLE OF DISCRIMINATING BETWEEN PSEUDO HALF-TONE/NON-HALF-TONE IMAGE DATA BASED UPON THE NUMBER OF ADJACENCIES OF SIMILAR TYPE OF PIXELS WITHIN A BLOCK

[75] Inventor: Shigenobu Fukushima, Yokohama, Japan

[73] Assignee: Minolta Camera Kabushiki Kaisha, Osaka, Japan

[21] Appl. No.: 253,213

[22] Filed: Jun. 2, 1994

Related U.S. Application Data

[63] Continuation of Ser. No. 878,419, May 4, 1992, abandoned.

[30] Foreign Application Priority Data

| May 2, 1991 | [JP] | Japan | 3-100961 |
| May 2, 1991 | [JP] | Japan | 3-100992 |
| May 2, 1991 | [JP] | Japan | 3-100996 |
| May 2, 1991 | [JP] | Japan | 3-101003 |
| May 2, 1991 | [JP] | Japan | 3-101020 |
| May 2, 1991 | [JP] | Japan | 3-101023 |

[51] Int. Cl.$^6$ .............................. G06K 9/00; H04N 1/40
[52] U.S. Cl. ........................ 358/462; 358/456; 382/270
[58] Field of Search ...................... 358/462, 455, 358/456, 457, 447, 467; 382/50, 51, 54; H04N 1/40

[56] References Cited

U.S. PATENT DOCUMENTS

| 4,903,316 | 2/1990 | Hongo et al. | 382/52 |
| 5,016,118 | 5/1991 | Nannichi | 358/462 |
| 5,018,024 | 5/1991 | Tanioka | 358/457 |
| 5,182,778 | 1/1993 | Rudak et al. | 382/54 |
| 5,202,936 | 4/1993 | Kobiyama | 382/54 |

FOREIGN PATENT DOCUMENTS

| 58-75372 | 5/1983 | Japan | H04N 1/40 |
| 62-107573 | 5/1987 | Japan | H04N 1/40 |
| 62-114377 | 5/1987 | Japan | H04N 1/40 |
| 62-114378 | 5/1987 | Japan | H04N 1/40 |
| 63-11832 | 3/1988 | Japan | H04N 1/40 |
| 2-165775 | 6/1990 | Japan | H04N 1/40 |
| 3-157060 | 7/1991 | Japan | H04N 1/40 |
| 2170373 | 7/1986 | United Kingdom | H04N 1/40 |

OTHER PUBLICATIONS

Yoshinobu Mita et al., "Igher Fine Multi-Value Recovery of Binary Image by Neural Network", Japan Hard Copy, '90, NIP-24, pp. 233–236, 1990.

*Primary Examiner*—James J. Groody
*Assistant Examiner*—Cheryl Cohen
*Attorney, Agent, or Firm*—Burns, Doane, Swecker & Mathis

[57] ABSTRACT

In an image processing apparatus for processing inputted binary image data including a first area in which data are binarized by a pseudo half-tone binarizing method and a second area in which data are binarized using a predetermined threshold value by a non-half-tone binarizing method, there is calculated a number of adjacencies representing an adjacency state of the same kind of pixels located within a block area composed of a plurality of pixels including a specified pixel to be processed. Further, there is judged whether each pixel of the inputted binary image data is included in the first area or the second area, based on the calculated number of adjacencies.

14 Claims, 48 Drawing Sheets

5 x 5 Black pixel counting circuit 203

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   |   |   |   |   |   |   |   |
| 3 |   |   |   |   | -1 |   |   |   |   |
| 4 |   |   |   | -1 | 4 | -1 |   |   |   |
| 5 |   |   |   |   | -1 |   |   |   |   |
| 6 |   |   |   |   |   |   |   |   |   |
| 7 |   |   |   |   |   |   |   |   |   |
| 8 |   |   |   |   |   |   |   |   |   |

Fig. 38

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   | -1 | -1 | -1 | -1 | -1 |   |   |
| 3 |   |   | -1 | Ee | Ee | Ee | -1 |   |   |
| 4 |   |   | -1 | Ee | Ee | Ee | -1 |   |   |
| 5 |   |   | -1 | Ee | Ee | Ee | -1 |   |   |
| 6 |   |   | -1 | -1 | -1 | -1 | -1 |   |   |
| 7 |   |   |   |   |   |   |   |   |   |
| 8 |   |   |   |   |   |   |   |   |   |

Fig. 39(a)
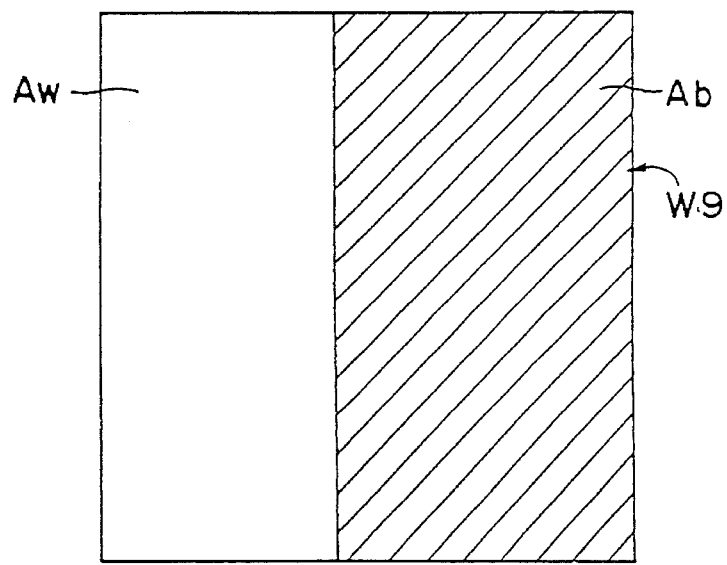
Fig. 39(b)
Fig. 39(c)
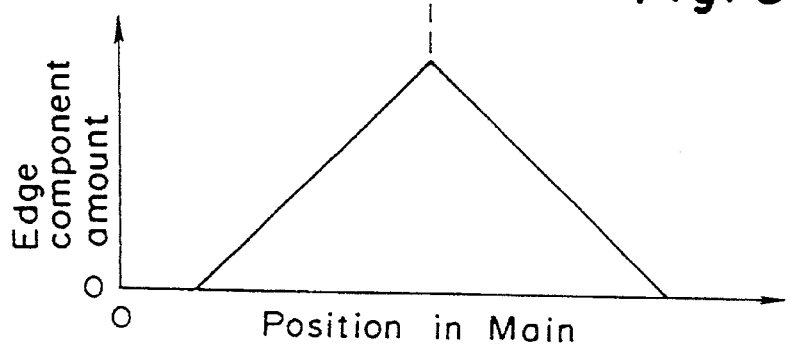

Fig. 40

|   | 0 | 1 | 2 | 3 | 4 | 5 | 6 | 7 | 8 |
|---|---|---|---|---|---|---|---|---|---|
| 0 |   | -1 | -1 | -1 | -1 | -1 | -1 | -1 |   |
| 1 |   | -1 | -1 | -1 | -1 | -1 | -1 | -1 |   |
| 2 |   | -1 | -1 | -1 | -1 | -1 | -1 | -1 |   |
| 3 |   | 1 | 1 | 1 | 1 | 1 | 1 | 1 |   |
| 4 |   | 1 | 1 | 1 | 1 | 1 | 1 | 1 |   |
| 5 |   | 1 | 1 | 1 | 1 | 1 | 1 | 1 |   |
| 6 |   |   |   |   |   |   |   |   |   |
| 7 |   |   |   |   |   |   |   |   |   |
| 8 |   |   |   |   |   |   |   |   |   | rows 0–2: W37a; rows 3–5: W37

Fig. 41

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   |   |   |   |   |   |   |   |
| 3 |   | 1 | 1 | 1 | 1 | 1 | 1 | 1 |   |
| 4 |   | 1 | 1 | 1 | 1 | 1 | 1 | 1 |   |
| 5 |   | 1 | 1 | 1 | 1 | 1 | 1 | 1 |   |
| 6 |   | -1 | -1 | -1 | -1 | -1 | -1 | -1 |   |
| 7 |   | -1 | -1 | -1 | -1 | -1 | -1 | -1 |   |
| 8 |   | -1 | -1 | -1 | -1 | -1 | -1 | -1 |   | rows 3–5: W37; rows 6–8: W37b

Fig. 42

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 | -1| -1| -1| 1 | 1 | 1 |   |   |   |
| 2 | -1| -1| -1| 1 | 1 | 1 |   |   |   |
| 3 | -1| -1| -1| 1 | 1 | 1 |   |   |   |
| 4 | -1| -1| -1| 1 | 1 | 1 |   |   |   |
| 5 | -1| -1| -1| 1 | 1 | 1 |   |   |   |
| 6 | -1| -1| -1| 1 | 1 | 1 |   |   |   |
| 7 | -1| -1| -1| 1 | 1 | 1 |   |   |   |
| 8 |   |   |   |   |   |   |   |   |   |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   | 1 | 1 | 1 | -1| -1| -1|
| 2 |   |   |   | 1 | 1 | 1 | -1| -1| -1|
| 3 |   |   |   | 1 | 1 | 1 | -1| -1| -1|
| 4 |   |   |   | 1 | 1 | 1 | -1| -1| -1|
| 5 |   |   |   | 1 | 1 | 1 | -1| -1| -1|
| 6 |   |   |   | 1 | 1 | 1 | -1| -1| -1|
| 7 |   |   |   | 1 | 1 | 1 | -1| -1| -1|
| 8 |   |   |   |   |   |   |   |   |   |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   |   |   |   |   |   |   |   |
| 3 |   | -1 | -1 | -1 | -1 | -1 | -1 | -1 |   |
| 4 |   | 1 | 1 | 1 | 1 | 1 | 1 | 1 |   |
| 5 |   |   |   |   |   |   |   |   |   |
| 6 |   |   |   |   |   |   |   |   |   |
| 7 |   |   |   |   |   |   |   |   |   |
| 8 |   |   |   |   |   |   |   |   |   |

Row 3 ← W17a
Row 4 ← W17

Fig. 47

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   |   |   |   |   |   |   |   |
| 3 |   |   |   |   |   |   |   |   |   |
| 4 |   | 1 | 1 | 1 | 1 | 1 | 1 | 1 |   |
| 5 |   | -1 | -1 | -1 | -1 | -1 | -1 | -1 |   |
| 6 |   |   |   |   |   |   |   |   |   |
| 7 |   |   |   |   |   |   |   |   |   |
| 8 |   |   |   |   |   |   |   |   |   |

Row 4 ← W17
Row 5 ← W17b

Fig. 48

|   | 0 | 1 | 2 | 3 | 4 | 5 | 6 | 7 | 8 |
|---|---|---|---|---|---|---|---|---|---|
| 0 |   | -1 | -1 | -1 | -1 | -1 | -1 | -1 | ⎫ |
| 1 |   | -1 | -1 | -1 | -1 | -1 | -1 | -1 | ⎬ W47a |
| 2 |   | -1 | -1 | -1 | -1 | -1 | -1 | -1 | ⎥ |
| 3 |   | -1 | -1 | -1 | -1 | -1 | -1 | -1 | ⎭ |
| 4 |   | 1 | 1 | 1 | 1 | 1 | 1 | 1 | ⎫ |
| 5 |   | 1 | 1 | 1 | 1 | 1 | 1 | 1 | ⎬ W47 |
| 6 |   | 1 | 1 | 1 | 1 | 1 | 1 | 1 | ⎥ |
| 7 |   | 1 | 1 | 1 | 1 | 1 | 1 | 1 | ⎭ |
| 8 |   |   |   |   |   |   |   |   |   |

Fig. 49

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   | 1 | 1 | 1 | 1 | -1 | -1 | -1 | -1 |
| 2 |   | 1 | 1 | 1 | 1 | -1 | -1 | -1 | -1 |
| 3 |   | 1 | 1 | 1 | 1 | -1 | -1 | -1 | -1 |
| 4 |   | 1 | 1 | 1 | 1 | -1 | -1 | -1 | -1 |
| 5 |   | 1 | 1 | 1 | 1 | -1 | -1 | -1 | -1 |
| 6 |   | 1 | 1 | 1 | 1 | -1 | -1 | -1 | -1 |
| 7 |   | 1 | 1 | 1 | 1 | -1 | -1 | -1 | -1 |
| 8 |   | W74 |   |   |   | W74a |   |   |   |

Fig. 50

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 | -1 | -1 | -1 | 1 | 1 | 1 |   |   |   |
| 2 | -1 | -1 | -1 | 1 | 1 | 1 |   |   |   |
| 3 | -1 | -1 | -1 | 1 | 1 | 1 |   |   |   |
| 4 | -1 | -1 | -1 | 1 | 1 | 1 |   |   |   |
| 5 | -1 | -1 | -1 | 1 | 1 | 1 |   |   |   |
| 6 | -1 | -1 | -1 | 1 | 1 | 1 |   |   |   |
| 7 | -1 | -1 | -1 | 1 | 1 | 1 |   |   |   |
| 8 |   |   |   |   |   |   |   |   |   |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   | 1 | 1 | 1 | -1 | -1 | -1 |
| 2 |   |   |   | 1 | 1 | 1 | -1 | -1 | -1 |
| 3 |   |   |   | 1 | 1 | 1 | -1 | -1 | -1 |
| 4 |   |   |   | 1 | 1 | 1 | -1 | -1 | -1 |
| 5 |   |   |   | 1 | 1 | 1 | -1 | -1 | -1 |
| 6 |   |   |   | 1 | 1 | 1 | -1 | -1 | -1 |
| 7 |   |   |   | 1 | 1 | 1 | -1 | -1 | -1 |
| 8 |   |   |   |   |   |   |   |   |   |

W73   W73b

Non-half-tone image
W7

Half-tone image
W7

Stright line in oblique direction

Broken line

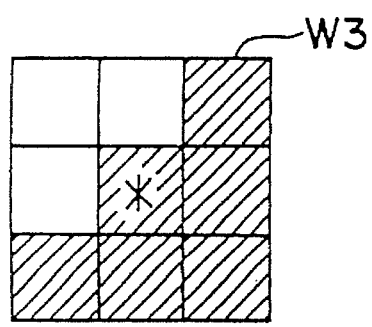
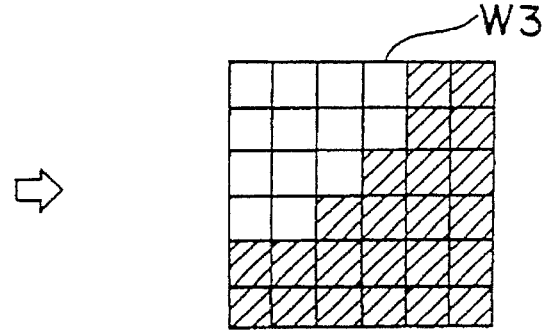
Fig. 67(a)     Fig. 67(b)
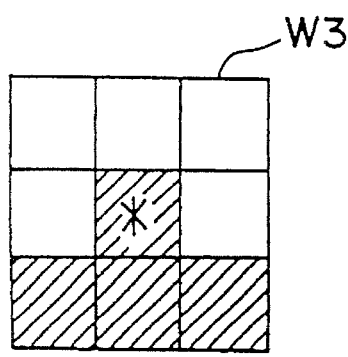
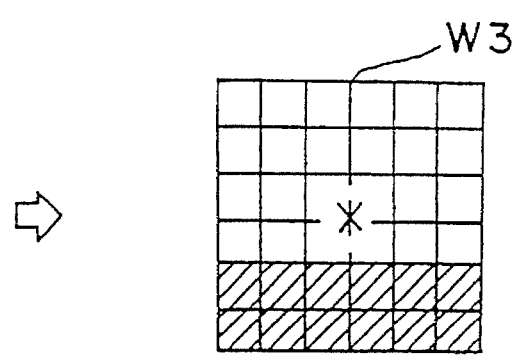
Fig. 68(a)     Fig. 68(b)

Fig. 69(a)
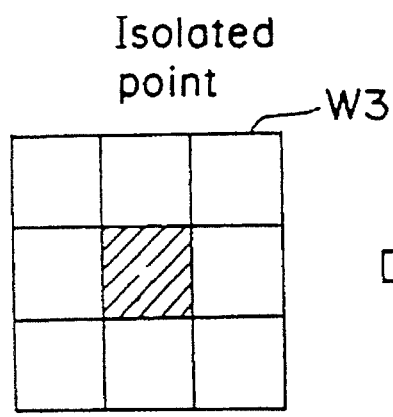
Fig. 69(b)
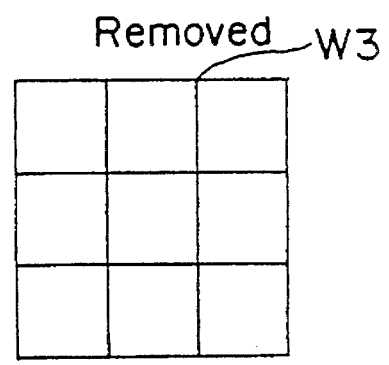
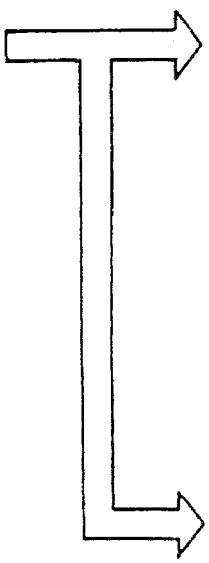
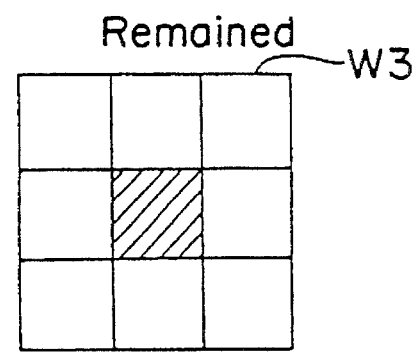
Fig. 69(c)

PROCESSING APPARATUS CAPABLE OF DISCRIMINATING BETWEEN PSEUDO HALF-TONE/NON-HALF-TONE IMAGE DATA BASED UPON THE NUMBER OF ADJACENCIES OF SIMILAR TYPE OF PIXELS WITHIN A BLOCK

This application is a continuation of application Ser. No. 07/878,419 filed May 4, 1992, now abandoned.

BACKGROUND OF THE INVENTION

1. Field of the Invention

The present invention relates to an image processing apparatus, and more particularly, to an image processing apparatus comprising means for judging whether each pixel of image data is included in a first area of pseudo half-tone image or a second area of non-half-tone image.

2. Description of Related Art

In a conventional facsimile apparatus, in order to transmit an image signal through a public telephone line, a transmitter converts image data of non-half-tone images such as characters into binary image data of non-half-tone image by binarizing them using a predetermined threshold value and then transmits the converted binary image data to a receiver of the other party. The transmitter converts multi-value image data of half-tone-images into binary image data of pseudo half-tone image by binarizing them using a dither method and then transmits the converted binary image data to the receiver of the other party. It is to be noted that multi-value image data means image data of multi-gradation stages in the specification. On the other hand, the receiver of the other party performs different processes depending on the kind of the image of the received image data such as non-half-tone image, pseudo half-tone image or the like. Namely, it is necessary for the receiver to perform the following processes:

(a) a process for extracting each kind of binary image data;

(b) a process for switching over the method for converting the pixel density thereof; and (c) a process for switching over the decoding method such as the method for compressing image data or the like.

Therefore, it is necessary to automatically judge whether or not the received image data are binary image data of non-half-tone image or binary image data of pseudo half-tone image. There is disclosed in the Japanese Patent examined publication No. 63-11832, a method for judging the kind of the received image data and generating an image area signal having the judgment result (referred to as a first conventional method hereinafter). The first conventional method is provided for judging whether or not respective pixels of an image signal having both a dot photograph area and a document area of characters are included in the dot photograph area or the document area, and for generating an image area signal for representing the judged image area. Namely, the first conventional method includes the following steps:

(a) setting a mask for surrounding a plurality of pixels including a specified pixel;

(b) taking out a pixel pattern formed based on values of a plurality of pixels within the mask;

(c) generating an image-area signal corresponding to the above-mentioned pixel pattern according to a table of image area signals on the pixel patterns previously stored in a storage-unit dividing all the pixel patterns which may be caused into the dot photograph area and the document area; and (d) outputting the generated image area signal as the image area signal corresponding to the specified pixel. Concretely, the respective pixel patterns are previously stored in a table ROM by dividing the pixel pattern into the dot photograph area and the document area, and when an image signal to be processed is inputted to an address terminal of the table ROM, resulting in the image area signal in the data terminal of the table ROM.

Further, there is suggested in Yoshinobu MITA et al, "Higher fine multi-value recovery of binary image by Neural Network", Japan Hard copy, '90, NIP-24 pp 233–236, 1990, an apparatus for automatically judging whether or not inputted binary image data are binary image data of non-half-tone image or binary image data of-pseudo half-tone image (referred to as a second conventional apparatus hereinafter). In the second conventional apparatus, by using a back propagation method for Neural Network, there is performed not only a process for converting inputted binary image data into multi-value image data using a Neural Network but also a process for dividing inputted binary image data into predetermined kinds of image area and for converting them into multi-value image data depending on the divided image area using the Neural Network. The Neural Network of the second conventional apparatus has a three-layer structure comprising an input layer, an intermediate layer and an output layer. In the input layer, there are provided a number of units corresponding to a number of pixels included in a window provided close to a specified pixel, and there is provided in the output layer one unit for outputting multi-value image data.

However, in the first conventional method, since there is provided the pixel pattern table ROM for judging image areas, as the area to be judged for area judgment increases, the manufacturing cost thereof increases. Further, in the second conventional apparatus, the composition of the apparatus is complicated, and the processing speed is extremely low.

Further, when an image including a broken line is binarized, the binarized image becomes similar to a half-tone image. Therefore, there is a possibility of erroneously judging the image areas in the conventional method and apparatus.

Furthermore, in a conventional facsimile apparatus, in order to transmit an image signal through a public telephone line, a transmitter converts a half-tone image such as a photograph image or the like into binary image data of pseudo half-tone image by binarizing them using a dither method or the like, and then, transmits the converted image data to a receiver of the other party. On the other hand, the receiver recovers multi-value image data from the received binary image data of pseudo half-tone.

Further, recently, there has been put into practice a color laser printer for recording an image of multi-value image data at a high speed and with a high resolution, however, there have been widely used binary printers for recording binary image data, generally. In order to store multi-value image data in a storage unit, it is necessary to provide the storage unit having a relatively large capacity.

In order to solve the above problem, the following method is suggested. Namely, the multi-value image data are converted into binary image data, and then, the converted binary image data are stored in the storage unit. Furthermore, upon processing the binary image data or recording the binary image data, after reading out the above binary image data from the storage unit, multi-value image data are recovered from the read binary image data.

The method and apparatus of this type are disclosed in the Japanese patent laid-open publications Nos. 62-114378 and 62-107573.

The image processing method disclosed in the former publication (referred to as a third conventional method hereinafter) includes the following steps, in order to make a multi-value printer give full scope to its unit performance by printing out an image using the multi-value printer even in response to binary image data, or in order to improve the quality of recovered character image:

(a) recovering a half-tone image from the inputted binary image data; and (b) performing predetermined processes such as a magnification and reduction process, an image emphasis process or the like for the recovered half-tone image. In the third conventional method, in order to recover multi-value image data from binary image data, a window in a square shape having a predetermined size is provided close to a specified pixel to be recovered, and then, a smoothing process is performed for the inputted image data within the provided window.

Further, the image processing apparatus disclosed in the latter publication (referred to as a fourth conventional apparatus hereinafter) comprises the following means, in order to prevent the quality of image from deteriorating in the case of using a binarizing circuit having a simple structure using a dither method or the like, and also in order to constitute the image processing apparatus with simple circuits:

(a) dividing means for dividing binarized image information into predetermined blocks;

(b) judging means for judging the image tone by each block; and (c) converting means for converting the binarized image information within the block into multi-value image data according to the judgment result thereof. In the fourth conventional apparatus, upon transmitting image data and storing them, there are used binary image data so as to display and edit them more efficiently. Further, upon reproducing the image, there is used a multi-value representation close to an analogue image. Concretely, the judgment means is constituted by an image judgment table ROM for judging the image tone using a pattern matching method within each block corresponding to a size of a dither matrix, and the converting means is constituted by a conversion ROM.

However, in the third conventional method, when setting a larger window, a shaded-off portion may be reproduced in the reproduced image. On the other hand, when setting a smaller window, a so-called Moiré may be caused, resulting in deterioration of the reproductivity of the image.

Further, in the fourth conventional apparatus, since the image tone is judged by each block corresponding to the size of the dither matrix, the image tone can not be judged when the dither matrix of the binarizing circuit is not known, and also the image tone can not be judged when the image data to be judged are binarized using the other pseudo half-tone binarizing method. Furthermore, since the image tone is judged using the above-mentioned ROM, as the size of the dither matrix increases, the capacity of the ROM increases accompanying this, and then, it is necessary to provide a ROM having a relatively large capacity.

Furthermore, there is disclosed in the Japanese Patent laid-open publication No. 62-114377, an image processing method for converting binary image data of pseudo half-tone image into multi-value image data (referred to as a fifth conventional method hereinafter). In this publication, the following three methods are suggested.

(1) After dividing binary image data into respective blocks, a number of black pixels within each block is counted, a density level of each block is presumed based on the number of black pixels, and then, multi-value image data are recovered based on the presumed density level thereof.

(2) After dividing binary image data into respective unit areas, a number of black pixels within each unit area is counted, and there is obtained the dispersion of the number of black pixels within a predetermined block area composed of not only a specified unit area but also a predetermined number of unit areas adjacent to the specified unit area. Then, when the dispersion thereof is relatively small, an arrangement of black pixels is obtained using a density matrix pattern having a relatively larger size, and then, multi-value image data are recovered based on the arrangement of black pixels. On the other hand, when the dispersion thereof is relatively large, an arrangement of black pixels is obtained using a density matrix pattern having a relatively small size, and then, multi-value image data are recovered based on the arrangement of black pixels.

(3) There is prepared a scanning opening having a size of N×N pixels for binary image data, a number of black pixels within each scanning opening is counted shifting the scanning opening by one pixel. Thereafter, the counted number of black pixels is set as a density level, sequentially, and then, multi-value image data are recovered based on the set density level. This method corresponds to a convolution process for binary image data using a spatial filter comprising all the pixels of one or black within a 4×4 window.

Further, in the above-mentioned publication of the fifth conventional method, simultaneously when performing (3) the convolution process, an image emphasis process is performed using a Laplacian filter shown in FIG. 33.

Furthermore, there has been known to those skilled in the art, a conventional method for multi-value image data corresponding to the original image data based on a smoothed value and an edge emphasis value (referred to as a sixth conventional method hereinafter). Namely, a smoothing process is performed for binary image data within the window as described in the above-mentioned process (1) so as to calculate a smoothed value therefor. On the other hand, after calculating the edge emphasis amount within the window, multi-value image data corresponding to the original image data are recovered based on the calculated smoothed value and the edge emphasis value.

However, in the fifth conventional method, upon recovering multi-value image data having, for example, a natural number N or more of gradation stages, it is necessary to recover multi-value image data based on a natural number N or more of pixels. Further, when a recovery process is performed using a window having one side of length larger than an interval of the period of the original binary image data of pseudo half-tone image, a texture of the pseudo half-tone image may influence the recovered image. In order to solve the above-mentioned problems, it is necessary to use a relatively large window, and then, a circuit for counting the number of black pixels within the window becomes large-sized. Further, when there is an edge portion within the above-mentioned window, the edge portion is smoothed by the smoothing process of the fifth conventional method, so that the original image data may not be often recovered.

As described above, the edge emphasis amount used in the edge emphasis process and the edge judgment amount used upon judging whether or not there is an edge portion can be calculated based on an edge component amount or a relative amount of the edge component which is detected using the Laplacian filter shown in FIG. 33. However, when using the above-mentioned Laplacian filter, a high frequency component amount can not be accurately detected based on an image having a period of (7×2) dots, namely, the high frequency components of the edge portion are lowered. Further, since the direction of the edge component can not be detected, the edge component amount having taken the direction thereof into consideration can not be detected. In this case, an image which is not the edge portion may be erroneously detected as an edge portion, or any edge portion may not be detected within an image including an edge portion. Therefore, when recovering multi-value image data based on the edge component amount calculated by the above-mentioned Laplacian filter using the sixth conventional method, multi-value image data corresponding to the original image data can not be recovered.

SUMMARY

An object of the present invention is therefore to provide an image processing apparatus having a structure simpler than that of the conventional apparatus, capable of more accurately judging in a higher speed whether inputted image data are included in an area of binary image data binarized by a pseudo half-tone binarizing method or in an area of binary image data binarized by a non-half-tone binarizing method.

Another object of the present invention is to provide an image processing apparatus capable of obtaining a quality of image higher than that of the conventional apparatus without reproducing any shaded-off portion in a non-half-tone image area when recovering multi-value image data from inputted binary image data including not only binary image data binarized by a pseudo half-tone binarizing method but also binary image data binarized by a non-half-tone binarizing method using a predetermined threshold value.

A further object of the present invention is to provide an image processing apparatus capable of recovering multi-value image data from binary image data binarized by various kinds of pseudo half-tone binarizing methods.

A still further object of the present invention is to provide an image processing apparatus capable of detecting an edge component amount included in binary image data of pseudo half-tone image using a simpler circuit, more accurately as compared with the conventional apparatuses, and recovering multi-value image data corresponding to an original image data based on the detected edge component amount.

In order to achieve the aforementioned objective, according to one aspect of the present invention, an image processing apparatus for processing inputted binary image data including a first area in which data are binarized by a pseudo half-tone binarizing method and a second area in which data are binarized using a predetermined threshold value by a non-half-tone binarizing method, comprising:

calculation means for calculating a number of adjacencies representing an adjacency state of the same kind of pixels located within a block area comprised of a plurality of pixels including a specified pixel to be processed; and judgment means for judging whether each pixel of said inputted binary image data is included in said first area or said second area, based on the number of adjacencies calculated by said calculation means.

According to another aspect of the present invention, there is provided an image processing apparatus for processing inputted binary image data including a first area in which data are binarized by a pseudo half-tone binarizing method and a second area in which data are binarized using a predetermined threshold value by a non-half-tone binarizing method, comprising:

judgment means for judging whether each pixel of inputted binary image data is included in said first area or said second area, based on said inputted image data; and recovery means for recovering image data of multi-gradation stages from said inputted binary image data when it is judged by said judgment means that said specified pixel is included in said first area, and for outputting said inputted binary image data without recovering them when it is judged by said judgment means that said specified pixel is included in said second area.

According to a further aspect of the present invention, there is provided an image processing apparatus comprising:

smoothing means for calculating a multi-value smoothed component amount from binary image data located within a first block area including a specified pixel to be processed, based on inputted binary image data of pixels composed of white pixels and black pixels;

calculating means for calculating an edge component amount for said specified pixel based on said binary image data located within second and third block areas including a plurality of pixels located in the periphery of said specified pixel; and recovery means for recovering multi-value image data from said inputted binary image data based on said smoothed component amount calculated by said smoothing means and said edge component amount calculated by said calculation means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 31 is a front view showing a spatial filter having a 5×5 window;

FIG. 32 is a front view showing a spatial filter having a 7×7 window;

FIG. 33 is a front view showing one example of a Laplacian filter for an edge emphasis process;

FIG. 38 is a front view showing one preferred embodiment of an edge emphasis filter;

FIG. 39 is a front view of an image for which an edge emphasis process is performed, a front view of an edge emphasis filter, and a graph of an edge component amount of the edge emphasis process;

FIG. 40 is a front view showing a first spatial filter used in calculating an edge emphasis amount in the present preferred embodiment;

FIG. 41 is a front view showing a second spatial filter used in calculating an edge emphasis amount in the present preferred embodiment;

FIG. 42 is a front view showing a third spatial filter used in calculating an edge emphasis amount in the present preferred embodiment;

FIG. 43 is a front view showing a fourth spatial filter used in calculating an edge emphasis amount in the present preferred embodiment;

FIG. 44 is a front view showing a fifth spatial filter used in calculating an edge emphasis amount in the present preferred embodiment;

FIG. 45 is a front view showing a sixth spatial filter used in calculating an edge emphasis amount in the present preferred embodiment;

FIG. 46 is a front view showing a seventh spatial filter used in calculating an edge emphasis amount in the present preferred embodiment;

FIG. 47 is a front view showing an eighth spatial filter used in calculating an edge emphasis amount in the present preferred embodiment;

FIG. 48 is a front view showing a ninth spatial filter used in calculating an edge judgment amount in the present preferred embodiment;

FIG. 49 is a front view showing a tenth spatial filter used in calculating an edge judgment amount in the present preferred embodiment;

FIG. 50 is a front view showing a first spatial filter of a modification used in calculating an edge judgment amount;

FIG. 51 is a front view showing a second spatial filter of a modification used in calculating an edge judgment amount;

FIG. 67 is a front view of one examples of images prior to a smoothing process and after the smoothing process which is performed upon a pixel density conversion process with a magnification ratio of two in both the main scan and subscan directions;

FIG. 68 is a front view of the other examples of images prior to a smoothing process and after the smoothing process which is performed upon a pixel density conversion process with a magnification ratio of two in both the main scan and subscan directions; and FIG. 69 is a front view showing one example of images prior to an isolated point process and after the isolated point process which is performed depending on the presence and non-presence of a broken line detection signal in an interpolation and-smoothing processor and a smoothing processor of the preferred embodiment.

DETAILED DESCRIPTION OF THE PREFERRED EMBODIMENTS

Figure 2:
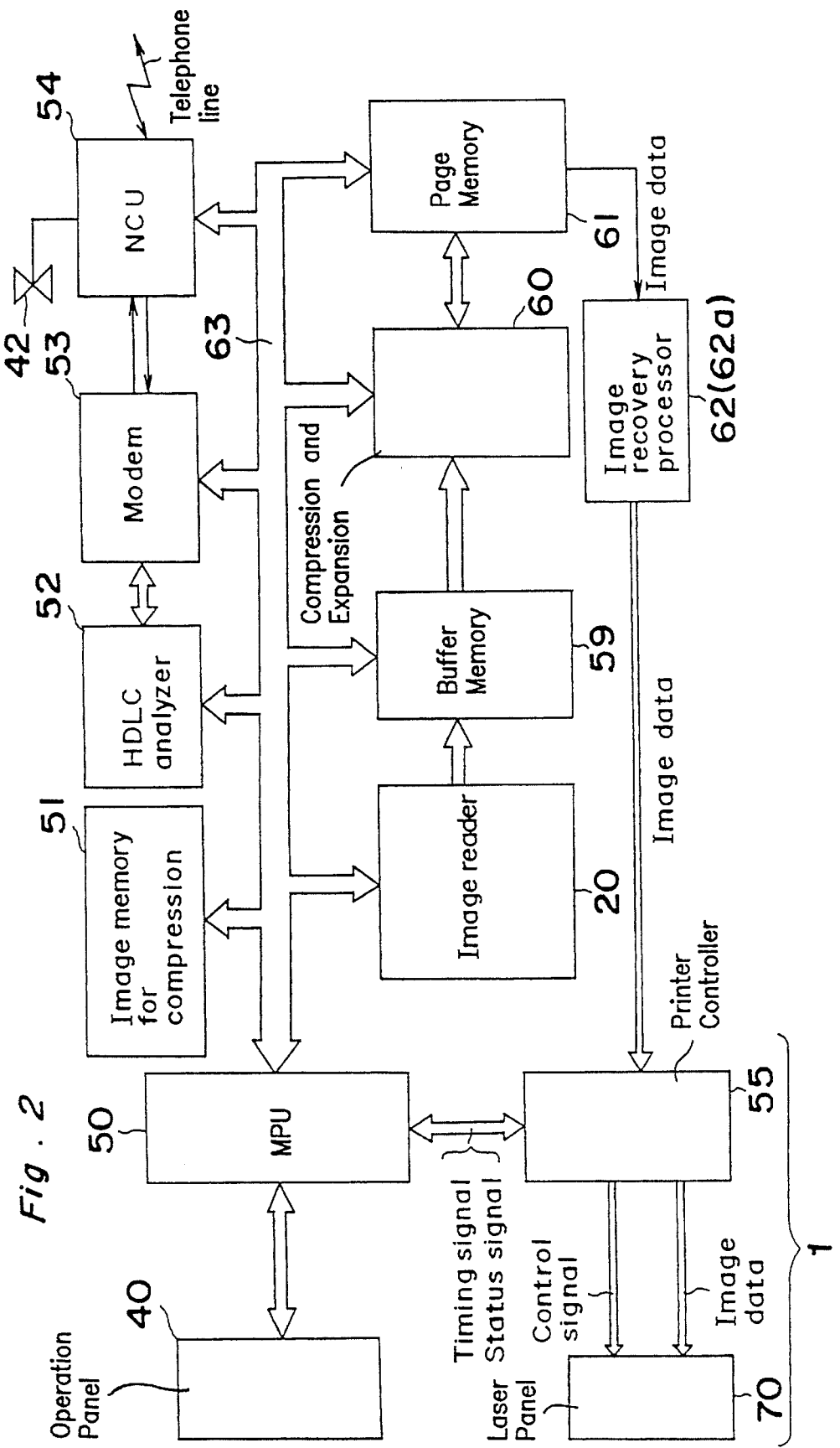
FIG. 2 is a schematic block diagram showing a signal processing section of the facsimile apparatus shown in FIG. 1.

Facsimile apparatuses of the first and second preferred embodiments according to the present invention will be described below with reference to the attached drawings. Each of the facsimile apparatuses of the first and second preferred embodiments comprises an image recovery processor 62 or 62a for recovering multi-value image data from received binary image data, as shown in FIG. 2. The facsimile apparatus of the first preferred embodiment comprises a laser printer 70 of a so-called binary printer for printing each pixel with two gradation stages of white or black. On the other hand, the facsimile apparatus of the second preferred embodiment comprises a laser printer 70 of a so-called multi-value printer for printing each pixel with a multi-number of gradation stages.

In the description of the preferred embodiments, "a half-tone image" and "a half-tone area" means a pseudo half-tone image obtained by binarizing multi-value image data of half-tone image such as photograph image or the like using a pseudo half-tone binarizing method such as a dither method or the like, and an area of the image thereof, respectively. On the other hand, "a non-half-tone image" and "a non-half-tone area" means a non-half-tone image such as character image or the like, and an area of the image thereof, respectively.

It is to be noted that a number of adjacencies is referred to as an adjacency number hereinafter in the specification and Figs.

First Preferred Embodiment

The facsimile apparatus of the first preferred embodiment according to the present invention will be described in an order of the following items.

Figure 3:
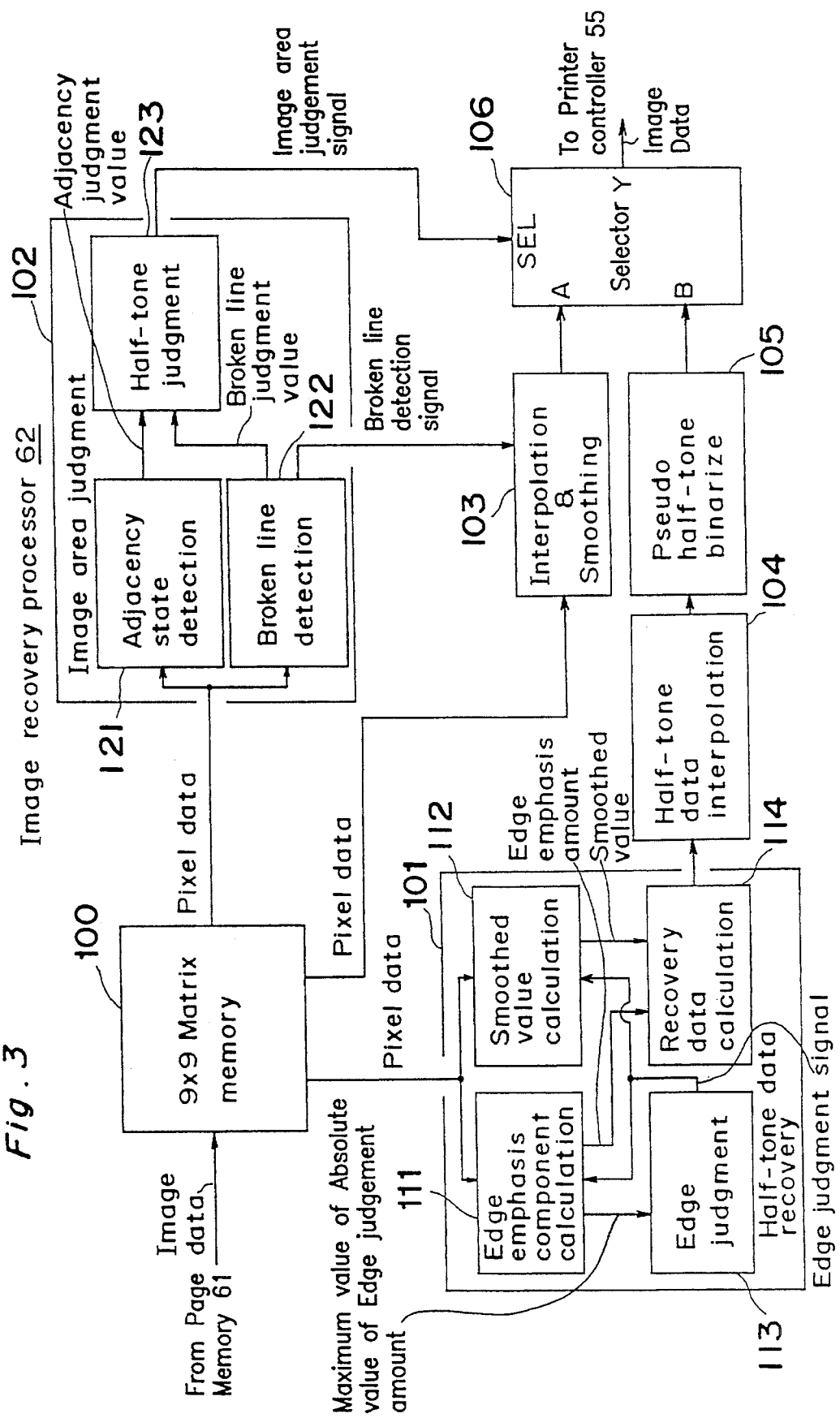
FIG. 3 is a schematic block diagram showing an image recovery processor shown in FIG. 2.

(1) Features of Present preferred embodiment
(2) Composition and Action of Facsimile apparatus
(3) Image recovery processor
(4) 9×9 Matrix memory
(5) Half-tone data recovery section
   (5-1) Composition and Action of Respective sections
   (5-2) 5×5 Black pixel number counting circuit
   (5-3) 7×7 Black pixel number counting circuit
   (5-4) Edge component counting circuit
   (5-5) Adder circuit
(6) Image area judgment section
   (6-1) Composition and Action of Respective sections
   (6-2) Adjacency number in main scan and subscan directions counting circuit
   (6-3) Adjacency number in oblique directions counting circuit
   (6-4) Pixel number on line counting circuit
(7) Interpolation and smoothing processor (1) Features of Present preferred embodiment The facsimile apparatus of the first preferred embodiment, as shown in FIG. 3, comprises:

(a) a half-tone data recovery section 101 for calculating a predetermined edge emphasis amount and a predetermined smoothed value based on received binary image data including binary image data binarized by the pseudo half-tone binarizing method and binary image data binarized by the non-half-tone binarizing method using a predetermined threshold value, generating an edge judgment signal, and then, recovering multi-value half-tone data;

(b) an image area judgment processor 102 for judging whether or not each specified pixel within each predetermined area, in the center of which the specified pixel is, is included in the half-tone area or the non-half-tone area based on the received binary-image data, generating an image area judgment signal, detecting a broken line and outputting a broken line detection signal; and (c) an interpolation-and-smoothing processor 103 for performing an interpolation process and a smoothing process based on the received binary image data and the broken line detection signal. In the facsimile of the first preferred embodiment, when it is judged that a specified pixel is included in the half-tone area, a binarizing process of pseudo half-tone is performed for the recovered half-tone data, and then, the binarized image data are outputted through a printer controller 55 to the binary laser printer 70. On the other hand, when it is judged that a specified pixel is included in the non-half-tone area, the binary image data outputted from the processor 103 is outputted to the laser printer 70 in a similar manner.

In particular, the facsimile apparatus of the first preferred embodiment is characterized by the half-tone data recovery section 101 and the image area judgment section, as follows. The half-tone data recovery section 101 comprises:

(a) an edge emphasis component calculation section 111 for generating data of the maximum value of the absolute values of the edge judgment amounts each representing an index for edge judgment based on inputted pixel data, and generating data of edge emphasis amount used upon performing an edge emphasis process within a predetermined area;

(b) a smoothed value calculation section 112 for calculating a smoothed value obtained by performing a smoothing process for pixel data within the predetermined area based on the inputted pixel data and the edge judgment signal;

(c) an edge judgment section 113 for generating an edge judgment signal based on the maximum value of the absolute values of the edge judgment amounts which is inputted; and (d) a recovery data calculation section 114 for recovering multi-value half-tone image data based on the edge emphasis amount and the edge emphasis amount which are inputted.

Further, the image area judgment section 102 comprises:

(a) an adjacent state detection section 121 for, based on inputted pixel data, calculating adjacent judgment values for representing adjacent states of the same kind of pixels positioned within a predetermined area in four directions of the main scan and subscan directions and calculating adjacent judgment values for representing adjacent states of the same kind of pixels positioned within a predetermined area in four directions of oblique directions inclined from the main scan and subscan directions by 45 degrees (referred to as four oblique directions hereinafter);

(b) a broken line detection section 122 for calculating a broken line judgment value for representing whether or not there is a broken line within a predetermined area based on inputted pixel data, and generating a broken line-detection signal when it is judged that there are one or more broken lines; and (c) a half-tone judgment section 123 for judging whether the predetermined area is the half-tone area or the non-half-tone area based on the inputted adjacent judgment value and the inputted broken line judgment value, and generating an image area judgment signal for representing the judgment result thereof.

(2) Composition and Action of Facsimile apparatus

Figure 1:
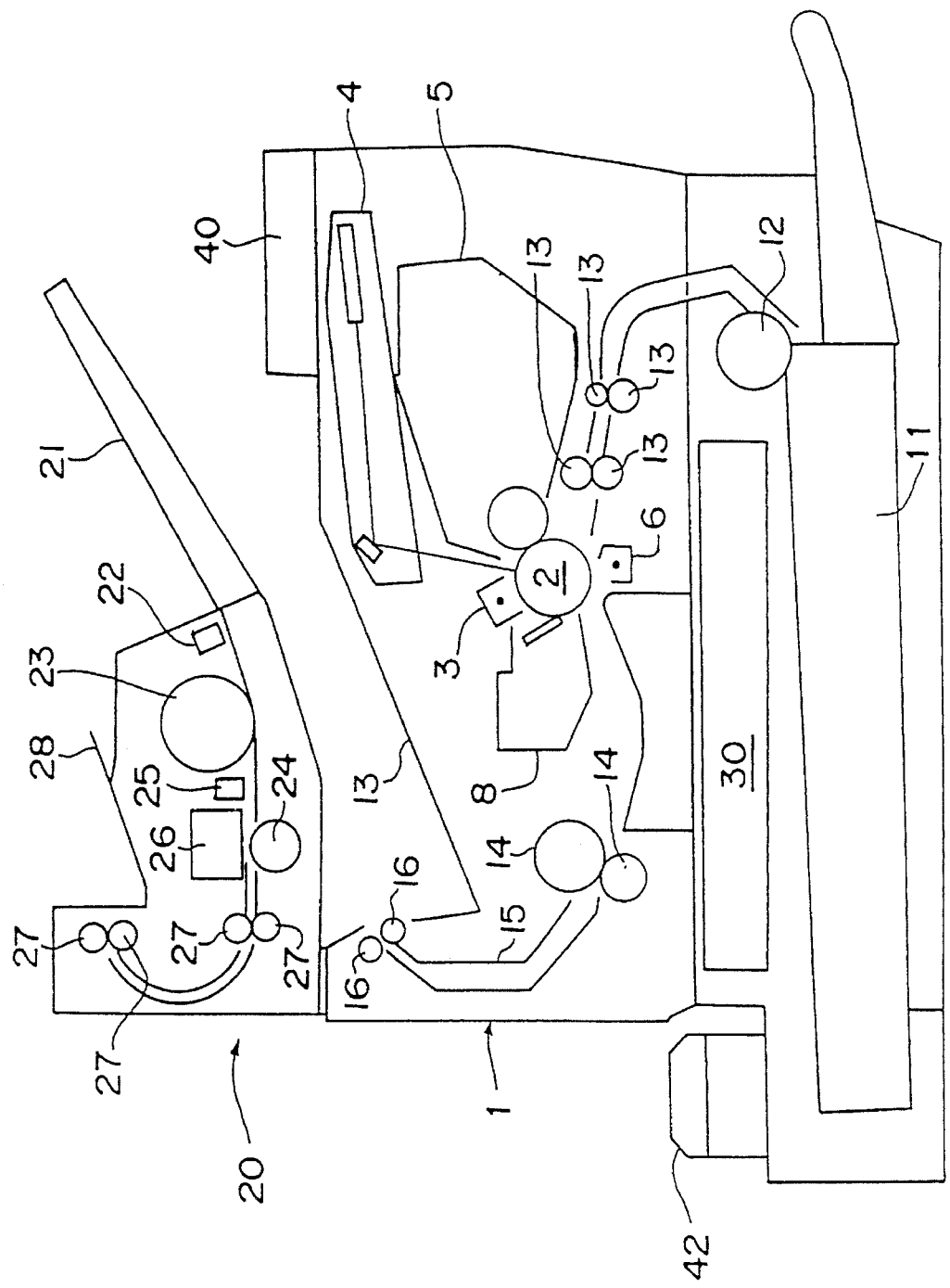
FIG. 1 is a longitudinal cross sectional view showing a mechanical section of a facsimile apparatus of a first preferred embodiment according to the present invention.

FIG. 1 shows a mechanical section of the facsimile apparatus of the first preferred embodiment according to the present invention, and FIG. 2 shows a signal processing section of the facsimile apparatus shown in FIG. 1. As shown in FIG. 1, the facsimile apparatus is mainly divided into a printer section 1 and an image reader 20 provided on the printer section 1. An operation panel 40 is provided on the printer section 1, and a telephone 42 is provided on the side surface of the printer section 1.

Referring to FIG. 1, the printer section 1 is an electrophotographic laser printer having a structure similar to that of the conventional laser printer. The composition and action thereof will be briefly described below.

First of all, a photoconductive layer formed on a photoconductive drum 2 rotated is uniformly electrified by a corona charger 3. Thereafter, a beam of laser light is projected onto the photoconductive drum 2 by an optical system 4 according to image data, so as to form an electrostatic latent image on the photoconductive drum 2, and then, the electrostatic latent image is developed with toner by a developing unit 5 so as to form a toner image thereon. On the other hand, there are set a number of cut papers on a paper feeding cassette 11, and after the cut papers are picked up one by one by a pick-up roller 13, and the picked cut paper is sent to a transfer portion of the photoconductive drum 2 by the paper feeding roller 13. The toner image formed on the photoconductive drum 2 is transferred onto a piece of cut paper by a transfer charger 6, and the transferred toner image is fixed thereon by a fixing unit 12. The cut paper for which the fixing process has been completed is discharged through a paper discharging path 15 onto a paper discharging tray 13 by paper discharging rollers 14 and 16. The toner remaining on the photoconductive drum 2 is collected by a toner cleaner 8, and then, one printing process is-completed.

Hereinbelow, the composition and action of the image reader 20 will be described.

A document set on the document tray 21 is detected by a document sensor 22, and the document is sent to a position of a paper sensor 25 one by one by a roller 23. Then, an image of the document (referred to as a document image hereinafter) is read by a contact type CCD linear image sensor 26 in synchronous with rotation of the roller 24 by a motor. (not shown) and a reading operation of the image sensor 26, and the document image is converted into digital image data. Thereafter, the converted digital image data are outputted to a buffer memory 59 shown in FIG. 2, and are converted into compressed image data by a compression and expansion section 60. Then, the compressed image data are stored in a compressed image memory 51. After reading the document image, the document is discharged onto a document discharging tray 28 by a paper discharging roller 27.

As shown in FIG. 2, the facsimile apparatus further comprises:

(a) a micro processing unit (referred to as an MPU hereinafter) 50 for controlling the whole operation of the facsimile apparatus;

(b) an HDLC analyzer 52, a modulator and demodulator (referred to as a MODEM hereinafter) 53 and a network control unit (referred to as an NCU hereinafter) 54, each performing a signal processing of the facsimile and a communication process;

(c) the compressed image memory 51, the buffer memory 59 and a page memory 61, each temporarily storing image data of the facsimile or the like; and (d) the compression and expansion section 60 and the image recovery processor 62, each performing a predetermined process for processing an image signal. Respective sections 20, 51, 52, 53, 54, 59, 60 and 61 are connected through a bus 63 to the MPU 50. The operation panel 40 is directly connected to the MPU 50, and a printer controller 55 for controlling the laser printer 70 provided in the printer section 1 is connected to the MPU 50.

First of all, a receiving operation of the facsimile apparatus will be described below.

When there is caused an incoming call from the facsimile apparatus of the other party through the telephone line, an incoming call signal is inputted through the NCU 54 and the MODEM 53 to the MPU 50 and is detected, and then, a line connection process with the facsimile apparatus of the other party is performed according to a predetermined facsimile line connection procedure. After the line connection process, a compressed image signal transmitted from the facsimile apparatus of the other party is inputted through the NCU 54 to the MODEM 53, and is demodulated by the MODEM 53. Then, there is performed a predetermined HDLC inverse processing process for taking out only the compressed image data from HDLC frames of the demodulated image data by the HDLC analyzer 52, and then, the compressed image data are stored in the compressed image memory 51. After the compressed image signals of all the pages have been received, a line disconnection process with the facsimile apparatus of the other party is performed according to a predetermined facsimile line disconnection procedure. The image data stored in the compressed image memory 51 are expanded by one page so as to be developed into practical image data on the page memory 61 by the compression and expansion section 60. The image data developed on the page memory 61 are inputted to the image recovery processor 62, are converted into binary image data of high density by a process as described in detail later, and then the converted binary image data are outputted to the printer controller 55. A recording start signal is outputted from the MPU 50 to the printer controller 55 in synchronous with transfer operation of the image data to the printer controller 55, and then, the printer controller 55 transmits control signals and image data to the laser printer 70 so as to make the laser printer 70 print out the image data.

Next, the transmitting operation of the facsimile apparatus will be described below.

After all the above-mentioned image reading operations by the image reader 20 have been completed, a line connection process with the facsimile apparatus of the other party is performed. After the line connection process is completed, the compressed image data stored in the compressed image memory 51 are expanded so as to be developed on the page memory 61 by the compression and expansion section 60. Then, a compression process is performed again for the developed image data according to a performance of the facsimile apparatus of the other party, and then, the recompressed image data are stored in the compressed image memory 51. After a predetermined HDLC processing process is performed for the stored image data by the HDLC analyzer 52, a predetermined carrier signal is modulated by the MODEM 53 according to the image data after the HDLC processing process so as to generate a predetermined facsimile signal. Then, the facsimile signal modulated according to the image data is transmitted through the NCU 54 and the telephone line to the facsimile apparatus of the other party. After the transmission of the facsimile signal is completed, a line disconnection process with the facsimile apparatus of the other party is performed according to a predetermined line disconnection process, and then, the transmitting operation is completed.

The MPU 50 performs predetermined processes based on instructions inputted using the operation panel 40 by the operator, and outputs indication information to the operator and status information of the facsimile apparatus to the operation panel 40 and then displays them on the operation panel 40.

(3) Image recovery processor

The image recovery processor 62 comprises the half-tone data recovery section 101 for recovering multi-value half-tone data from the received binary image data, and the recovery process of the half-tone image has the following effects when there is provided a printer for recording document image with a pixel density higher than that a pixel density of binary image data of pseudo half-tone image (in the present preferred embodiment) or when multi-value image data of pseudo half-tone image are outputted to a multi-value printer for printing dot image of respective pixels with a multi-number of gradation stages (in the second preferred embodiment).

Figure 26:
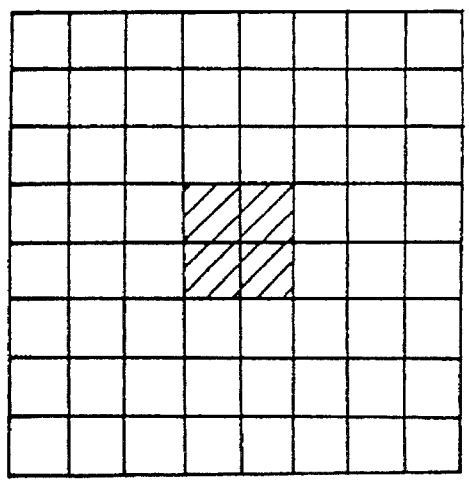
FIG. 26 is a front view showing one example of an image where there are black pixels of four dots within a 8×8 window.
Figure 27:
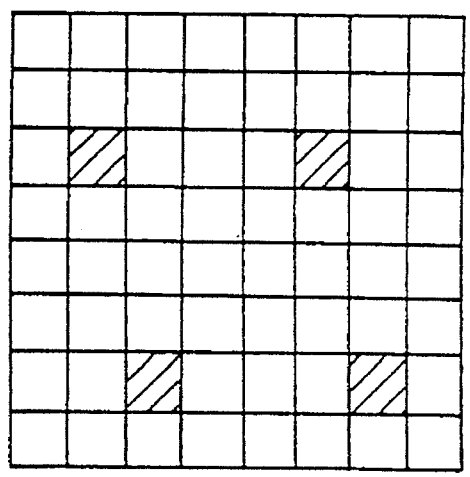
FIG. 27 is a front view showing one example of an image where there are black pixels of four dots apart from each other within a 8×8 window.

In the former case, there can be obtained a higher quality of image when the received image data are converted into multi-value image data, an interpolation process is performed therefor and the processed image data are binarized by the pseudo half-tone binarizing method, as compared with a quality of image obtained when only an interpolation process is performed for the received binary image data. Namely, when only an interpolation process is performed for the received image data, there is a possibility of generating a Moiré because of the periodic property of the pseudo half-tone image binarized from the original image data even in the case that an interpolation ratio is not any integer. Further, for example, when an interpolation process with an interpolation magnification ratio of two is performed for image data of the pseudo half-tone image formed so that there is one black dot within 16 dots, an image can be obtained so that one black pixel of four dots is within 64 dots, as shown in FIG. 26. However, when the received binary image data are converted into multi-value image data and thereafter the pseudo half-tone binarizing process is performed therefor with a pixel density magnification ratio of two, there can be obtained an image where there are four black pixels apart from each other within 64 dots, as shown in FIG. 27, resulting in a higher quality of image.

On the other hand, in the latter case, since the multi-value printer is provided, an image having a multi-number of gradation stages can be formed by recording the image using multi-value half-tone data recovered from binary image data.

Figure 28:
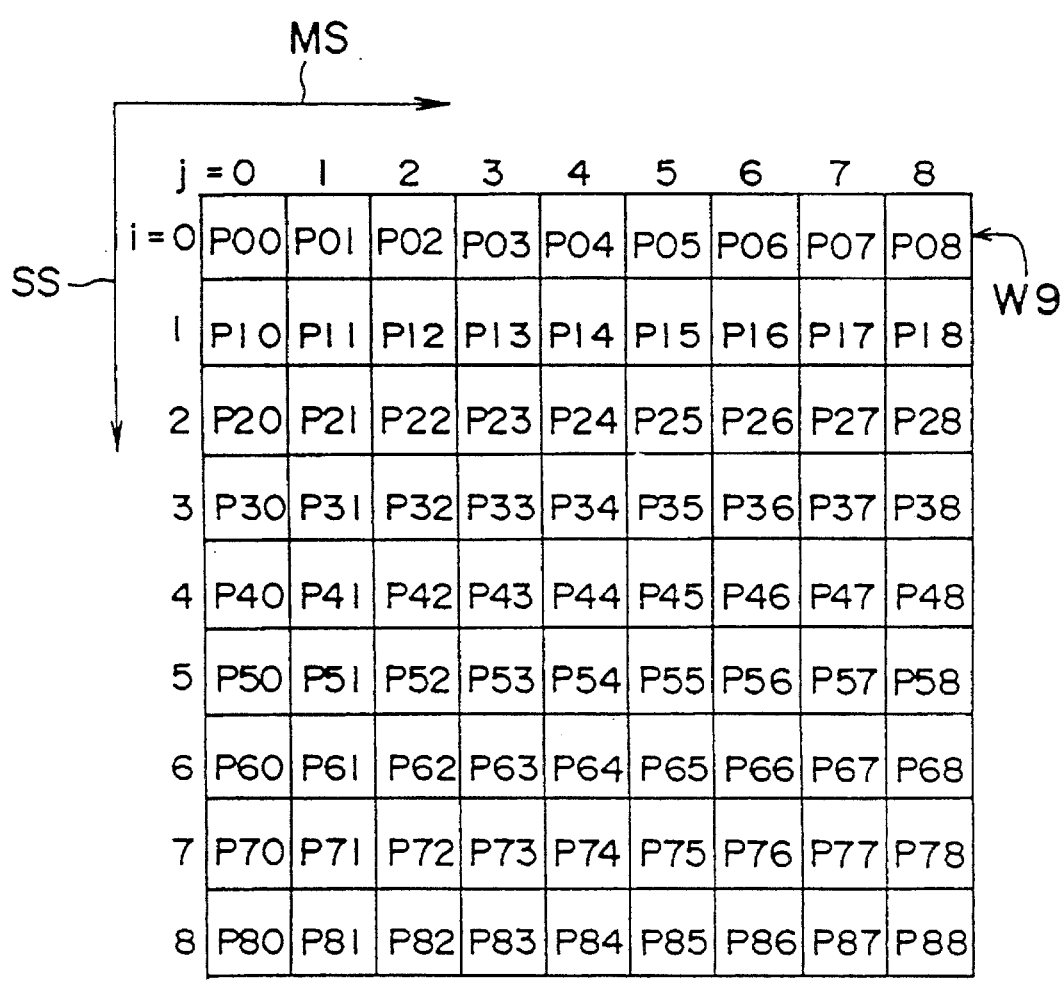
FIG. 28 is a front view showing respective pixel data within a 9×9 window.

FIG. 3 shows the image recovery section 62. Referring to FIG. 3, binary image data read out in serial from the page memory 61 are inputted to the 9×9 matrix memory 100. As shown in FIG. 28, the 9×9 matrix memory 100 generates respective pixel data P00 to P88 located at respective positions of the matrix of a 9×9 window W9, and then, outputs them to the edge emphasis component calculation section 111 and the smoothed value calculation section 112 of the half-tone data recovery section 101, the adjacent state detection section 121 and the broken line detection section 122 of the image area judgment section 102, and the interpolation and smoothing processor 103.

In FIG. 28, an arrow MS denotes the main scan direction, and an arrow SS denotes the subscan direction. Further, i denotes a parameter for representing a position of the main scanning line within the window W9, and j denotes a parameter for representing a position of the sub scanning line thereof.

The half-tone data recovery section 101 comprises the edge emphasis component calculation section 111, the smoothed value calculation section 112, the edge judgment section 113, and the recovery data calculation section 114.

The edge emphasis component calculation section 111 generates data of the maximum value of the absolute values of the edge judgment amounts each amount representing an index for edge judgment based on inputted pixel data, outputs them to the edge judgment section 113 and the recovery data calculation section 114, generates data of edge emphasis amount used upon performing an edge emphasis process within a predetermined area, and outputs them to the recovery data calculation section 114. Also, the edge judgment section 113 generates an edge judgment signal based on the maximum value of the absolute values of the edge judgment amounts which is inputted, and outputs the edge judgment signal the edge emphasis component calculation section 111 and the smoothed value calculation section 112. Further, the smoothed value calculation section 112 calculates a smoothed value obtained by performing a smoothing process for pixel data within the predetermined area based on the inputted pixel data and the edge judgment signal, and outputs the smoothed value to the recovery data calculation section 114. Furthermore, the recovery data calculation section 114 recovers multi-value half-tone image data based on the edge emphasis amount and the smoothed value which are inputted, and outputs them to a half-tone data interpolation section 104.

The half-tone data interpolation section 104 performs an interpolation process for the recovered multi-value half-tone image data so that the interpolated image data has a recording pixel density of the laser printer 70 higher than that of the recovered multi-value half-tone image data, and then, outputs the interpolated image data to a pseudo half-tone binarizing section 105. The pseudo half-tone binarizing section 105 performs the predetermined pseudo half-tone binarizing process for the interpolated multi-value image data inputted from the half-tone data interpolation section 104, and outputs the processed binary image data to an input terminal B of a selector 106.

The image area judgment section 102 comprises the adjacent state detection section 121, the broken line detection section 122, and the half-tone judgment section 123.

Based on the inputted pixel data, the adjacent state detection section 121 calculates adjacent judgment values for representing adjacent states of the same kind of pixels positioned within a predetermined area in four directions of the main scan and subscan directions and calculating adjacent judgment values for representing adjacent states of the same kind of pixels positioned within a predetermined area in the four oblique directions, and outputs them to the half-tone judgment section 123. Also, the broken line detection section 122 calculates a broken line judgment value for representing whether or not there is a broken line within a predetermined area based on inputted pixel data, outputs the calculated broken line judgment value to the half-tone judgment section 123, generates a broken line detection signal when it is judged that there are one or more broken lines, and outputs the broken line detection signal to the interpolation and smoothing processor 103. Further, the half-tone judgment section 123 judges whether the predetermined area having the specified pixel in the center thereof is the half-tone area or the non-half-tone area based on the inputted adjacent judgment value and the inputted broken line judgment value, generates an image area judgment signal for representing the judgment result, and outputs the image area judgment signal to the selector 106. When it is judged that the predetermined area is in the non-half-tone area, the image area judgment signal having a high level is outputted to the selector 106. On the other hand, when it is judged that the predetermined area is in the half-tone area, the image area judgment signal having a low level is outputted to the selector 106.

The interpolation and smoothing processor 103 performs the interpolation process for the inputted binary image data based on the broken line detection signal so that the interpolated image data has twice the pixel density of the inputted binary image data in both of the main scan direction and the subscan direction, performs a predetermined smoothing process, and then, outputs the processed binary image data to an input terminal A of the selector 106. As described in detail later, the processor 103 performs a process for making an isolated point remain when there is a broken line within a predetermined area and then the broken line detection signal has the high level. On the other hand, the processor 103 performs a process for removing an isolated point when there is not any broken line within the predetermined area and then the broken line detection signal has the low level.

When the image area judgment signal has the high level or in the case of the non-half-tone area, the selector 106 selects the binary image data outputted from the processor 103, and outputs the selected binary image data to the printer controller 55. On the other hand, when the image area judgment signal has the low level or in the case of the half-tone area, the selector 106 selects the binary image data outputted from the pseudo half-tone binarizing section 105, and outputs the selected binary image data to the printer controller 55.

(4) 9×9 Matrix memory

Figure 5:
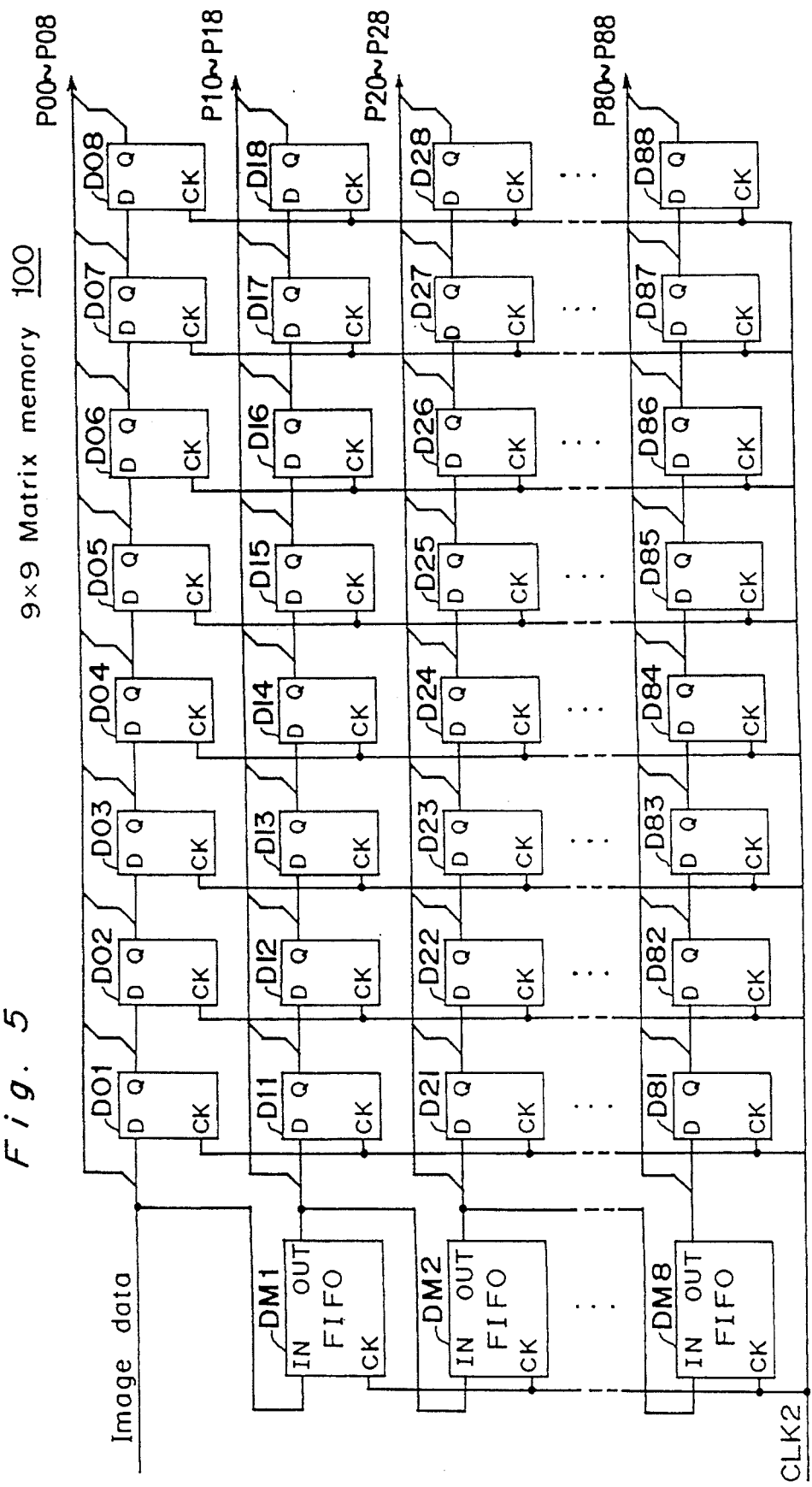
FIG. 5 is a schematic block diagram showing a 9× 9 matrix memory shown in FIGS. 3 and 4.

FIG. 5 shows the 9×9 matrix memory 100. Referring to FIG. 5, the 9×9 matrix memory 100 comprises:

(a) eight FIFO memories DM1 to DM8 each delaying the inputted image data by one horizontal scanning interval which is one scanning time in the main scan direction, based on a clock CLK2 having the same period as that of a transfer clock of the binary image data inputted from the page memory 61 or having a period of one dot of the inputted binary image data, and outputting them; and (b) 72 delay type flip-flops D01 to D08, D11 to D18, D21 to D28, . . . , D81 to D88 each delaying image data inputted in synchronous with the clock CLK2 by one period of the clock CLK2, and outputting them.

After the binary image data outputted from the page memory 61 in serial in a direction from the last pixel of the image of each page to the first pixel thereof are inputted to the flip flop D01, the inputted binary image data are outputted through the eight flip-flops D01 to D08 connected in series with each other. Also, after the binary image data outputted from the page memory 61 are inputted to the FIFO memory DM1, they are outputted through the eight FIFO memories DM1 to DM8 connected in series with each other. After the image data outputted from the FIFO memory DM1 are inputted to the flip-flop D11, they are outputted through the flip-flops D11 to D18 connected in series with each other. Further, after the image data outputted from the FIFO memory DM2 are inputted to the flip-flop D21, they are outputted through the flip-flops D21 to D28 connected in series with each other. In a manner similar to that of above, the image data outputted from the respective FIFO memories DM3 to DM8 are inputted to the flip-flops D31 to D81, respectively, they are outputted through the flip-flops D31 to D38, D41 to D48, . . . , and D81 to D88 respectively connected in series with each other.

In the 9×9 matrix memory 100 constituted as described above, the pixel data of one dot first inputted to the matrix memory 100 are outputted from the flip-flop D88, and the image data then inputted are outputted as pixel data P00. Respective pixel data P01 to P08 on the main scanning line of i=0 within the 9×9 window are outputted from the respective flip-flops D01 to D08, respectively, and respective pixel data P20 to P28 on the main scanning line of i=2 within the 9×9 window are outputted from the FIFO memory DM2 and the respective flip-flops D21 to D28, respectively. In a manner similar to that of above, respective pixel data P30 to P88 are outputted from the respective FIFO memories DM3 to DM8 and the respective flip-flops D31 to D88.

Figure 6:
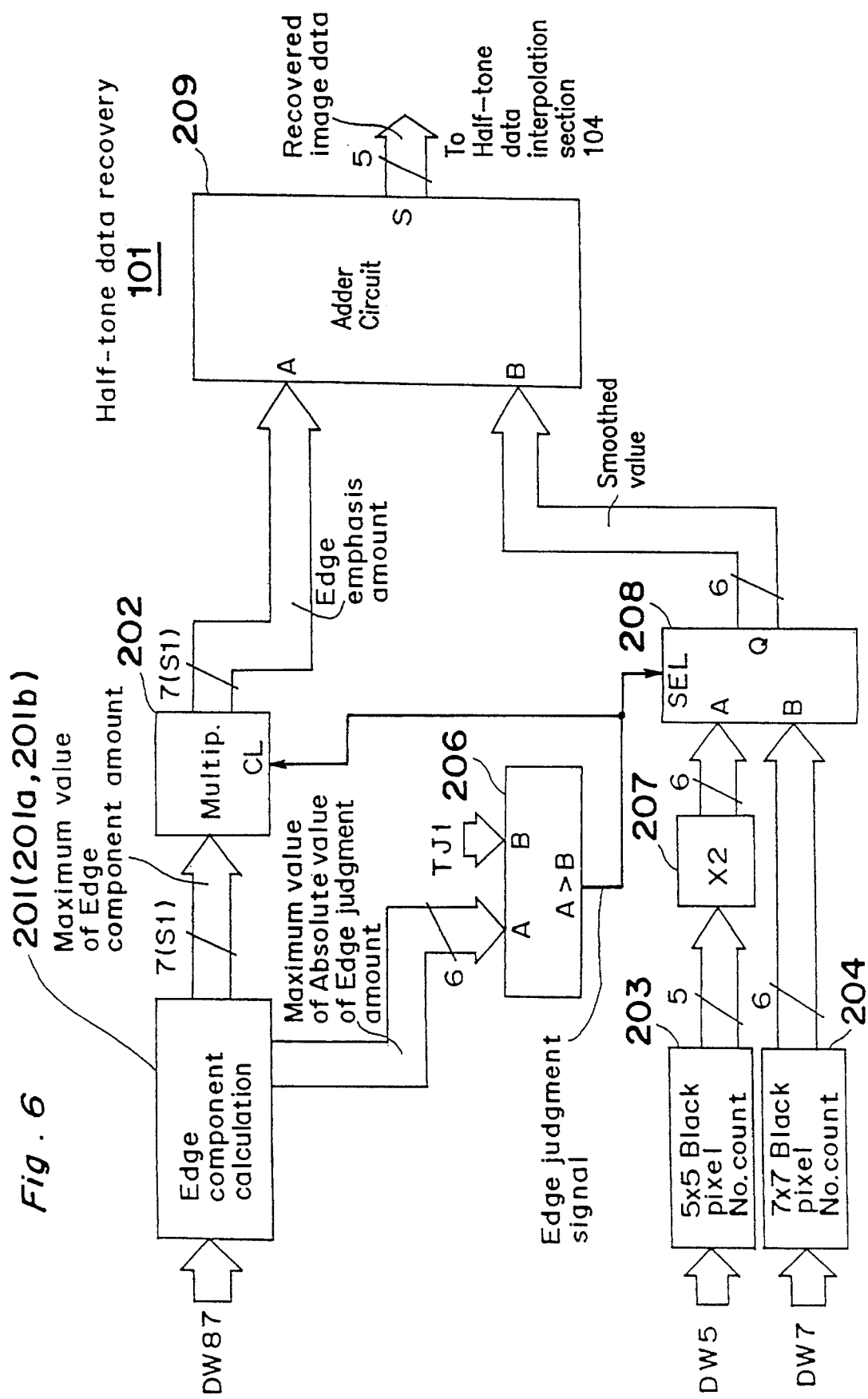
FIG. 6 is a schematic block diagram showing a half-tone data recovery section shown in FIGS. 3 and 4.

(5) Half-tone data recovery section (5-1) Composition and Action of Respective sections FIG. 6 shows the half-tone data recovery section 101 for recovering multi-value image data from binary image data of pseudo half-tone image.

In order to recover multi-value image data from binary image data of pseudo half-tone image, the half-tone data recovery section 101 performs a smoothing process by adding pixel data in the periphery of the specified pixel to the pixel data of the specified pixel so as to calculate a smoothed value, and recovers multi-value image data based on the smoothed value.

Figure 29:
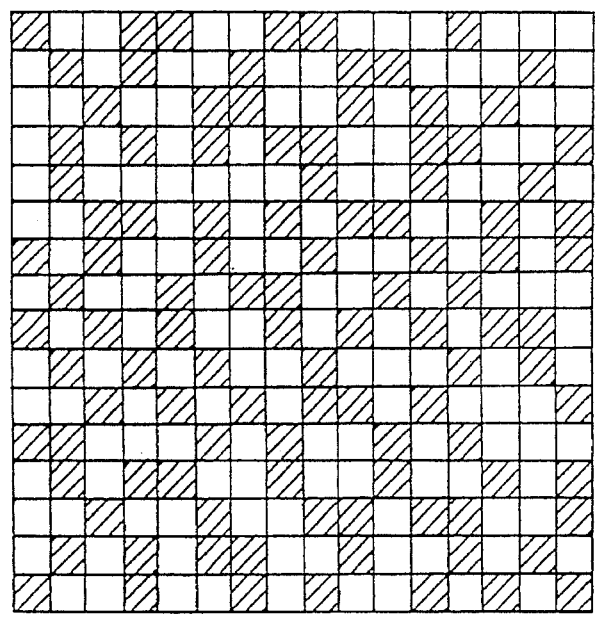
FIG. 29 is a front view showing one example of an image obtained when uniform image data having a ratio of 7/16 of a dimension of black pixels to a dimension of all the pixels are binarized using the error diffusion method.
Figure 30:
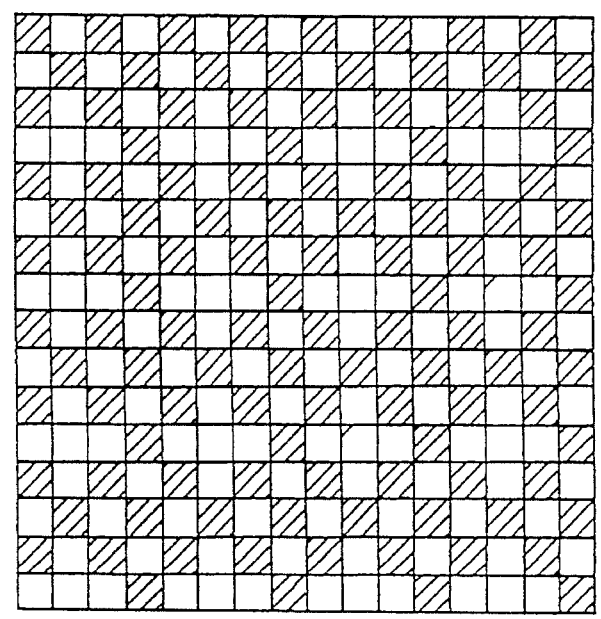
FIG. 30 is a front view showing one example of an image obtained when uniform image data having a ratio of 7/16 of a dimension of black pixels to a dimension of all the pixels are binarized using the dither method.

FIG. 29 shows one example of an image obtained when uniform image data having a ratio of 7/16 of a dimension of black pixels to a dimension of all the pixels are binarized using the error diffusion method, and FIG. 30 shows one example of an image obtained when uniform image data having a ratio of 7/16 of a dimension of black pixels to a dimension of all the pixels are binarized using the dither method. When, for example, a 2×2 window is used upon recovering multi-value image data of five gradation stages including, for example, zero white pixel and four black pixels from the binary image data of the pseudo half-tone image, the recovered multi-value image data has pixel data having various kinds of values in a range from zero to three in the case of the image shown in FIG. 29. On the other hand, the recovered multi-value image data has pixel data having various kinds of values in a range from one to three in the case of the image shown in FIG. 30. Therefore, there are the following two problems.

(1) When, for example, there are recovered multi-value image data of a natural number N of gradation stages, it is necessary to recover multi-value image data based on a number N or more of pixels. Therefore, in the case of using a square window, it is necessary to use a window having a size of $$\sqrt{N} \times \sqrt{N}$$

or a size larger than that size. Namely, in the case of N≧3, it is necessary to use a window having a size of a side equal to or larger than two dots.

(2) When the recovery process is performed not using a window having a side equal to or larger than the interval of the period of the original binary image data of the pseudo half-tone image, the texture of the pseudo half-tone image may influence the recovered image. For example, in the case of the image shown in FIG. 30, since the image has a periodic property of four dots, it is necessary to use a window having a side larger than four dots. However, when the size of the window is increased, a shaded-off portion may be caused in the recovered image.

Therefore, it is necessary to use the following window in the smoothing process upon the recovery process, and the following three conditions are referred to as requirements of the size of the window hereinafter:

(a) using a window having a size equal to larger than a number of gradation stages of the image to be recovered;

(b) using a window having a side larger than an interval of the period of the binary image data of the original pseudo half-tone image; and (c) using a window having a side so that any shaded-off portion is not caused in the recovered image.

Figures 31, 32:
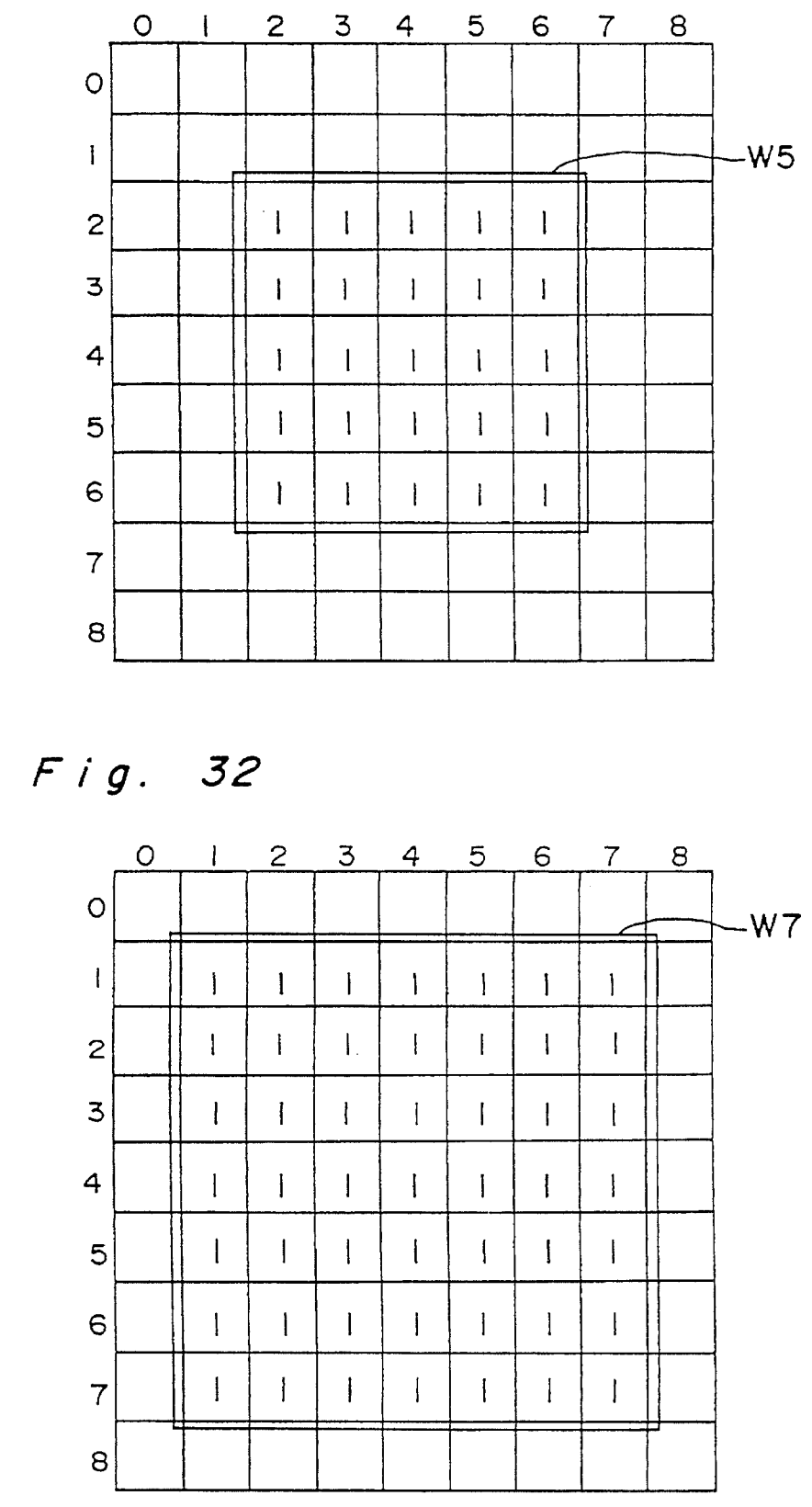

FIGS. 31 and 32 show spatial filters used upon calculating the smoothed value in the present preferred embodiment. The spatial filter shown in FIG. 31 is provided for performing a smoothing process within a 5×5 window having the specified pixel in the center thereof, and the spatial filter shown in FIG. 32 is provided for performing a smoothing process within a 7×7 window having the specified pixel in the center thereof. The loss of the edge component in the case of using the spatial filter shown in FIG. 31 is smaller than that in the case of using the spatial filter shown in FIG. 32, however, the number of the gradation stages of the processed image in the case of using the spatial filter shown in FIG. 31 is smaller than that in the case of using the spatial filter shown in FIG. 32. Therefore, in the present preferred embodiment, when the change in the density is relatively large or in the case of the area having a relatively small edge component, the shaded-off portion is decreased and the gradation property is lowered by using the spatial filter shown in FIG. 31. On the other hand, in the case of the area having a relatively large edge component, there is used the spatial filter shown in FIG. 32.

In order to take into consideration the requirements of the size of the window, the window of the spatial window used in the present preferred embodiment (a) includes a number of pixels larger than the number of gradation stages of the pseudo half-tone of the binary image data of the pseudo half-tone image;

(b) includes a number of pixels larger than the number of gradation stages of the laser printer 70 (the number of gradation stages of the pseudo half-tone in the second preferred embodiment); and (c) is set to a value smaller than a size required for preventing any shaded-off portion from being caused in the recovered image. Further, in the art field of the facsimile apparatus to which the half-tone data recovery section 101 is applied, the number of the gradation stages of the pseudo half-tone binary image is preferably set to 16, 32 or 64. Since the binary image of the pseudo half-tone image having 64 gradation stages or more can be seen as almost the same image as that having 32 gradation stages by human eyes, the processor circuit is constituted so as to recover the image data having 50 gradation stages using the spatial filter utilizing the 7×7 window W7 shown in FIG. 32, except for the edge area. It is to be noted that the reason why there are used uniform weighting coefficients within the spatial filter is that the area gradation method is used as the pseudo half-tone binarizing method. Further, in the present preferred embodiment, there are used the square spatial filters, however, each of the spatial filters may have the other shape such as a regular hexagon or the like.

Generally speaking, images include various kinds of spatial frequency components, originally. The object of the above-mentioned smoothing filter is to remove the spatial frequency components of the texture of the pseudo half-tone by performing the smoothing process. However, the higher frequency components other than the texture may decrease or disappear as a side reaction thereof. For example, using the 7×7 window W7 leads to attenuation of the high frequency component higher than the spatial frequency component in the case of one period of a 7×2 pixel. Therefore, in order to obtain a preferred recovered image, it is necessary to provide means for maintaining or storing the high frequency components. Conventionally, it has been suggested to make the window smaller for smoothing process for the image having the high frequency components, and it is used in the present preferred embodiment. In the present preferred embodiment, there is used a method for maintaining or storing the high frequency components by the edge emphasis process, and the methods including the methods of the present preferred embodiment and the prior art will be described below.

Multi-value image data for the specified pixel are calculated using the 7×7 window W7, and there are calculated the four multi-value image data for four adjacent pixels adjacent in the four direction of the main scan and subscan directions from the specified pixel located in the center thereof. Thereafter, the edge emphasis amount is obtained based on the calculated multi-value image data. First of all, this method will be described below.

Figure 33:
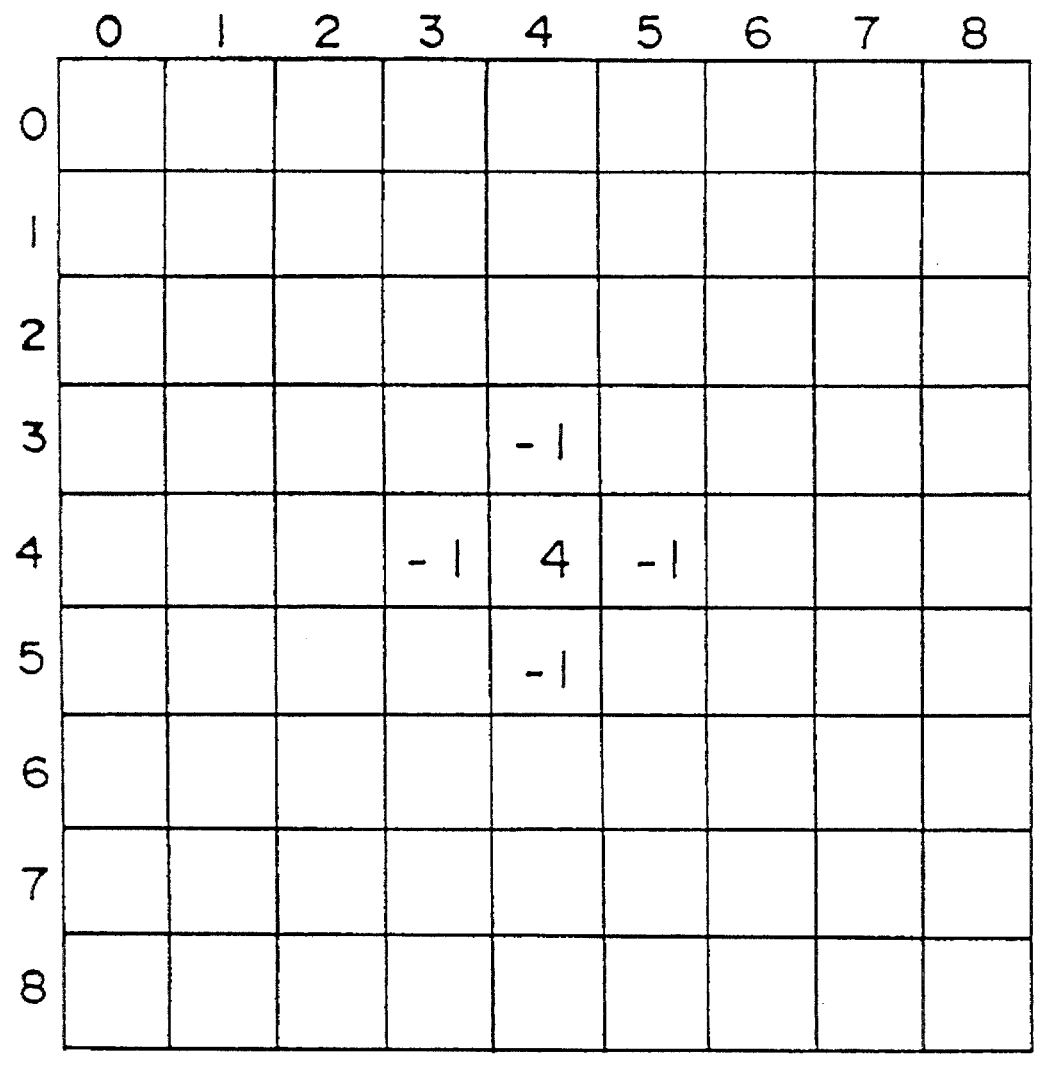

FIG. 33 shows a conventional Laplacian filter used upon performing the edge emphasis process for multi-value image data. In the calculation of the conventional Laplacian filter, as shown in FIG. 33, each of the image data of the four adjacent pixels P34, P43, P45 and P54 adjacent in the four directions of the main scan and subscan directions from the specified pixel P44 are subtracted from four time the pixel data of the specified pixel P44, and the difference thereof is set as the edge emphasis amount.

Figures 34, 35:
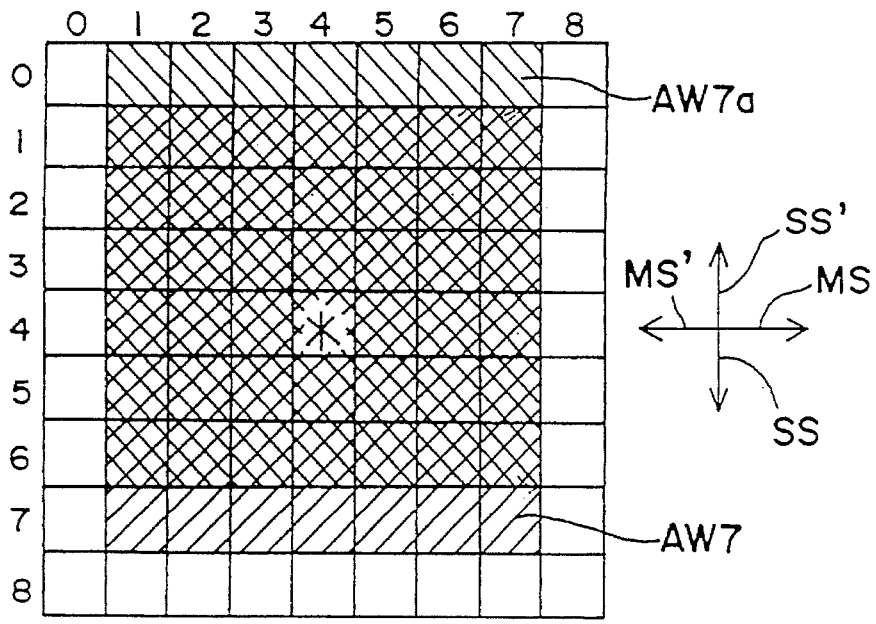
FIG. 34 is a front view showing examples of two 7×7 windows for an edge emphasis process.
FIG. 35 is a front view showing a spatial filter for an edge emphasis process comprising four windows obtained by respectively shifting a 7×7 window by one dot in four directions of the main scan and subscan directions.

In a manner similar to that of the conventional Laplacian filter, as shown in FIG. 34, a smoothed value of a 7×7 window W7a obtained by shifting the window W7 by one dot in a direction SS' opposite to the subscan direction SS is subtracted from a smoothed value of the 7×7 window W7 having the specified pixel P44 in the center thereof. Similarly, after each of the smoothed values of the 7×7 windows obtained by shifting the window W7 by one dot in the subscan direction SS and in the two main scan directions MS and MS' is subtracted from the smoothed value of the 7×7 window W7, the obtained respective differences are added to each other, resulting in the edge emphasis amount. The method for obtaining the edge emphasis amount is shown in FIG. 35. FIGS. 34 and 35, the specified pixel P44 is denoted by *, and the specified pixel is denoted by * even in the other Figs.

However, as is clear from FIG. 35, there can not be calculated the values within the 5×5 window including the specified pixel P44 located in the center portion thereof, and the high frequency components within the image data are not included in the calculated value. Therefore, these means that the emphasis of the high frequency components can not be performed. Further, such a thing that a number of pixels to be processed is relatively small means to easily output an erroneous edge emphasis amount.

Figure 36:
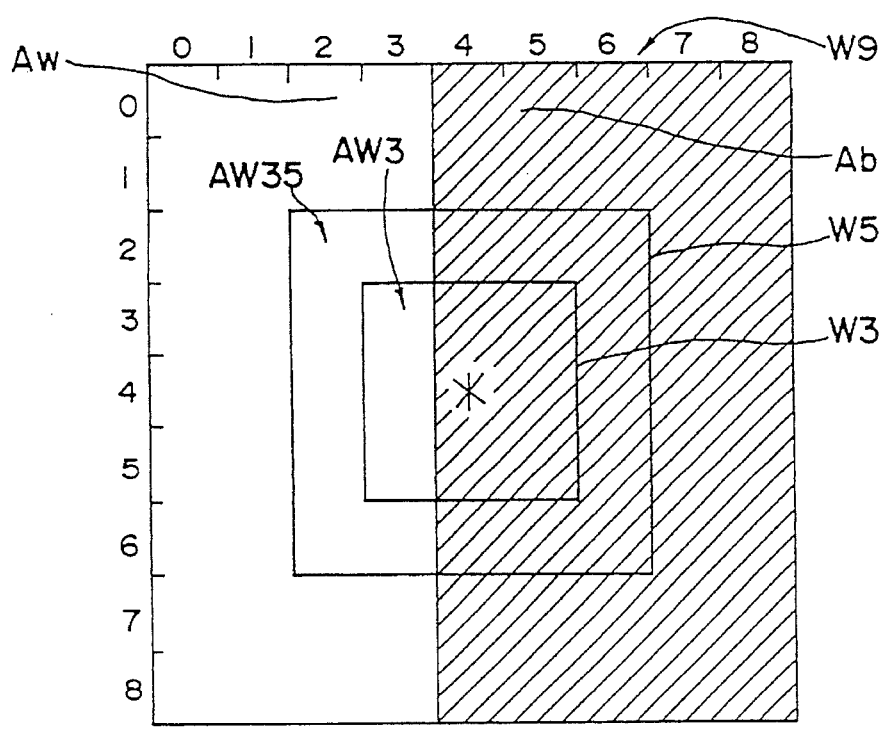
FIG. 36 is a front view showing one example of an image for which an edge emphasis process is to be performed and showing two image areas used in the edge emphasis process.
Figure 37:
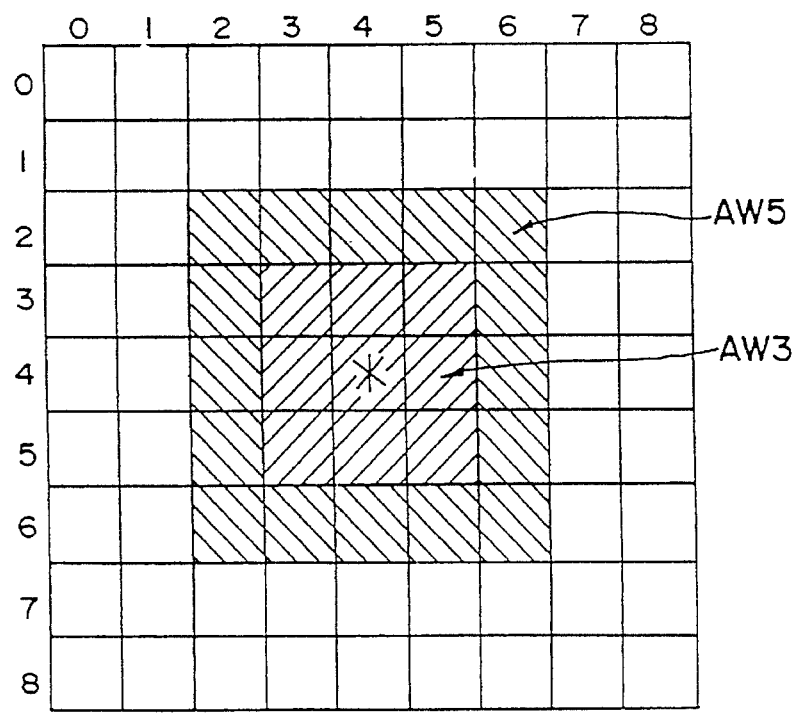
FIG. 37 is a front view showing two image areas used in the edge emphasis process shown in FIG. 36.

Next, as shown in FIGS. 36 and 37, a smoothed value of an area AW35 obtained by removing an area AW3 from the 5×5 window W5 having the specified pixel * in the center thereof is subtracted from a smoothed value of the area AW3 of the 3×3 window having the specified pixel *, and the obtained difference is set as the edge emphasis amount. This method will be described below. The difference between this method and the above-mentioned method is to perform the edge emphasis of the high frequency components using the pixel values in the periphery of the specified pixel as the pixel values to be calculated.

Now, as shown in FIG. 36, an image to be calculated is composed of an area Aw having all the white pixels in the left half thereof and another area Ab having all the black pixels in the right half thereof. When there is the specified pixel * on the boundary line between the white pixels and the black pixels, the number of the black pixels within the area AW3 is 6, and the number of black pixels within the area AW35 is 9. Therefore, the edge emphasis amount is represented by the following equation, with taking into consideration the ratio of the number of black pixels to the number of white pixels:

$$6 \times 16/9 - 9 \approx 1.67, \qquad (1).$$

However, since the maximum value of the edge emphasis amount in this direction is 16, it is considered that the edge emphasis amount obtained by the above-mentioned calculation is too small. The calculation for the edge emphasis in the method for the comparative example is shown in FIG. 38 in a form of a spatial filter, wherein Ee denotes a ratio of the number of pixels corresponding to a coefficient of 16/9 in the above equation (1).

The problem of the method for the comparative example is that the edge emphasis amount outputted when the specified pixel is located in the center of the area to be calculated and there is an edge close to the specified pixel is too small. This represents that the edge emphasis amounts in all the directions can not be obtained from a difference between numbers of the black pixels in the two areas. Further, since the width of the window of the area AW3 is a length of three pixels, the edge emphasis process can be performed only for a fine line composed of three pixels at the maximum, or only for the spatial frequency components having a period of at least (3×2) dots at the maximum.

Now, in order to obtain an edge emphasis amount in one direction, it is considered to arrange the specified pixel * on the boundary line between the two areas used upon calculating the edge emphasis amount. For an image composed of an area Aw of all the white pixels in the left half thereof and another area Ab of all the black pixels in the right half thereof as shown in (a) of FIG. 39, when the edge component amount is calculated using a spatial filter for calculating an edge emphasis amount using two windows wherein the specified pixel is located on the boundary line between the areas Aw and Ab as shown in (b) of FIG. 39, the absolute value of the edge component amount becomes the maximum on the boundary line between the two areas Aw and Ab.

However, since a sign of the edge component amount is not known in this method, the calculated value can not be used as the edge emphasis amount as it is, however, this method is suitable for a case of judging whether or not there is an edge area, or for a case of obtaining the edge component amount.

Accordingly, in the present preferred embodiment, the following methods are adopted.

(1) The specified pixel * is arranged in the center of the area of either one of the two areas used upon calculating the edge emphasis amount.

(2) There is provided a calculation circuit for calculating an edge emphasis amount and a calculation circuit for calculating an edge judgment amount, by a plurality of directions from the specified pixel.

(3) There is provided a calculation circuit for calculating an edge emphasis amount using a plurality of windows of the sizes different from each other or by a plurality of spatial frequency bands.

(4) There is calculated an edge emphasis amount based on the calculation result of the calculation circuit (1) for obtaining a plurality of edge emphasis amount, and an edge area is judged based on the calculation result of the calculation circuit for obtaining another plurality of edge judgment amounts.

The reasons why the above-mentioned four processes are performed are as follows:

Reason (1): If the specified pixel is arranged on the boundary between the two areas, the sign of the edge component amount can not be known. Because the sign of the edge is accurately fixed by arranging the specified pixel in the center of one area.

Reason (2): In the method for obtaining a spatial filter from the difference between the numbers of black pixels, it is difficult to accurately obtain the edge emphasis amount in a plurality of directions once, as described above. Therefore, it is necessary to obtain the edge emphasis amount in a plurality of directions and thereafter to obtain a final edge emphasis amount. In the present preferred embodiment, the maximum edge emphasis amount is selected in this process. However, the present invention is not limited to this, the sum of the edge emphasis amount in a plurality of directions may be set as the final edge emphasis amount. In the case that each set is composed of edge emphasis amounts in a plurality of directions, there is calculated the sum of the edge emphasis amounts in a plurality of directions in each set, the maximum one may be set as the final edge emphasis amount among the sums of the edge emphasis amounts of respective sets.

Reason (3): There are various kinds of spatial frequencies to be edge-emphasized, and there is a size suitable for each spatial frequency. The size of the window is represented by a width of the window in a direction of the edge emphasis, as described in detail later. Originally, as the size of the window increases, the probability of emphasizing the texture of the pseudo half-tone image decreases, and then, the high frequency components can not be emphasized. Therefore, in the present preferred embodiment, there are prepared a plurality of windows, there are obtained edge emphasis amounts of the spatial frequency components suitable for the respective windows, and there is obtained the final edge emphasis amount from these edge emphasis amounts thereof.

Reason (4): As described in the above paragraphs (2) and (3), even though an edge emphasis amount is obtained from a plurality of windows, or even though the shapes thereof are formed by various kinds of designs as described in detail later, the emphasis of the texture of the pseudo half-tone image can not be removed at all. Therefore, there is judged whether or not a predetermined area is an area to be edge-emphasized based on another edge component amount including only the frequency components lower than the spatial frequency of the texture of the pseudo half-tone image. Namely, the texture is smoothed even in a non-edge area, and the original edge components is emphasized in the edge area. Of course, the edge components include the component of the texture. However, since the original edge component is larger than the size of the component of the texture, there is no problem with respect to the component of the texture. Further, when emphasizing the frequency components higher than that of the texture, a pseudo half-tone image has not only high frequency components but also low frequency components, generally, and therefore, it is judged as an edge area.

The calculation circuit for calculating the edge emphasis amount and the edge judgment amount will be described in detail below.

FIGS. 40 to 47 show first to eighth spatial filters used upon calculating the edge component amount which is a fundamental amount for calculating an edge emphasis amount. The specified pixel in each of the first to eighth spatial filters is the pixel P44 located in the center of one area for calculating the smoothed value.

Each of a pair of the first spatial filter shown in FIG. 40 and the second spatial filter shown in FIG. 41 commonly uses a 3×7 window W37 for calculating a smoothed value, and is provided-for detecting an edge component in the subscan direction. The first spatial filter is provided for performing a filtering process by subtracting a smoothed value of a 3×7 window W37a having the pixel P14 in the center thereof from a smoothed value of the 3× 7 window W37 having the specified pixel W44 in the center thereof, and the second spatial filter is provided for performing a filtering process by subtracting a smoothed value of a 3×7 window W37b having the pixel P74 in the center thereof from the smoothed value of the 3×7 window W37. Further, each of a pair of the third spatial filter shown in FIG. 42 and the fourth spatial filter shown in FIG. 43 commonly uses a 7×3 window W73 for calculating a smoothed value, and is provided for detecting an edge component in the main scan direction. The third spatial filter is provided for performing a filtering process by subtracting a smoothed value of a 7×3 window W73a having the pixel P41 in the center thereof from a smoothed value of the 7×3 window W73 having the specified pixel W44 in the center thereof, and the fourth spatial filter is provided for performing a filtering process by subtracting a smoothed value of a 7×3 window W73b having the pixel P47 in the center thereof from the smoothed value of the 7× 3 window W73.

When there are used the spatial filters shown in FIGS. 40 to 44, the degree of the edge emphasis for the high frequency components is determined depending on the width in the edge emphasis direction of the window. In the case of the above-mentioned windows, the edge emphasis process can be performed up to a spatial frequency component having a period of 3×2 pixels.

Figures 44, 45:
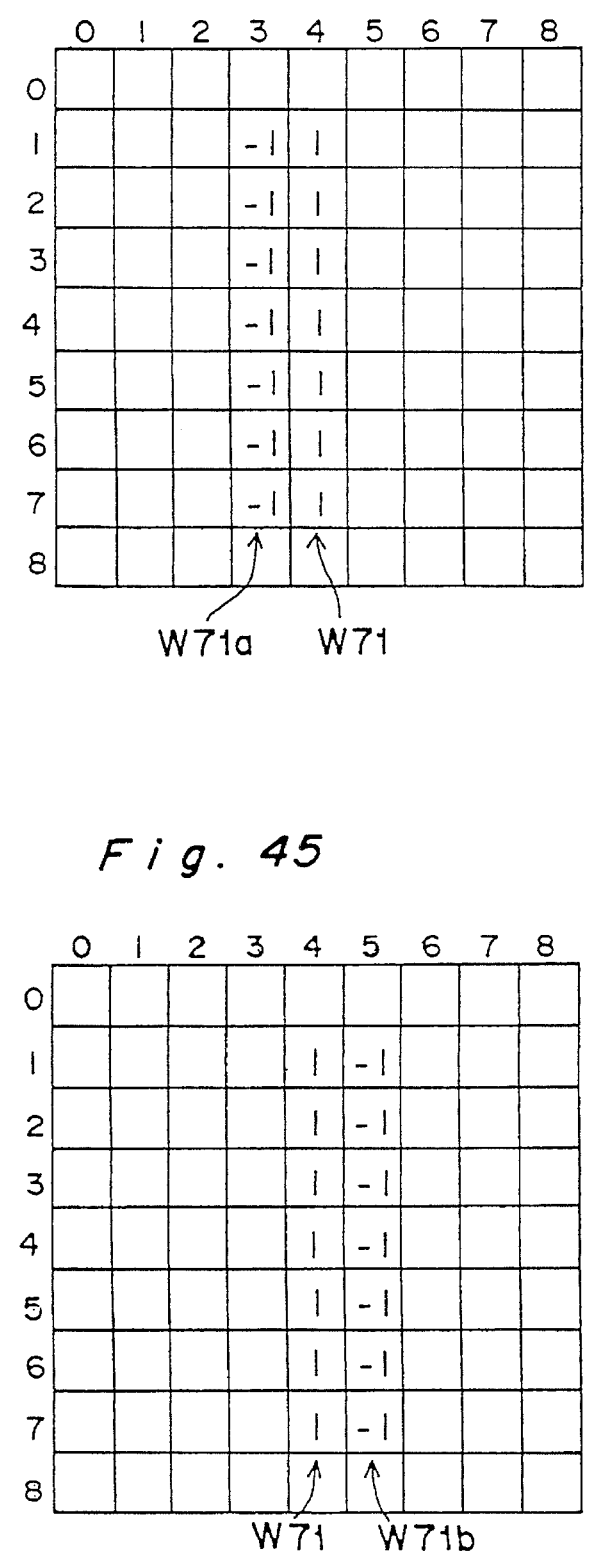

Each of a pair of the fifth spatial filter shown in FIG. 44 and the sixth spatial filter shown in FIG. 45 commonly uses a 7×1 window W71 for calculating a smoothed value, and is provided for detecting an edge component in the subscan direction. The fifth spatial filter is provided for performing a filtering process by subtracting a smoothed value of a 7×1 window W71a having the pixel P43 in the center thereof from a smoothed value of the 7× 1 window W71 having the specified pixel W44 in the center thereof, and the sixth spatial filter is provided for performing a filtering process by subtracting a smoothed value of a 7×1 window W71b having the pixel P45 in the center thereof from the smoothed value of the 7×1 window W71. Further, each of a pair of the seventh spatial filter shown in FIG. 46 and the eighth spatial filter shown in FIG. 47 commonly uses a 1×7 window W17 for calculating a smoothed value, and is provided for detecting an edge component in the main scan direction. The seventh spatial filter is provided for performing a filtering process by subtracting a smoothed value of a 1×7 window W17a having the pixel P34 in the center thereof from a smoothed value of the 1×7 window W17 having the specified pixel W44 in the center thereof, and the eighth spatial filter is provided for performing a filtering process by subtracting a smoothed value of a 1×7 window W17b having the pixel P54 in the center thereof from the smoothed value of the 1× 7 window W17.

These spatial filters shown in FIGS. 44 to 47 can perform an edge emphasis process up to a spatial frequency component of a period of 1×2 pixels.

The windows having two kinds of shapes are described above, and are characterized in that the size in the edge emphasis direction of each of the two areas constituting each window is smaller than that in a direction perpendicular to the edge emphasis direction thereof. As described above, the spatial frequency component for which the edge emphasis process can be performed is determined depending on the width in the edge direction. On the other hand, in order to prevent influence of the texture of the pseudo half-tone image from being received, it is necessary to enlarge the size of the area. Therefore, in the present preferred embodiment, taking into consideration both the former and the latter, the width of each window in the edge emphasis direction is made smaller, and the length thereof in a direction perpendicular to the edge emphasis direction is made larger.

FIGS. 48 and 49 show ninth and tenth spatial filters for calculating the edge judgment amounts in the present preferred embodiment. The specified pixel in each of the ninth and tenth spatial filters is the pixel P44 located on the boundary line between the two areas for calculating the smoothed values.

The ninth spatial filter shown in FIG. 48 and the tenth spatial filter shown in FIG. 49 is provided for detecting edge components in the subscan and main scan directions, respectively. The ninth spatial filter is provided for performing a filtering process by subtracting a smoothed value of a 4×7 window W47a having the center thereof located in the center of the boundary between the pixels P14 and P24 from a smoothed value of the 4×7 window W47 having the center thereof located in the center of the boundary between the pixels P54 and P64, and the tenth spatial filter is provided for performing a filtering process by subtracting a smoothed value of a 7×4 window W74a having the center thereof located in the center of the boundary between the pixels P46 and P47 from a smoothed value of the 7×4 window W74 having the center thereof located in the center of the boundary between the pixels P42 and P43.

In the present preferred embodiment, there is used the tenth spatial filter shown in FIG. 49, however, both of the spatial filters shown in FIGS. 50 and 51 may be used in order to calculate the edge judgment amounts in the subscan direction. The edge judgment amount in the main scan direction may be calculated in a manner similar to that of above. The spatial filter shown in FIG. 50 is provided for subtracting the smoothed value of the 7×3 window W73a having the pixel P41 in the center thereof from the smoothed value of the 7×3 window W73 having the pixel P44 in the center thereof, and the spatial filter shown in FIG. 51 is provided for subtracting the smoothed value of the 7×3 window W73b having the pixel P47 in the center thereof from the smoothed value of the 7×3 window W73.

In the present preferred embodiment, the process for calculating the edge emphasis amount is as follows.

(1) Respective edge judgment amounts are calculated using the respective spatial filters shown in FIGS. 48 and 49, and there is obtained the maximum value of the absolute values of the calculated respective edge judgment values.

(2) When the maximum value calculated by the above process (1) is equal to or smaller than a predetermined threshold value TJ1 for edge judgment, it is judged as an image having a constant density, and a smoothed value is calculated using the 7×7 window W7, but the edge emphasis process is not performed. In the present preferred embodiment, the threshold value TJ1 for edge judgment is preferably four.

(3) When the maximum value obtained by the above process (1) is larger than the threshold value TJ1, it is judged that it is necessary to perform the edge emphasis process. Then, a smoothed value is calculated using the 5×5 window W5.

(4) Further, the edge component amounts are calculated using the first to eighth spatial filters shown in FIGS. 40 to 47, and the maximum one of the absolute values thereof is used as the edge emphasis amount among the edge component amounts calculated by the respective spatial filters.

(5) After the edge emphasis amount calculated by the above process (4) is multiplied by a predetermined edge emphasis ration smaller than $^{49}\!/_{12}$ calculated based on a ratio calculated from the number of pixels, the smoothed value calculated by the process (2) or (3) is added to the multiplication result thereof, resulting in recovered multi-value image data. In the preferred embodiment, the edge emphasis ratio is preferably 1.5.

In the above process (4), each of the number of pixels of the respective windows for calculating the smoothed values used in the first to fourth spatial filters is three times that used in each of the fifth to eighth spatial filters. Therefore, after the maximum one of the absolute values thereof among the edge component amounts calculated using the fifth to eighth spatial filters is multiplied by a predetermined conversion multiplication coefficient smaller than three by a multiplier VMC as described later, the product of the multiplication result thereof is compared with the maximum one of the absolute values thereof among the edge component amounts calculated in the first to fourth spatial filters. The reason why the conversion multiplication coefficient is set to a value smaller than a reciprocal value of the ratio of the number of pixels is that the dispersion thereof becomes larger in the case of calculating the edge component amounts using smaller windows. The above-mentioned conversion multiplication coefficient is preferably set to a predetermined value in a range from 2 to 2.5, and is more preferably set to 2.3.

As described above, since the dispersion becomes larger in the case of calculating the edge component amount using smaller windows, only relatively large windows are used in the ninth and tenth spatial filters used upon calculation of the edge judgment amount.

The composition and action of the respective sections of the half-tone data recovery section 101 will be described below with reference to FIG. 6. In Figs., a numeral of each data denotes the number of bits, and 7(s1) denotes data of 7 bits including one sign bit.

Among the pixel data outputted from the 9×9 matrix memory 100, data DW87 within an 8×8 window having the specified pixel P44 in the center thereof are inputted to an edge component calculation circuit 201. The edge component calculation circuit 201 comprises a first calculation section 201a shown in FIG. 10, and a second calculation section 201b shown in FIG. 11. The edge component calculation circuit 201 is provided for calculating the edge component amounts using the above-mentioned first to eighth spatial filters, outputting to the multiplier 202 data of 7 bits including one sign bit which is the maximum one of the absolute values thereof among the calculated edge component amounts, calculating the edge judgment amount using the ninth and tenth spatial filters, and outputting to an input terminal A of a comparator 206 data of 6 bits which is the maximum one of the absolute values thereof among the calculated edge component amounts. Data of the threshold value TJ1 for edge judgment are inputted to an input terminal B of the comparator 206. When the maximum value of the absolute values of the edge judgment amounts is larger than the threshold value TJ1 for edge judgment, the comparator 206 judges that there is an edge in a predetermined area including the area of the specified pixel P44 and the area close thereto, and then, outputs an edge judgment signal having the high level to a selection signal terminal SEL of a selector 208 and a clear terminal CL of the multiplier 202. On the other hand, when the maximum value of the absolute values of the edge judgment amounts is equal to or smaller than the threshold value TJ1 for edge judgment, the comparator 206 judges that there is not any edge in the predetermined area including the area of the specified pixel P44 and the area close thereto, and then, outputs the edge judgment signal having the low level to the selection signal terminal SEL of the selector 208 and the clear terminal CL of the multiplier 202.

When the edge judgment signal having the low level is inputted to the multiplier 202, the multiplier 202 resets data of the maximum value of the edge component amount inputted to zero, and outputs data of zero as the edge emphasis amount to an input terminal A of the adder circuit 209. On the other hand, when the edge judgment signal having the high level is inputted to the multiplier 202, the multiplier 202 multiplies the data of the maximum value of the edge component amount inputted by the above-mentioned predetermined edge emphasis coefficient, and outputs data of the product of the multiplication result thereof as the edge emphasis amount to the input terminal A of the adder circuit 209.

On the other hand, pixel data DW5 of the window W5 outputted from the 9×9 matrix memory 100 are inputted to a 5×5 black pixel number counting circuit 203, which counts the number of black pixels within the window W5, and outputs data of 5 bits for representing the number of the black pixels through a multiplier 207 having a multiplication coefficient of two to an input terminal A of a selector 208. Further, pixel data DW7 of the window W7 outputted from the 9×9 matrix memory 100 are inputted to a 7×7 black pixel number counting circuit 204, which counts the number of black pixels within the window W7, and outputs data of 6 bits for representing the number of the black pixels to an input terminal B of the selector 208. In response to the edge judgment signal having the high level, the selector 208 selects the data inputted to the input terminal A thereof, and outputs the selected data as a smoothed value to an input terminal B of the adder circuit 209. On the other hand, in response to the edge judgment signal having the low level, the selector 208 selects the data inputted to the input terminal B thereof, and outputs the selected data as a smoothed value to the input terminal B of the adder circuit 209. The reason why the output of the counting circuit 203 is multiplied by two by the multiplier 207 is that the number of the pixels within the window W7 is about twice the number of the pixels within the window W5, thereby performing normalization of the smoothed value.

The adder circuit 209 adds the edge emphasis amount of 7 bits including one sign bit to the smoothed value of 6 bits, rounds off data of 8 bits of the sum result thereof so that data smaller than zero are set to zero and data larger than 64 are set to 63, cuts off the least significant bit (referred to as an LSB hereinafter) of one bit, thereby calculating data of 5 bits in a range from zero to 31, and then, outputs data of the calculation result thereof as the recovered multi-value image data of the half-tone image to the half-tone data interpolation section 104.

(5-2) 5×5 Black pixel number counting circuit

Figure 7:
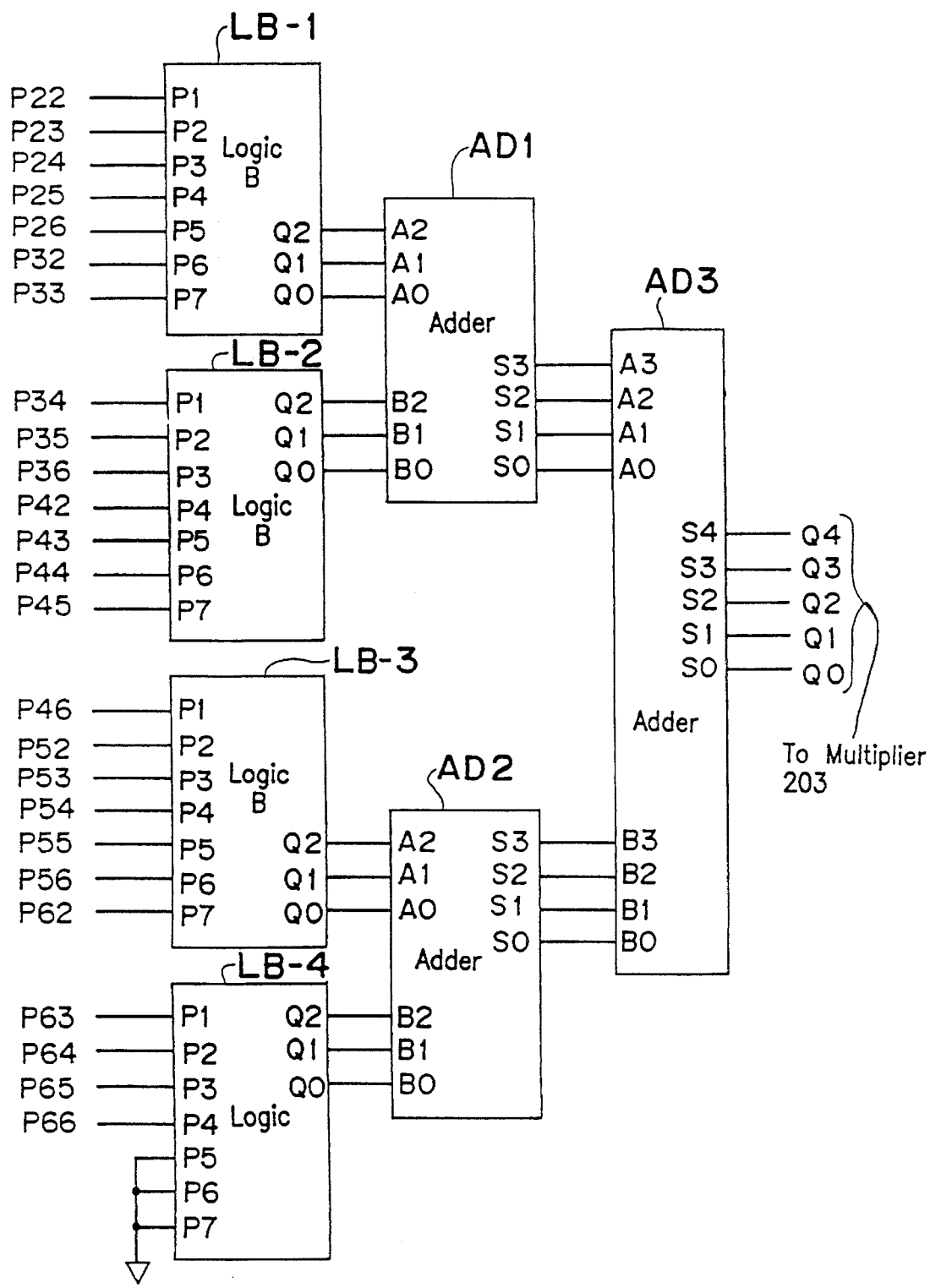
FIG. 7 is a schematic block diagram showing a 5× 5 black pixel counting circuit shown in FIG. 6.

FIG. 7 shows the 5×5 black pixel number counting circuit 203 shown in FIG. 6.

Referring to FIG. 7, the 5×5 black pixel number counting circuit 203 comprises four logic B circuits LB-1 to LB-4 (shown in FIG. 8) each performing a predetermined logical calculation (referred to as a logic B calculation hereinafter), and three adders AD1 to AD3. Pixel data of 7 bits P22 to P26, P32 and P33 outputted from the 9×9 matrix memory 100 are inputted to the logic B circuit LB-1, and pixel data of 7 bits P34 to 36 and P42 to P45 outputted from the 9×9 matrix memory 100 are inputted to the logic B circuit LB-2. Each of the logic B circuits LB-1 and LB-2 performs the logic B calculation, and then, outputs data of 3 bits of the calculation result thereof to the adder AD1. Further, pixel data of 7 bits P46, P52 to P56 and P62 are inputted to the logic B circuit LB-3, and pixel data of 4 bits P63 to P66 are inputted to the LSB of 4 bits of the input terminal of the logic B circuit LB-4. Each of the logic B circuits LB-3 and LB-4 performs the logic B calculation, and then, outputs data of 3 bits of the calculation result thereof to the adder AD2. The most significant bits (referred to as MSB hereinafter) of 3 bits of the input terminal of the logic B circuit LB-4 is connected to ground, and data of zero are inputted thereto. Respective data each of 3 bits outputted from the logic B circuits LB-1 to LB-4 are added to each other by the three adders AD1 to AD3, and data of 5 bits of the addition result thereof are outputted from the adder AD3 to the multiplier 203.

Figure 8:
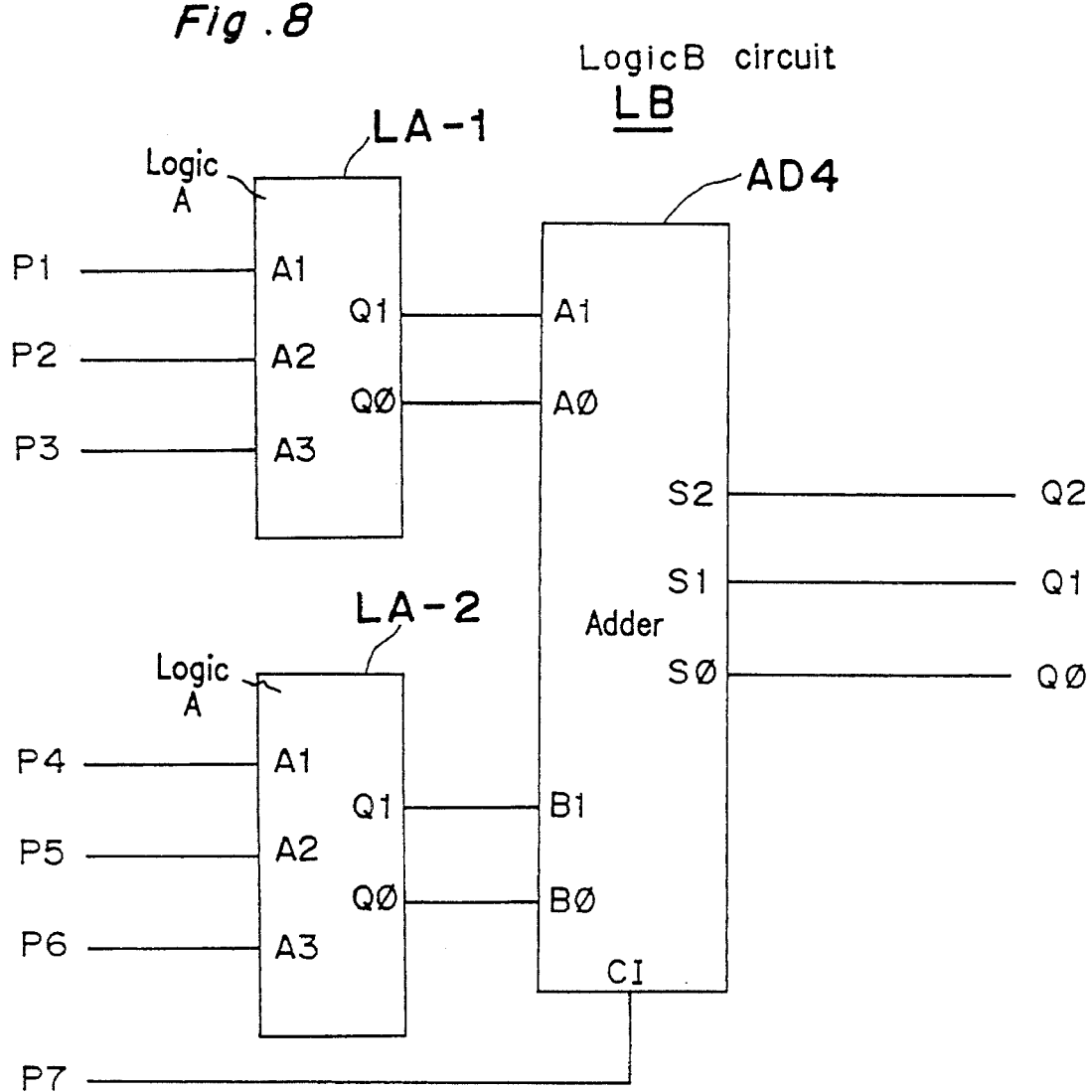
FIG. 8 is a schematic block diagram showing a logic B circuit shown in FIGS. 7, 9, 11, 12 and 13.

FIG. 8 shows the logic B circuit LB shown in FIG. 7, and the logic B circuits LB shown in FIGS. 9, 11, 12 and 13 have the same composition as that shown in FIG. 8.

Referring to FIG. 8, the logic B circuit LB is provided for calculating the predetermined logic B calculation, and thereafter, outputting data of 3 bits Q1, Q2 and Q3 of the calculation result thereof for representing the number of bits of "1" or a black pixel in the inputted data of 7 bits, and comprises two logic A circuits LA-1 and LA-2 each calculating a predetermined logic calculation represented by the following equations (2) and (3), and an adder AD4.

$$Q0 = A1 \cdot A2 \cdot A3 \; \overline{A1} \cdot \overline{A2} \cdot A3 \; A1 \cdot \overline{A2} \cdot \overline{A3} \quad (2)$$
$$\overline{A1} \cdot A2 \cdot \overline{A3}$$

$$Q1 = A1 \cdot A2 \cdot \overline{A3} \; \overline{A1} \cdot A2 \cdot A3 \; A1 \cdot \overline{A2} \cdot A3 \quad (3)$$
$$A1 \cdot A2 \cdot A3$$
$$= A1 \cdot A2 \; A2 \cdot A3 \; A3 \cdot A1$$

Data P1 to P3 of the LSB of 3 bits are inputted to the logic A circuit LA-1, data P4 to P6 of 3 bits higher from the data P1 to P3 are inputted to the logic A circuit LA-2, and data P7 of the MSB of one bit are inputted to a carry-in terminal CI of the adder AD4. After each of the logic A circuits LA-1 and LA-2 performs the logic A calculation for the inputted data of 3 bits, data of 2 bits of the calculation result thereof are outputted to an adder AD4. The adder AD4 adds the inputted two data each data of 2 bits, and outputs data of 3 bits of the addition result thereof.

(5-3) 7×7 Black pixel number counting circuit

Figure 9:
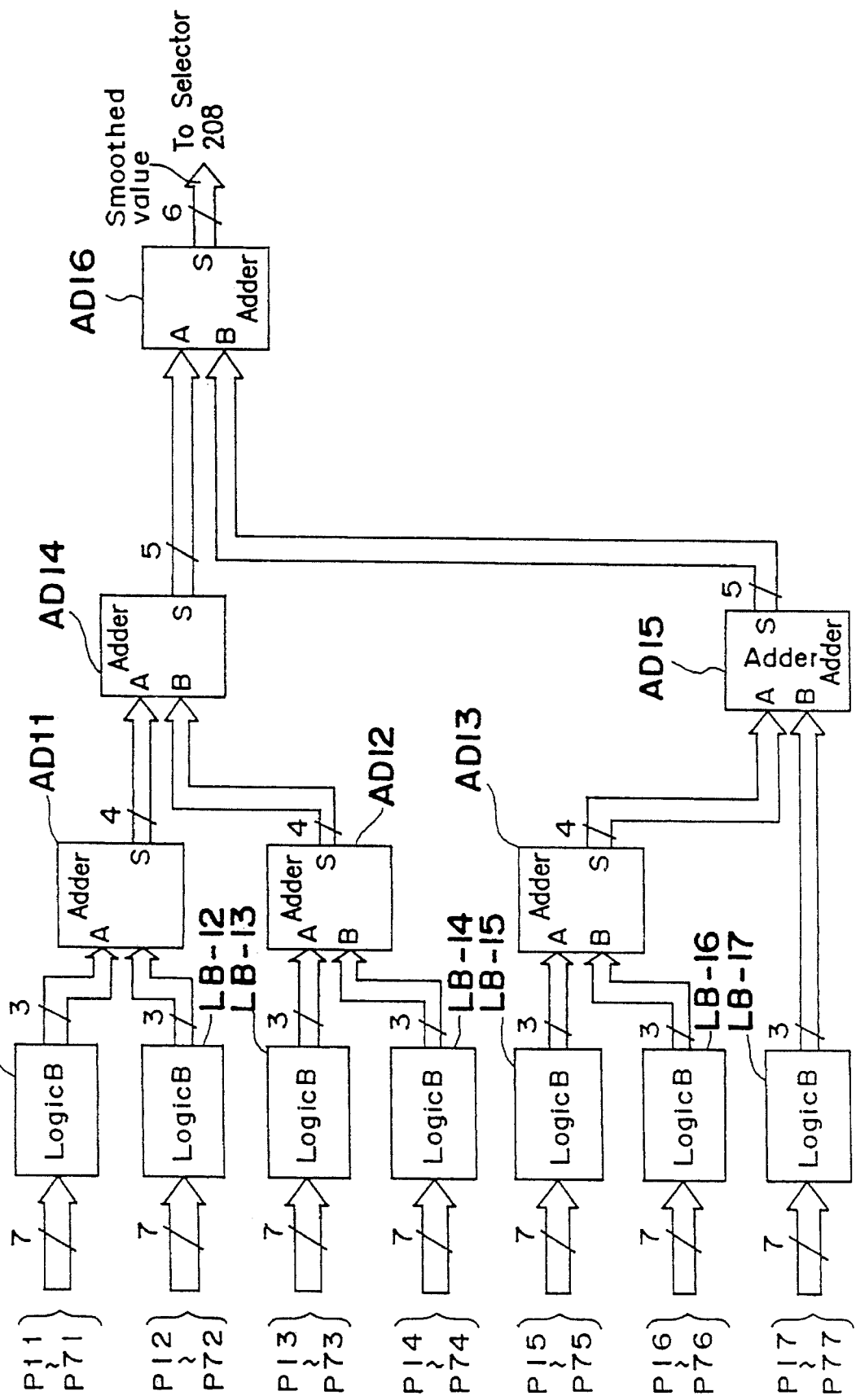
FIG. 9 is a schematic block diagram showing a 7× 7 black pixel counting circuit shown in FIGS. 6 and 15.
Figure 15:
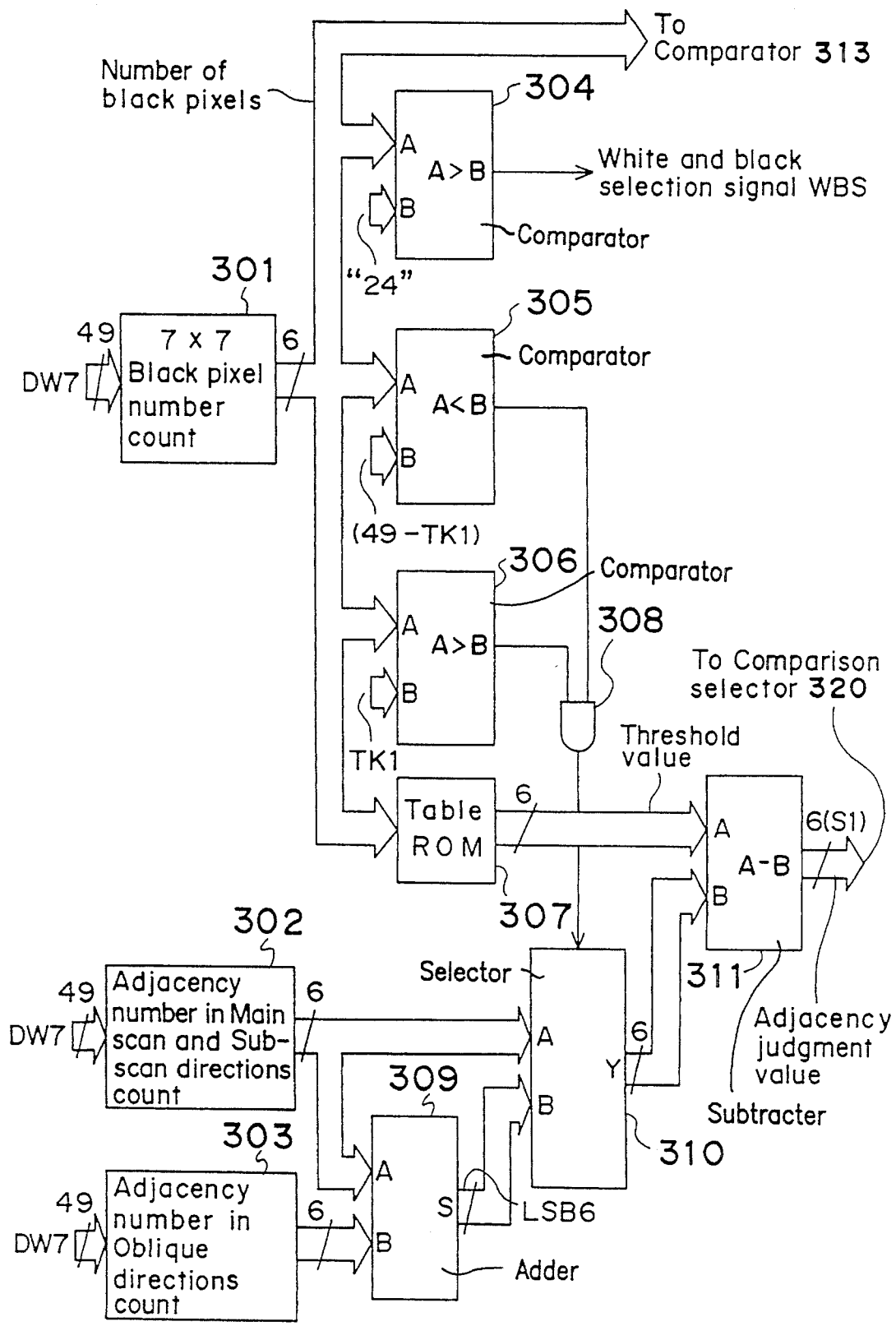
FIG. 15 is a schematic black diagram showing a first calculation section of an image area judgment section shown in FIGS. 3 and 4.

FIG. 9 shows the 7×7 black pixel number counting circuit 204 shown in FIG. 6, and a 7×7 black pixel number counting circuit 301 has the same structure as that shown in FIG. 15.

Referring to FIG. 9, the pixel data P11 to P71 of 7 bits on the subscanning line of j=1 outputted from the 9×9 matrix memory 100 are inputted to the logic B circuit LB-11, the pixel data P12 to P72 of 7 bits on the subscanning line of j=2 outputted from the 9×9 matrix memory 100 are inputted to the logic B circuit LB-12, the pixel data P13 to P73 of 7 bits on the subscanning line of j=3 outputted from the 9×9 matrix memory 100 are inputted to the logic B circuit LB-13, and the pixel data P14 to P74 of 7 bits on the subscanning line of j=4 outputted from the 9×9 matrix memory 100 are inputted to the logic B circuit LB-14. Each of the logic B circuits LB-11 to LB-14 performs the above-mentioned logic B calculation for the inputted data, and then, outputs data of 3 bits of the calculation result thereof to the adders AD11 and AD12, respectively. Further, the pixel data P15 to P75 of 7 bits on the subscanning line of j=5 outputted from the 9×9 matrix memory 100 are inputted to the logic B circuit LB-15, the pixel data P16 to P76 of 7 bits on the subscanning line of j=6 outputted from the 9×9 matrix memory 100 are inputted to the logic B circuit LB-16, and the pixel data P17 to P77 of 7 bits on the subscanning line of j=7 outputted from the 9×9 matrix memory 100 are inputted to the logic B circuit LB-17. Each of the logic B circuits LB-15 to LB-17 performs the above-mentioned logic B calculation for the inputted data, and then, outputs data of 3 bits of the calculation result thereof to the adders AD13 and AD15. The data, each of 3 bits, outputted from the logic B circuit LB-11 to LB-17 are added to each other by the adders AD11 to AD16, and then, data of 6 bits of the addition result thereof are outputted as a smoothed value to the selector 208.

(5-4) Edge component counting circuit

Figure 10:
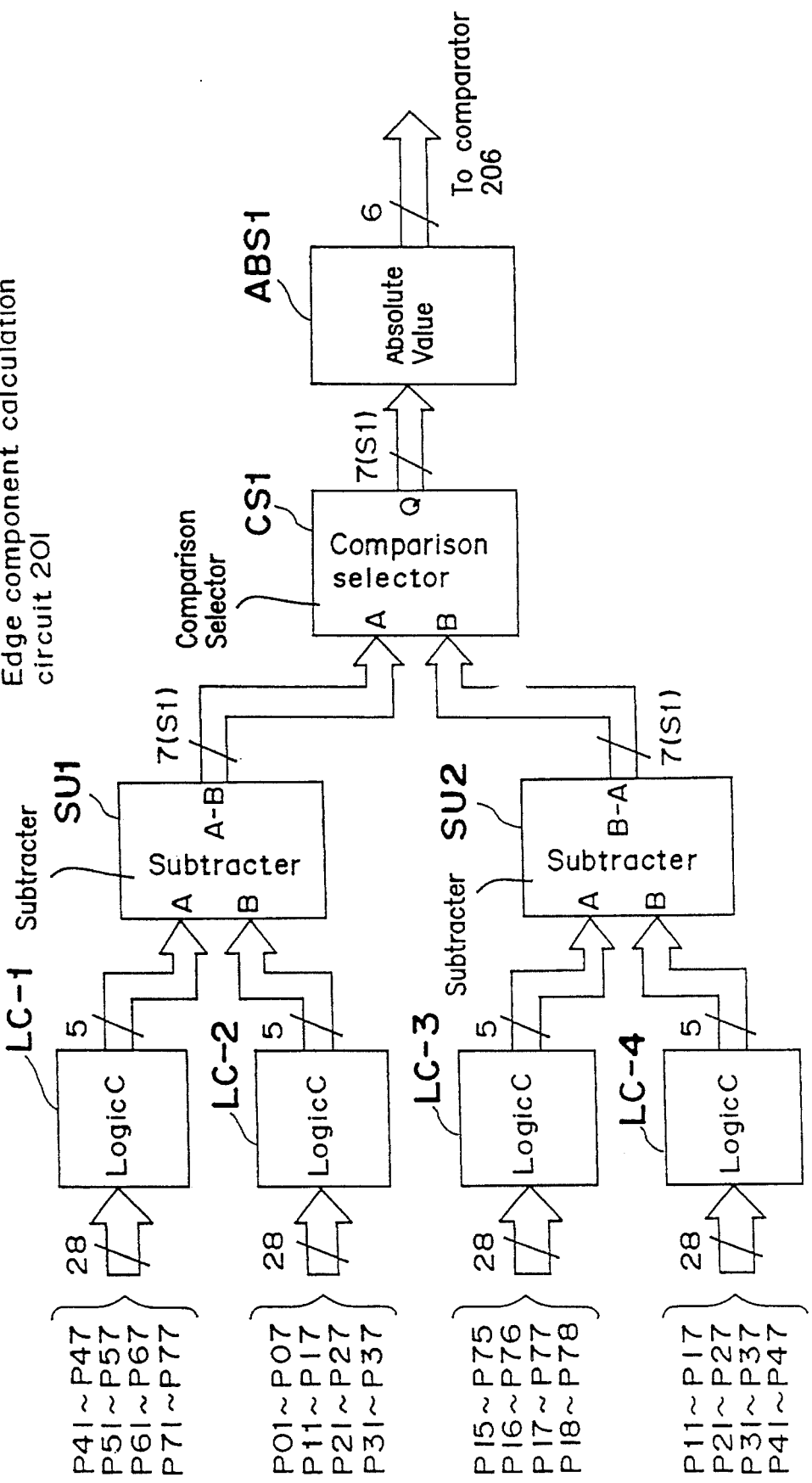
FIG. 10 is a schematic block diagram showing a first calculation section of an edge component calculation section shown in FIG. 6.

FIG. 10 shows the first calculation section 201a of the edge component calculation circuit 201 shown in FIG. 6.

The first calculation section 201a of the edge component calculation circuit 201 is provided for calculating the maximum value of the absolute value of the edge judgment amount, and comprises four logic C circuits LC-1 to LC-4 shown in FIG. 12 each performing a predetermined logical calculation (referred to as a logical C calculation hereinafter), two subtracters SU1 and SU2, a comparison selector CS1, and an absolute value calculation circuit ABS1. The ninth spatial filter shown in FIG. 48 is constituted by the two logic C circuit LC-1 and LC-2 and the subtracter SU1, and the tenth spatial filter shown in FIG. 49 is constituted by the two logic C circuit LC-3 and LC-4 and the subtracter SU2.

As shown in FIG. 10, pixel data of 28 bits within the window W47 shown in FIG. 48 are inputted to the logic C circuit LC-1, pixel data of 28 bits within the window W47a shown in FIG. 48 are inputted to the logic C circuit LC-2. Each of the logic C circuit LC-1 and LC-2 performs the predetermined logic C calculation for the inputted data, and then, outputs data, each of 5 bits, of the calculation result thereof to input terminals A and B of the subtracter SU1, respectively. The subtracter SU1 subtracts the data inputted to the input terminal B from the data inputted to the input terminal A, and outputs data of 7 bits of the subtraction result, including one sign bit to the comparison selector CS1. Further, the pixel data of 28 bits within the window 74a shown in FIG. 49 are inputted to the logic C circuit LC-3, the pixel data of 28 bits within the window W74 shown in FIG. 49 are inputted to the logic C circuit LC-4. Each of the logic C circuits LC-3 and LC-4 performs the above-mentioned logic C calculation for the inputted data, and then, outputs data, each of 5 bits, of the calculation result thereof to input terminals A and B of the subtracter SU2, respectively. The subtracter SU2 subtracts the data inputted to the input terminal A from the data inputted to the input terminal B, and then, outputs data of 7 bits of the subtraction result including one sign bit to the comparison selector CS1. Further, the comparison selector CS1 selects data having a larger absolute value by comparing the inputted two data, and outputs the selected data through the absolute value calculation circuit ABS1 for calculating the absolute value of the inputted data and outputting them, to the comparator 206 as data of the maximum value of the absolute values of the edge judgment amounts.

Figure 11:
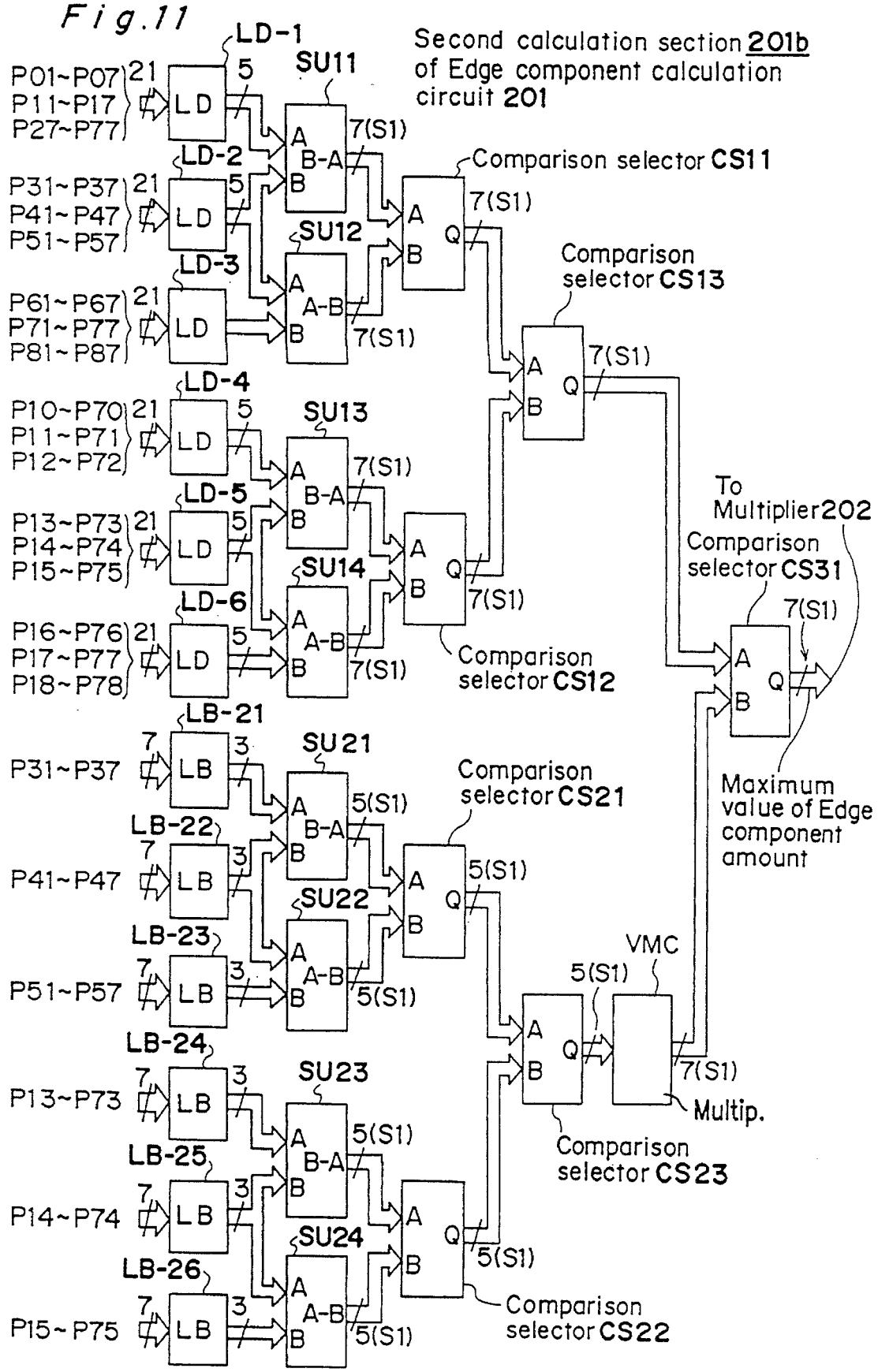
FIG. 11 is a schematic block diagram showing a second calculation section of an edge component calculation section shown in FIG. 6.

FIG. 11 shows the second calculation section 201b of the edge component calculation circuit 201 shown in FIG. 6.

In the present preferred embodiment, in order to obtain a final edge component amount from a plurality of edge component amounts, there is used a method for selecting the maximum one of the value among them in the preferred embodiment. The reason why this method is used is as follows. In the case of the multi-value image data, there has been generally used a filter for calculating a sum of edge component amounts in respective directions such as a Laplacian filter. However, since binary image data of the pseudo half-tone image include a component of the texture of the pseudo half-tone image, they often include a relatively large error component, and this is different from that in the case of the multi-value image data. This is caused from such an essential problem that the value of each pixel of the multi-value image data does not accurately represent a gradation value. Namely, these noise components caused in a direction in which an edge component is certainly outputted can be neglected, however, the noise component caused in another direction in which any edge component is not outputted can not be neglected. If a sum of the edge component amounts in a plurality of directions is calculated, there is such a possibility that the added value of the noise components may influence the original edge component amount.

The second calculation section 201b of the edge component calculation section 201 is provided for calculating the maximum value of the edge component amounts, and comprises six logic C circuits LD-1 to LD-6 shown in FIG. 13 each performing a predetermined logical calculation (referred to as a logic D calculation hereinafter), six logic B circuits LB-21 to LB-26, eight subtracters SU11 to SU14 and SU21 to SU24, seven comparison selectors CS11 to CS13, CS21 to CS23 and CS31, and the multiplier VMC for multiplying the inputted data by a multiplication coefficient of two and outputting the product thereof.

The first spatial filter shown in FIG. 40 is constituted by the two logic D circuits LD-1 and LD-2 and the subtracter SU11, and the second spatial filter shown in FIG. 41 is constituted by the two logic D circuits LD-2 and LD-3 and the subtracter SU12. The third spatial filter shown in FIG. 42 is constituted by the two logic D circuits LD-4 and LD-5 and the subtracter SU13, and the fourth spatial filter shown in FIG. 43 is constituted by the two logic D circuits LD-5 and LD-6 and the subtracter SU14. Further, the seventh spatial filter shown in FIG. 46 is constituted by the two logic B circuits LB-21 and LB-22 and the subtracter SU21, and the eighth spatial filter shown in FIG. 47 is constituted by the two logic B circuits LB-22 and LB-23 and the subtracter SU22. Furthermore, the fifth spatial filter shown in FIG. 44 is constituted by the two logic B circuits LB-24 and LB-25 and the subtracter SU23, and the sixth spatial filter shown in FIG. 45 is constituted by the two logic B circuits LB-25 and LB-26 and the subtracter SU24.

Each of the logic D circuits LD-1 to LD-6 performs the above-mentioned logic D calculation for the inputted pixel data of 21 bits, and then, outputs data of 5 bits of the calculation result thereof. Each of the subtracters SU11, SU13, SU21 and SU23 subtracts data of 5 bits inputted to the input terminal A from the data of 5 bits inputted to the input terminal B, and then, outputs the data of 7 bits of the subtraction result thereof including one sign bit. On the other hand, each of the subtracters SU12, SU14, SU22 and SU24 subtracts data of 5 bits inputted to the input terminal B from the data of 5 bits inputted to the input terminal A, and then, outputs data of 7 bits of the subtraction result thereof including one sign bit. Further, each of the comparison selectors CS11 to CS13, CS21 to CS23 and CS31 selects the maximum value of the absolute values thereof among the inputted two data, and then, outputs the selected data of 7 bits including one sign bit.

As shown in FIG. 11, the pixel data of 21 bits within the window W37a shown in FIG. 40 are inputted to the logic D circuit LD-1, and then, data outputted from the logic D circuit LD-1 are inputted to an-input terminal A of the subtracter SU11. Further, the pixel data of 21 bits within the window SU11 shown in FIGS. 40 and 41 are inputted to the logic D circuit LD-2, and then, data outputted from the logic D circuit LD-2 are inputted to an input terminal B of the subtracter SU11 and an input terminal A of the subtracter SU12. Furthermore, the pixel data of 21 bits within the window W37b shown in FIG. 41 are inputted to the logic D circuit LD-3, and then, data outputted from the logic D circuit LD-3 are inputted to an input terminal B of the subtracter SU12. The respective data outputted from the subtracters SU11 and SU12 are inputted to the comparison selector CS11, and then, data outputted from the comparison selector CS11 are inputted to the comparison selector CS13.

The pixel data of 21 bits within the window W73a shown in FIG. 42 are inputted to the logic D circuit LD-4, and then, data outputted from the logic D circuit LD-4 are inputted to an input terminal A of the subtracter SU13. Further, the pixel data of 21 bits within the window W73 shown in FIGS. 42 and 43 are inputted to the logic D circuit LD-5, and then, data outputted from the logic D circuit LD-5 are inputted to an input terminal B of the subtracter SU13 and an input terminal A of the subtracter SU14. Furthermore, the pixel data of 21 bits within the window W73b shown in FIG. 43 are inputted to the logic D circuit LD-6, and then, data outputted from the logic D circuit LD-6 are inputted to an input terminal B of the subtracter SU14. The respective data outputted from the subtracters SU13 and SU14 are inputted to the comparison selector CS12, and then, the data outputted from the comparison selector CS12 are inputted to the comparison selector CS13.

Further, the data outputted from the comparison selector CS13 are inputted to the comparison selector CS31.

The pixel data of 7 bits within the window W17a shown in FIG. 46 are inputted to the logic B circuit LB-21, and then, the data outputted from the logic B circuit LB-21 are inputted to an input terminal A of the subtracter SU21. Further, the pixel data of 7 bits within the window W17 shown in FIGS. 46 and 47 are inputted to the logic B circuit LB-22, and then, the data outputted from the logic B circuit LB-22 are inputted to an input terminal B of the subtracter SU21 and an input terminal A of the subtracter SU22. Further, the pixel data of 7 bits within the window W17b shown in FIG. 47 are inputted to the logic B circuit LB-23, and then, the data outputted from the logic B circuit LB-23 are inputted to an input terminal B of the subtracter SU22. The respective data outputted from the subtracters SU21 and SU22 are inputted to the comparison selector CS21, and then, the data outputted from the comparison selector CS21 are inputted to the comparison selector CS23.

The pixel data of 7 bits within the window W71a shown in FIG. 44 are inputted to the logic B circuit LB-24, the data outputted from the logic B circuit LB-24 are outputted to an input terminal A of the subtracter SU23. The pixel data of 7 bits within the window W71 shown in FIGS. 44 and 45 are inputted to the logic B circuit LB-24, and then, the data outputted from the logic B circuit LB-24 are inputted to an input terminal B of the subtracter SU23 and an input terminal A of the subtracter SU24. Further, the pixel data of 7 bits within the window W71b shown in FIG. 45 are inputted to the logic B circuit LB-26, and then, the data outputted from the logic B circuit LB-26 are inputted to an input terminal B of the subtracter SU24. The respective-data outputted from the subtracters SU23 and SU24 are inputted to the comparison selector CS22, and then, the data outputted from the comparison selector CS22 are inputted to the comparison selector CS23.

The data outputted from the comparison selector CS23 are inputted through the multiplier VMC to the comparison selector CS31, which outputs the comparison-selected data of 7 bits including one sign bit to the multiplier 202.

In the second calculation section 201b constituted as described-above, respective data of the edge component amounts of the calculation result of the first to fourth spatial filters, the calculation result of the seventh to eighth spatial filters and the calculation result of the fifth to sixth spatial filters are outputted from the subtracters SU11 to SU14 and SU21 to SU24, respectively. Respective data of the edge component amounts obtained by the fifth to eighth spatial filters are converted and normalized so as to correspond to twice the respective data of the edge component amounts obtained by the first to fourth spatial filters, and then, data of the maximum value of the absolute values are selected by the comparison selectors CS11 to CS13, CS21 to CS23 and CS31 among the respective data of the normalized edge component amounts, and are outputted from the comparison selector CS31 to the multiplier 202.

Figure 12:
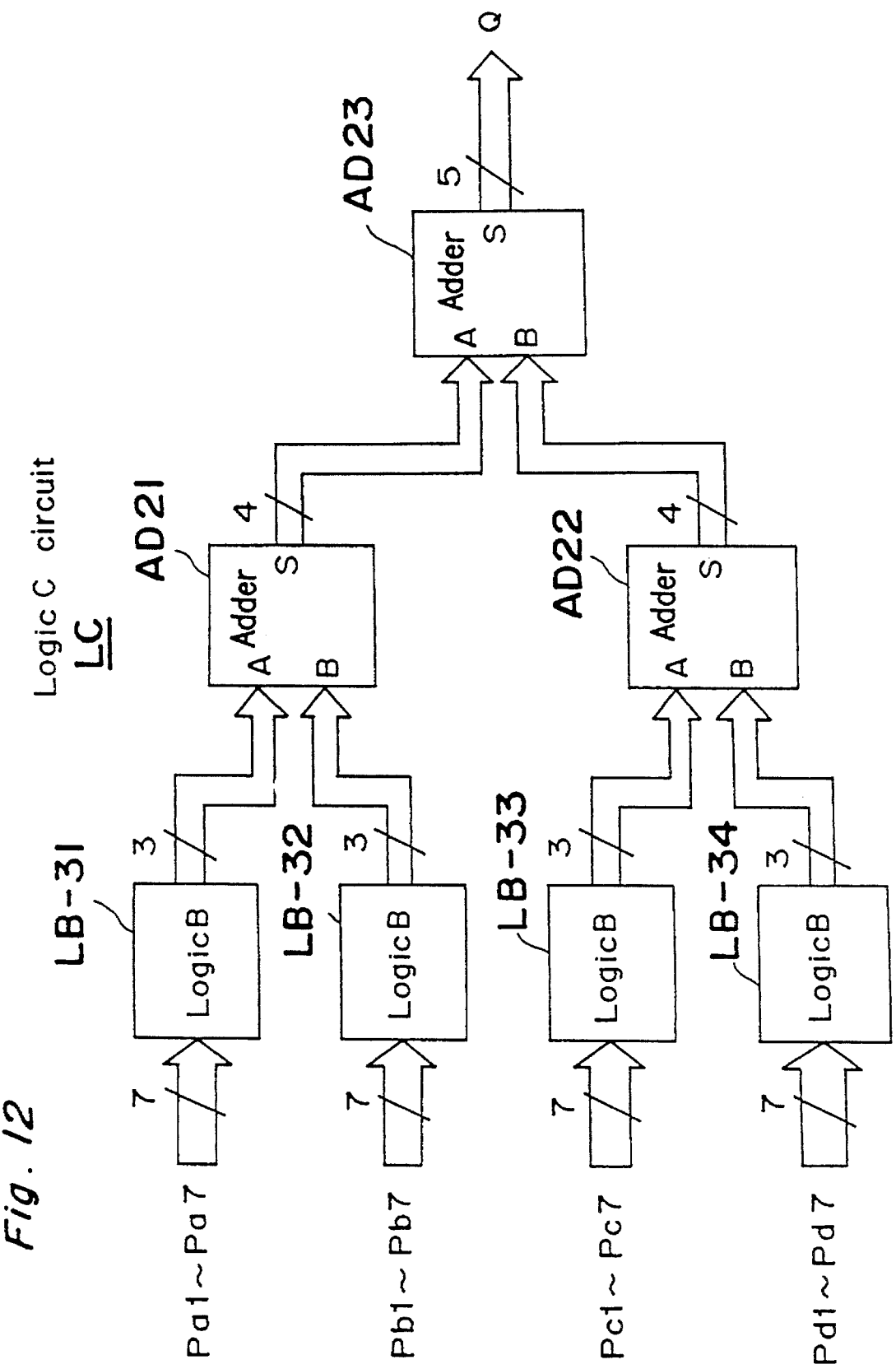
FIG. 12 is a schematic block diagram showing a logic C circuit shown in FIG. 10.

FIG. 12 shows the logic C circuit LC shown in FIG. 10. The logic C circuit LC is provided for counting a bit number of "1" or black pixel within the inputted data of 28 bits, and as shown in FIG. 12, comprises four logic B circuits LB-31 to LB-34 each having a composition shown in FIG. 8, and three adders AD21 to AD23. Inputted data each of 7 bits are inputted to the logic B circuits LB-31 to LB-34, respectively, and the respective data outputted from the logic B circuits LB-31 to LB-34 are added to each other by the adders AD21 to AD23, and then, the data of 5 bits of the addition result thereof are outputted as the data of the calculation result of the logic C circuit LC.

Figure 13:
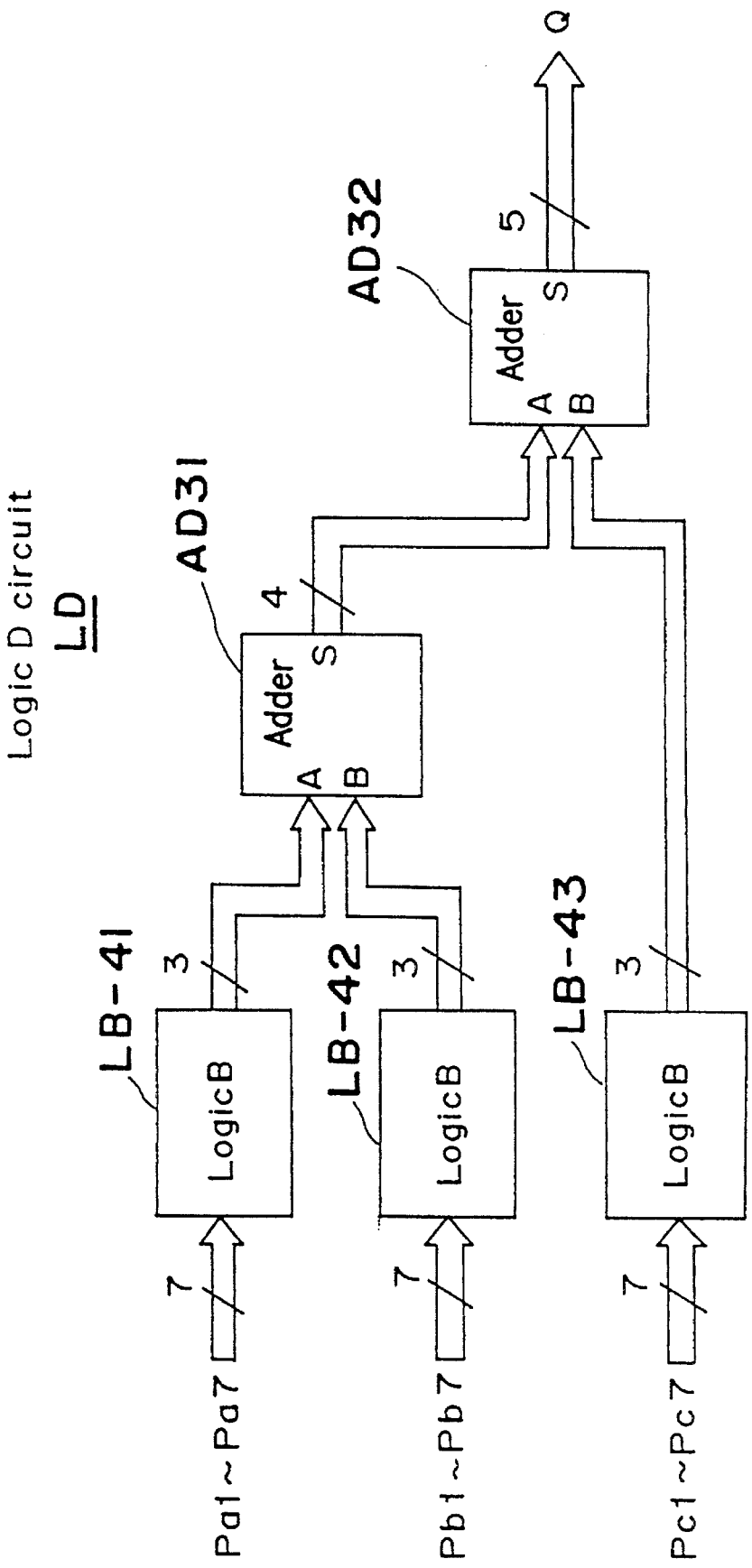
FIG. 13 is a schematic block diagram showing a logic D circuit shown in FIG. 11.

FIG. 13 shows the logic D circuit LD shown in FIG. 11. The logic D circuit LD is provided for counting a number of bits of "1" or the black pixels within the inputted data of 21 bits. As shown in FIG. 13, the logic D circuit LD comprises three logic B circuits LB-41 to LB-43 each having a composition shown in FIG. 8, and two adders AD31 and AD32. Inputted data each of 7 bits are inputted to the logic B circuits LB-41 to LB-43, respectively, and after respective data outputted from the logic B circuits LB-41 to LB-43 are added to each other by the adders AD31 and AD32, the data of 5 bits of the addition result thereof are outputted as data of the calculation result of the logic D circuit LD.

(5-5) Adder circuit

Figure 14:
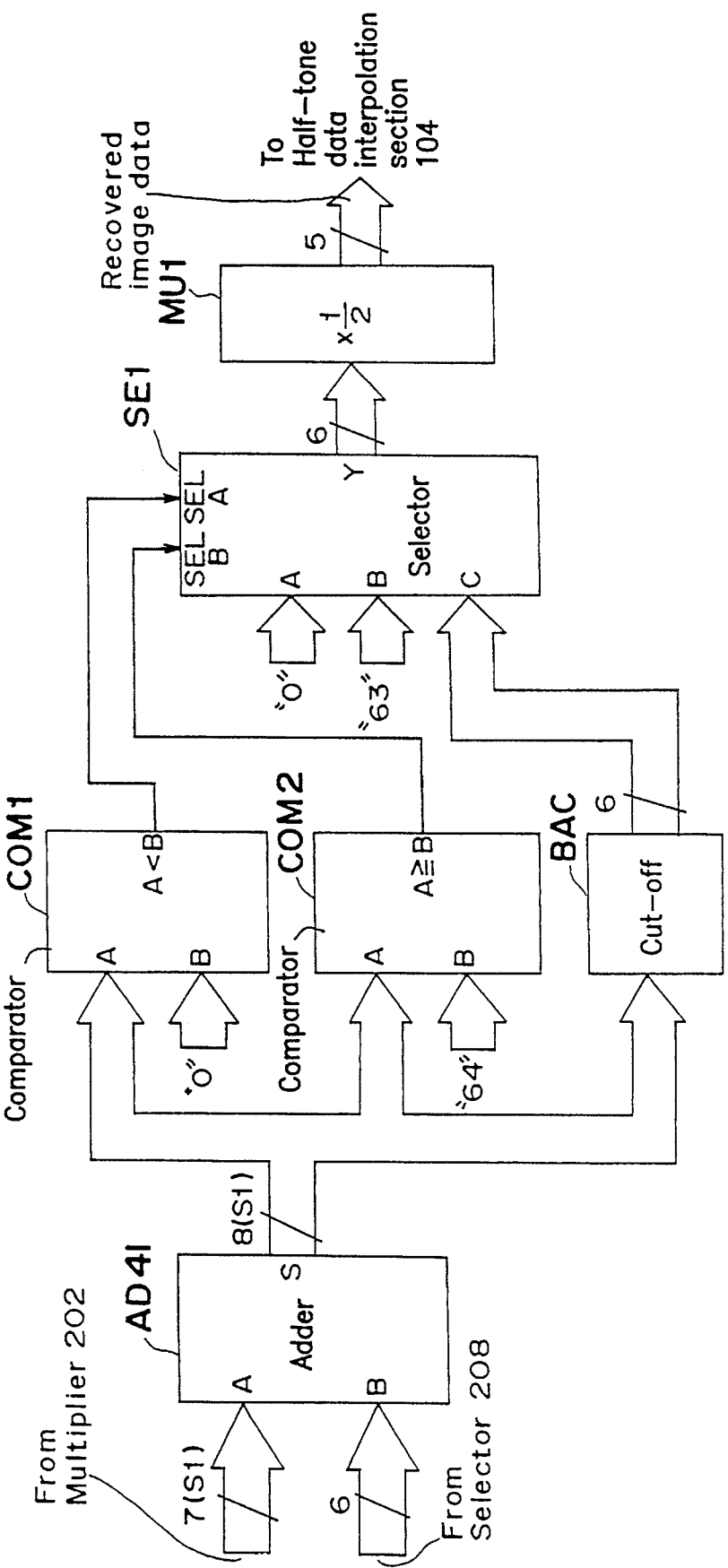
FIG. 14 is a schematic block diagram showing an adder circuit shown in FIG. 6.

FIG. 14 shows the adder circuit 209 shown in FIG. 6. The adder circuit 209 is provided for adding the edge emphasis amount of 7 bits including one sign bit and the smoothed value of 6 bits, and comprises an adder AD41, comparators COM1 and COM2, a bit cut-off circuit BAC for outputting cutting-off one sign bit and the MSB of one bit, a selector SE1, and a multiplier MU1 for multiplying the inputted data by a multiplication coefficient of ½ and outputting half the inputted data.

The data of the edge emphasis amount outputted from the multiplier 202 and the data of the smoothed value outputted from the selector 208 are inputted to the adder AD41. The data of 8 bits including one sign bit outputted from the adder AD41 are outputted to respective input terminals A of the selectors COM1 and COM2, and then, are outputted through the bit cut-off circuit BAC to the selector SE1. Data of zero are inputted to an input terminal B of the comparator COM1, and the comparator COM1 compares data inputted to the input terminal A with data inputted to the input terminal B.

When the data inputted to the input terminal A are smaller than the data inputted to the input terminal B, the comparator COM1 outputs a comparison result signal having the high level to an selection signal input terminal SELA of the selector SE1. On the other hand, when the data inputted to the input terminal A are equal to or larger than the data inputted to the input terminal B, the comparator COM1 outputs a comparison result signal having the low level to the selection signal input terminal SELA of the selector SE1. Further, data of "64" are inputted to an input terminal B of the comparator COM2, and the comparator COM2 compares data inputted to the input terminal A with data inputted to the input terminal B. When the data inputted to the input terminal A are equal to or larger than the data inputted to the input terminal B, the comparator COM2 outputs a comparison result signal having the high level to a selection signal input terminal SELB of the selector SE1. On the other hand, when the data inputted to the input terminal A are smaller than the data inputted to the input terminal B, the comparator COM2 outputs the comparison result signal having the low level to the selection signal input terminal SELB of the selector SE1. When the signal inputted to the selection signal input terminal SELA of the selector SE1 has the high level, the selector SE1 outputs data of "zero" inputted to the input terminal A. Further, when the signal inputted to the selection signal input terminal SELB of the selector SE1 has the high level, the selector SE1 outputs data of "64" inputted to the input terminal A. When both of the signals inputted to the selection signal input terminals SELA and SELB have the low level, the selector SE1 outputs the data of 6 bits inputted to the input terminal C. The data outputted from the selector SE1 are outputted through the multiplier MU1 to the half-tone data interpolation section 104 as the recovered multi-value image data of the half-tone image.

The adder circuit 209 constituted as described above adds the edge emphasis amount to the smoothed value, rounds off the sum of the addition result thereof so as to convert data of the sum smaller than zero into zero and data of the sum equal to or larger than 64 into 63, cuts off the LSB of one bit, calculates data of 5 bits having a value in range from zero to 31, and outputs the data of the calculation result thereof as the recovered multi-value of the half-tone image to the half-tone data interpolation section 104.

Figure 16:
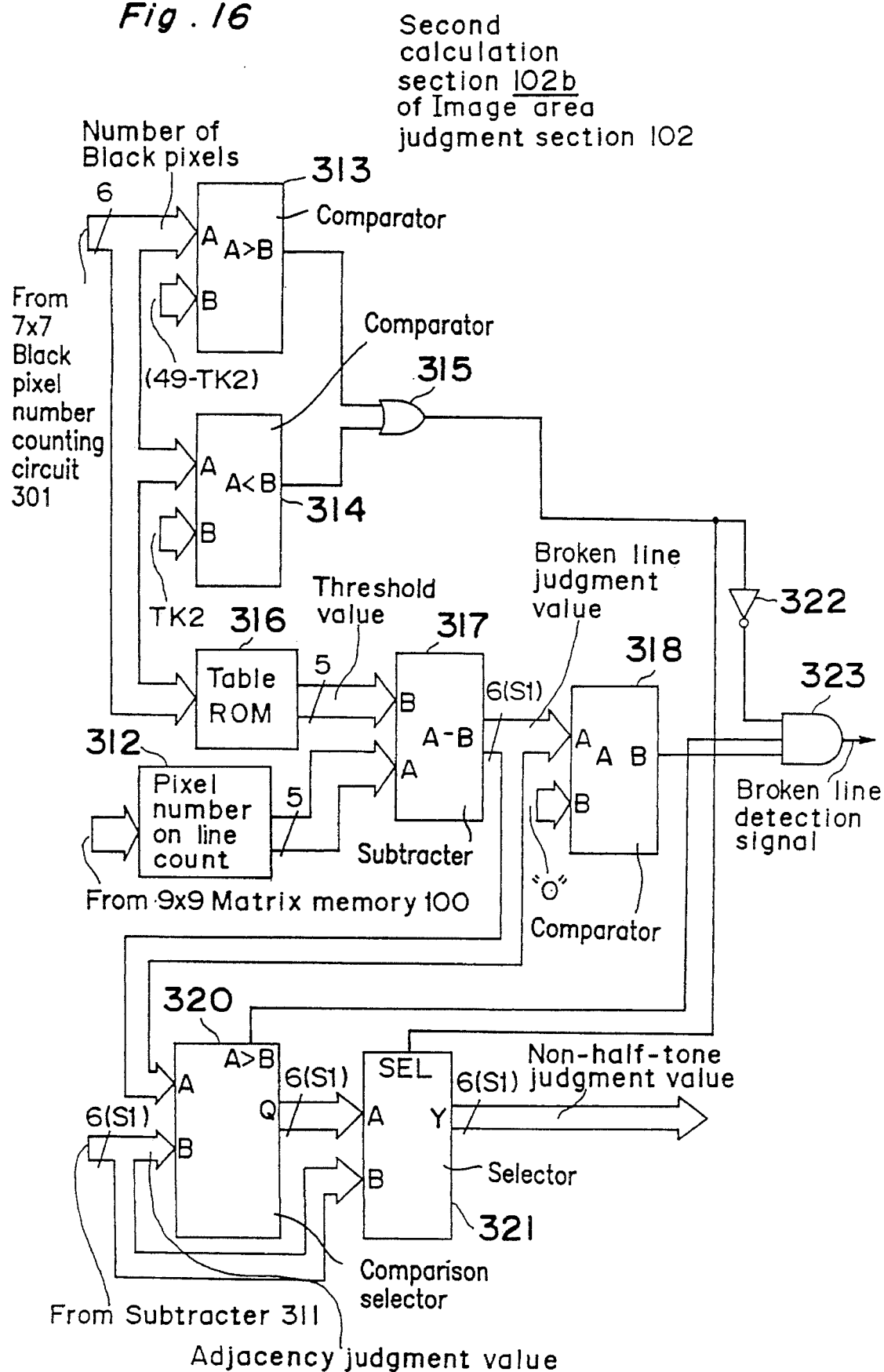
FIG. 16 is a schematic block diagram showing a second calculation section of the image area judgment section shown in FIGS. 3 and 4.
Figure 17:
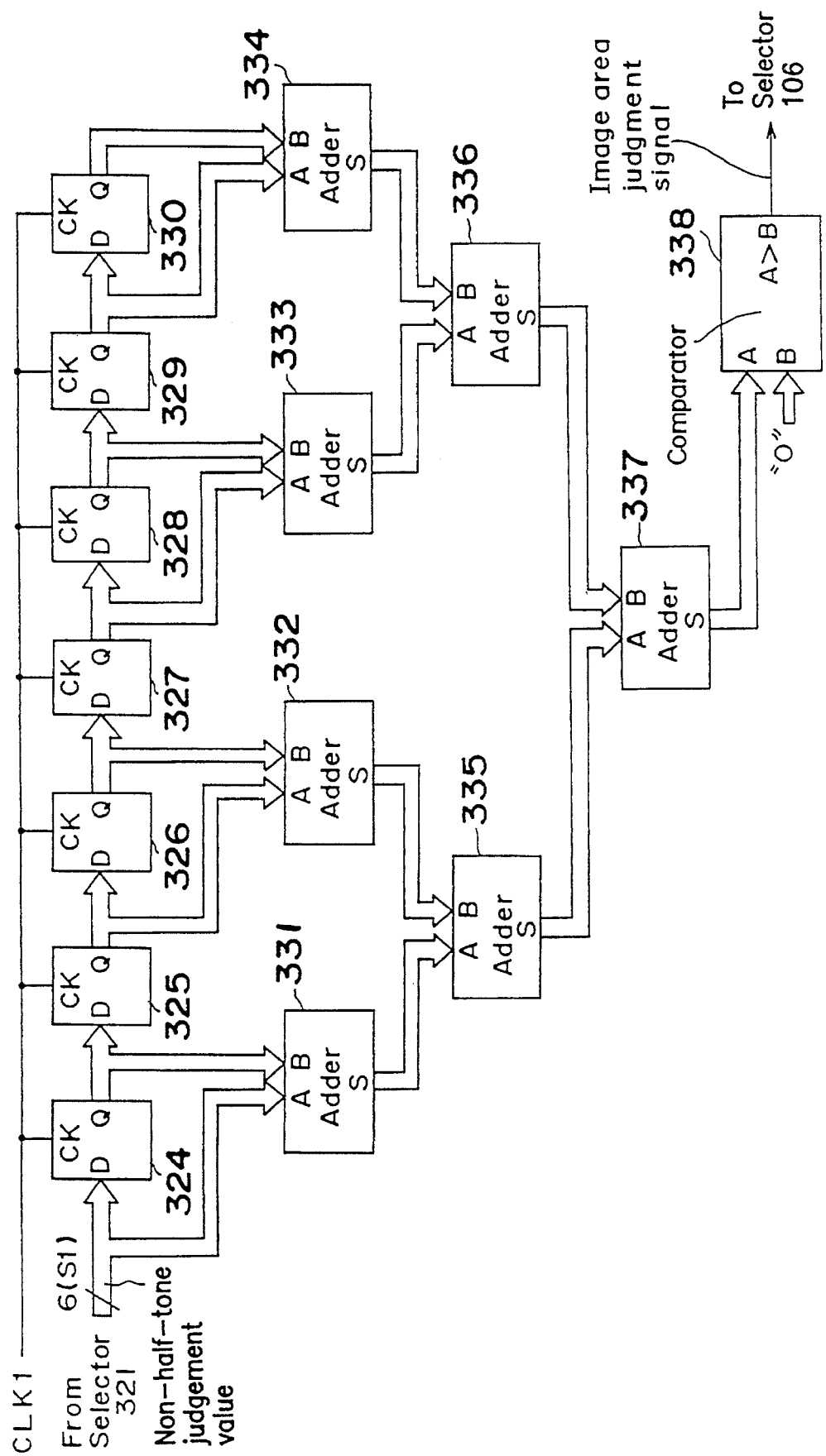
FIG. 17 is a schematic block diagram showing a third calculation section of the image area judgment section shown in FIGS. 3 and 4.

(6) Image area judgment section (6-1) Composition and Action of Respective sections FIGS. 15 to 17 show the image area judgment section 102 shown in FIG. 3, which comprises first to third calculation sections 102a, 102b and 102c. In the case of the recovery process of the above-mentioned half-tone data recovery section 101 for recovering multi-value image data from binary image data of the pseudo half-tone image, there is calculated the smoothed value of the 5×5 window or the 7×7 window. Therefore, information of fine images smaller than the width of 5 bits is not included in the information of the smoothed value, and when it is not the half-tone image, it is necessary to use the original image data as it is without performing the above-mentioned recovery process. Accordingly, it is necessary to provide the image area judgment section 102.

The principle for judging the image areas according to the present preferred embodiment will be described below.

Figure 52:
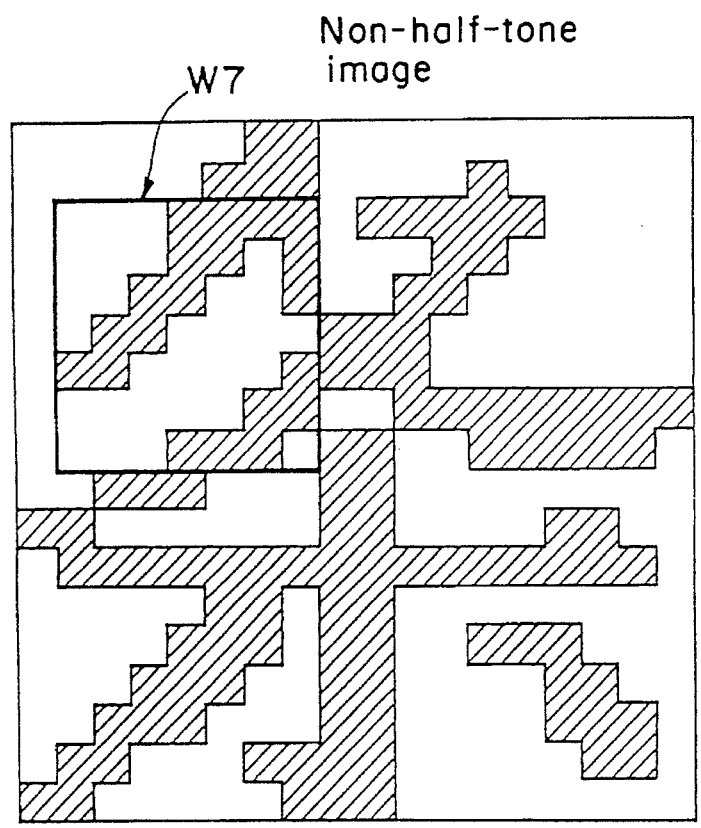
FIG. 52 is a front view showing one example of a non-half-tone image obtained when image data of character image are binarized using a predetermined threshold value.

FIG. 52 shows one example of non-half-tone image obtained by binarizing a read character image using a predetermined threshold value after reading the character image. As is clear from FIG. 52, there are 20 black pixels within the 7×7 window W7 having the specified pixel * in the center thereof.

Figure 53:
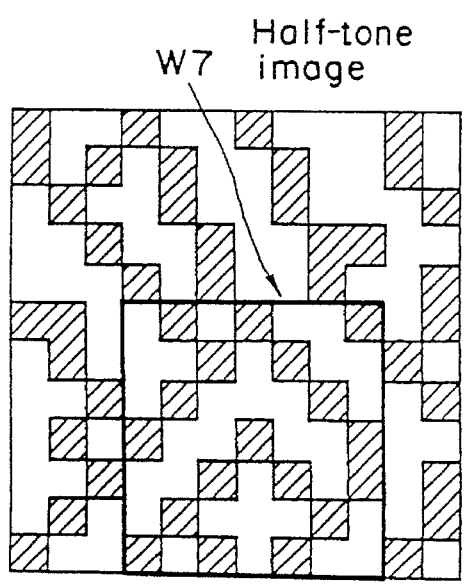
FIG. 53 is a front view showing one example of an image obtained when binarizing image data of a uniform density chart using a pseudo half-tone method for an error diffusion method.

FIG. 53 shows one example of a pseudo half-tone binarized image obtained when binarizing image data of a uniform density chart using a pseudo half-tone method for an error diffusion method. As is clear from FIG. 53, there are 20 black pixels within the 7×7 window W7 having the specified pixel * in the center thereof, similarly to the image shown in FIG. 52. By comparison between the two images shown in FIGS. 52 and 53, it is clear that the number of adjacencies of smaller pixels in the main scan and subscan directions in the image shown in FIG. 52 is completely different from that in the image shown in FIG. 53. The smaller pixel is a smaller number of pixels among the white and black pixels within the 7×7 window W7. For example, the smaller pixel is the black pixel in the image shown in FIGS. 52 and 53.

There can be suggested following three scales for representing the degree of adjacency (referred to as an adjacency degree hereinafter) in which a pixel is adjacent to the other pixels in the four directions of the main scan and subscan directions.

(1) Respective pixels of the same kind as the smaller pixel connected with the smaller pixel in at least one direction of the four directions of the main scan and subscan directions from the smaller pixel are referred to as a connection component hereinafter, and the number of pixels included in the connection component (referred to as a number of connected pixels hereinafter) is used as the adjacency degree. The number of connected pixels within the window W7 shown in FIG. 52 is 14, and the number of connected pixels within the window W7 shown in FIG. 53 is 2.

(2) A total number of the smaller pixels of the same kind not connected with smaller pixel (referred to as a number of not-connected pixels hereinafter) in at least one direction of the four directions of the main scan and subscan directions from the smaller pixel is used as the adjacency degree. The number of not-connected pixels within the window W7 shown in FIG. 52 is zero, and the number of not-connected pixels within the window W7 shown in FIG. 53 is 16.

(3) A total number of smaller pixels of the same kind connected with the smaller pixel in at least one direction of the four directions of the main scan and subscan directions from the smaller pixel (referred to as an adjacency number in the four directions hereinafter) is used as the adjacency degree. The adjacency number in the four directions within the window W7 shown in FIG. 52 is 19, and the adjacency number in the four directions within the window W7 shown in FIG. 53 are one.

If (1) the number of connected pixels is adopted as the adjacency degree, a circuit for counting the number of pixels included in the connection component becomes complicated. For example, in the case that the pixel data within the 7×7 window W7 are inputted as address data to pixel number table ROM and the above-mentioned number of connected pixels is outputted from the ROM as data, it is necessary to provide the ROM having a larger memory capacity. For example, it is difficult to constitute a counting circuit for counting the number of connected pixels using NAND gates and NOR gates. Further, since a counting circuit for counting (2) the number of not-connected pixels is more complicated than (3) that for counting the adjacency number in the four directions, (3) the adjacency number in the four directions is adopted as the adjacency degree in the present preferred embodiment.

Figure 54:
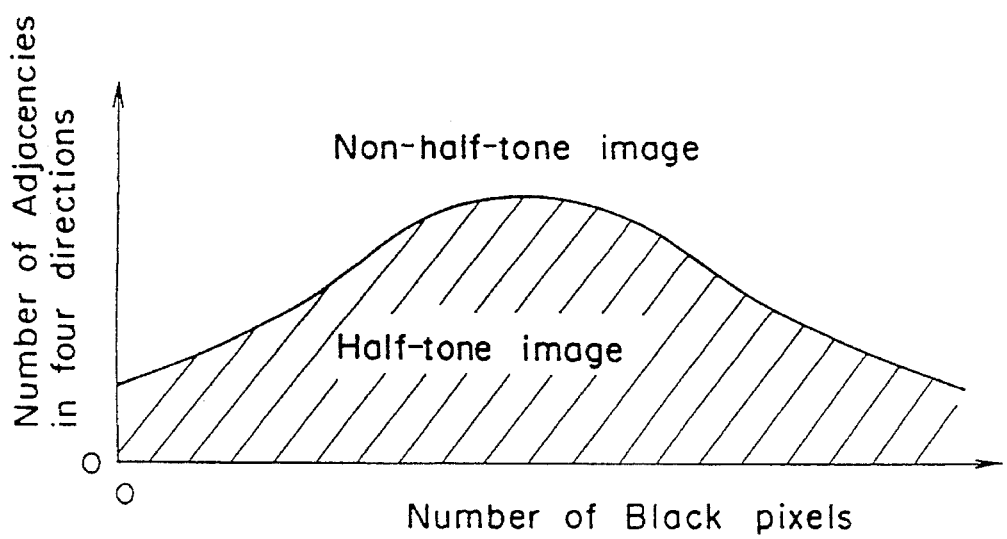
FIG. 54 is a front view showing a graph showing a adjacency number in the main scan and subscan directions on a number of black pixels within a 7×7 window.

FIG. 54 shows a relationship between the adjacency number in the four directions and the number of black pixels within the 7×7 window W7 having each pixel in the center thereof, in respective pixels located within typical non-half-tone images and typical half-tone image. As is clear from FIG. 54, there are an area of the non-half-tone image and another area of the half-tone image apart from each other on a plane defined by the number of black pixels and the adjacency number in the four directions. Namely, it is considered that the area of the non-half-tone image is located above a boundary of a threshold value given by the number of black pixels, and also the area of the half-tone image is located below the boundary. In the image area judgment process of the present preferred embodiment, it is judged to which area each pixel data within the 7×7 window W7 belongs with reference to FIG. 54 based on the number of black pixels and the adjacency number in the four directions within the window W7.

However, if the image area judgment process is performed only by judging to which area each pixel belongs, there are the following three problems.

Figure 55:
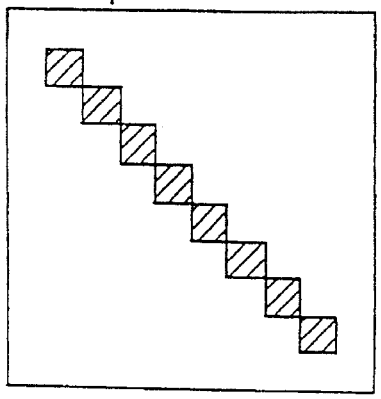
FIG. 55 is a front view showing one example of an image obtained when reading a fine line in an oblique direction.

(1) Since a fine line in an oblique direction is normally converted into, for example, image data shown in FIG. 55, the fine line is erroneously judged as the half-tone area. This problem is referred to as a first problem hereinafter.

Figure 56:
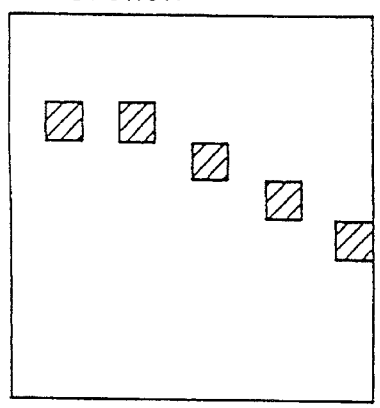
FIG. 56 is a front view showing one example of an image obtained when reading a broken line or a fine line or when performing a half-tone binarizing process for image data obtained by reading a straight line or a curve.

(2) In the case of reading a broken line and a fine line, or in the case of binarizing a straight line or a curve by the pseudo half-tone binarizing method, it is converted into image data shown in FIG. 56. Therefore, it is erroneously judged as the half-tone area. This problem is referred to as a second problem.

(3) In the case of judging the image area based on only the pixel data within an area extremely smaller area (referred to as a minute area hereinafter) than the whole image, the probability when the area judgment is an error is relatively high, normally. This problem is referred to as a third problem hereinafter.

First of all, means for solving the above-mentioned first problem in the present preferred embodiment will be described below. For example, when there is a fine line in an oblique direction, it is supposed that this is such a case that there are a relatively small number of pixels since there are a few pixels not relating to the fine line in the oblique direction. Further, when a number of smaller pixels is small in the case of a half-tone image, it is supposed that the smaller pixels are not adjacent to each other in the oblique directions. Based on the above-mentioned two suppositions, when the number of smaller pixels is equal to or smaller than a predetermined threshold value, the adjacency number in oblique directions inclined by 45 degrees from the main scan and subscan directions (referred to as an adjacency number in the oblique directions hereinafter) is added to the adjacency number for judging the adjacency. Namely, when the number of smaller pixels is larger than the threshold value, only the adjacency number in the main scan and subscan directions are counted, and then, the counted adjacency number is set as the adjacency number for judging the adjacency. On the other hand, when the number of smaller pixels is equal to or smaller than the threshold value, the above-mentioned adjacency number in the four directions is added to the above-mentioned adjacency number of in the oblique directions, and then, the sum thereof is set as an adjacency number for judging the adjacency.

However, since there is not always, for example, one fine line in the oblique direction within the 7×7 window W7, it is extremely difficult to set the above-mentioned threshold value. Therefore, in the present preferred embodiment, in order to make the threshold value for judging the adjacency include a margin, there is defined as "an adjacent number in oblique directions" an absolute value of a difference between an adjacency number of smaller pixels in an oblique direction from the top left to the bottom right and from the bottom right to the top left which is inclined by 45 degrees from the main scan and subscan directions (referred to as a first oblique direction hereinafter) and an adjacency number of smaller pixels in an oblique direction from the top right to the bottom left and from the bottom left to the top right which is inclined by 45 degrees from the main scan and subscan directions (referred to as a second oblique direction hereinafter). These oblique directions are defined since it is supposed that a fine line in an oblique direction is directed in either one of the first oblique direction and the second oblique direction.

Figure 57:
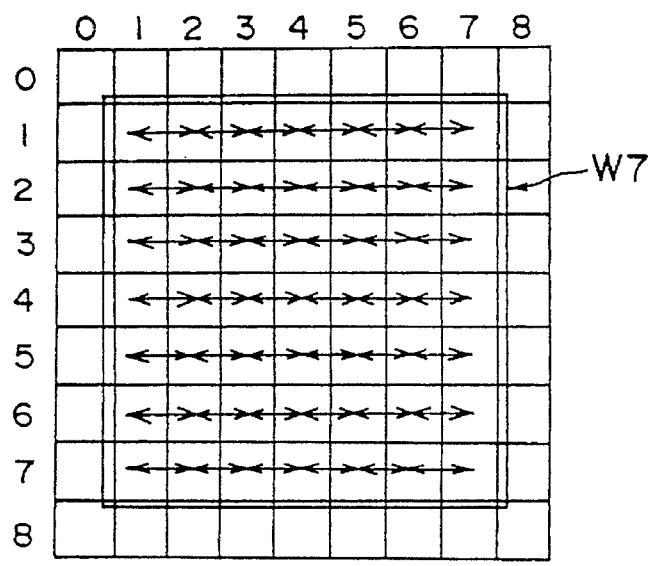
FIG. 57 is a front view showing adjacency in the main scan direction in respective pixels within a 7×7 window.
Figure 58:
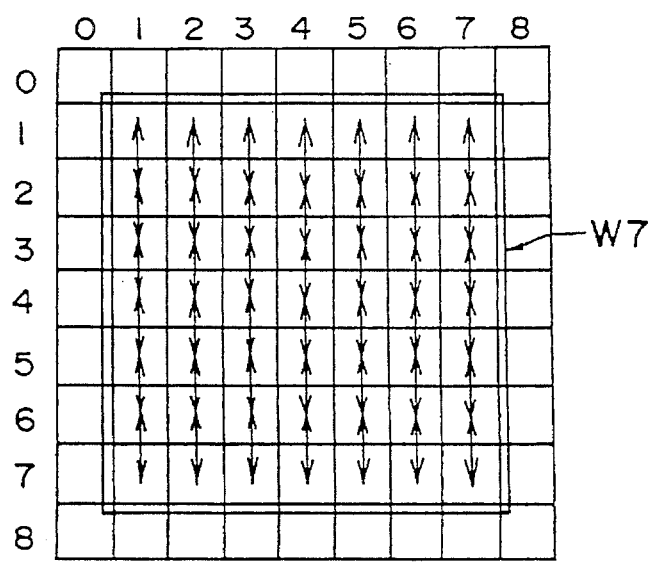
FIG. 58 is a front view showing adjacency in the subscan direction in respective pixels within a 7×7 window.
Figure 59:
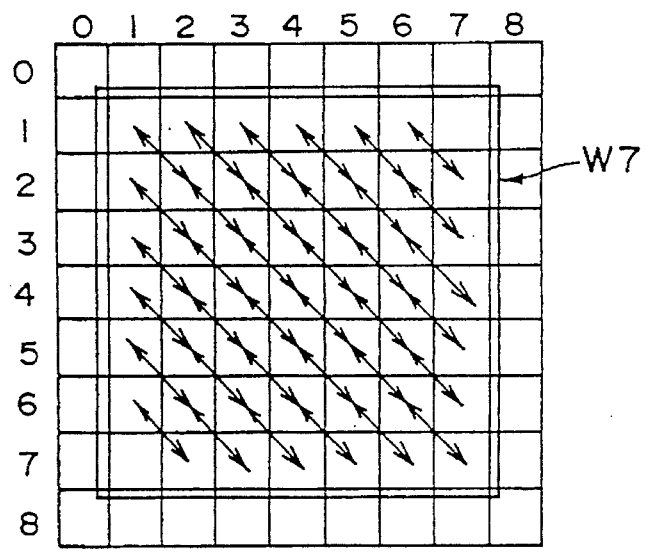
FIG. 59 is a front view showing adjacency in a first oblique direction in respective pixels within a 7×7 window.
Figure 60:
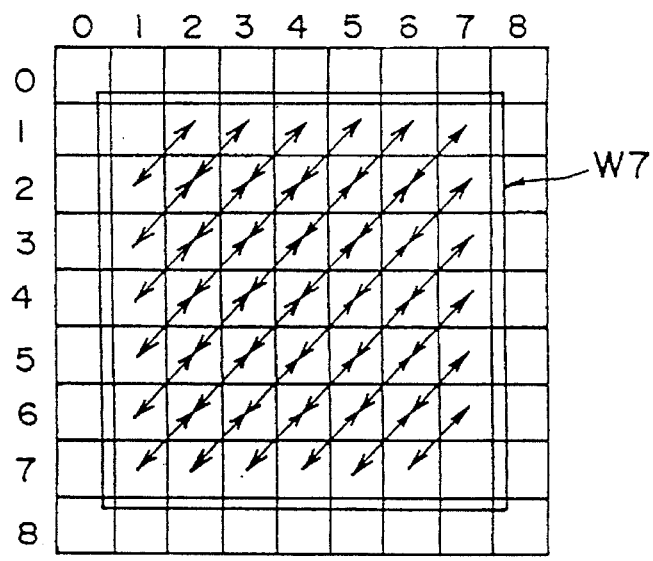
FIG. 60 is a front view showing adjacency in a second oblique direction in respective pixels within a 7×7 window.

FIG. 57 shows adjacency in the main scan direction in respective pixels within a 7×7 window W7, FIG. 58 shows adjacency in the subscan direction in respective pixels within the 7×7 window W7, FIG. 59 shows adjacency in the above-defined first oblique direction in respective pixels within the 7×7 window W7, and FIG. 60 shows adjacency in the above-defined second oblique direction in respective pixels within the 7×7 window W7.

The calculation results of the adjacency numbers in the above-defined oblique directions within the window W7 located within the half-tone image shown in FIG. 52 and the adjacency numbers in the above-defined oblique directions within the window W7 located within the non-half-tone image shown in FIG. 53 are as follows. Namely, the adjacency number in the first oblique direction within the window W7 located within the half-tone image shown in FIG. 52 is two, and the adjacency number in the second oblique direction thereof is 11, resulting in an adjacency number in the oblique directions of nine. The adjacency number in the first oblique direction within the window W7 located within the non-half-tone image shown in FIG. 53 is 7, and the adjacency number in the second oblique direction thereof is 8, resulting in an adjacency number in the oblique directions of one. As is clear from the above calculation results, the adjacent number in the oblique directions of the non-half-tone image becomes equal to or larger than the predetermined threshold value, but the adjacent number in the oblique directions of the half-tone image becomes a value close to zero. Therefore, in the present preferred embodiment, "the adjacency number in the oblique directions" of the smaller pixels is counted by the adjacency number in the oblique direction counting circuit 303 shown in FIG. 20.

Next, means for solving the above-mentioned second problem used in the present preferred embodiment will be described below. Image data obtained when reading a broken line or a fine line or when binarizing a straight line a curve using the pseudo half-tone binarizing method have such features that a number of black pixels is relatively small within an area, and also the black pixels are concentrated within an area which is present continuously in a direction of a straight line. Based on the features, in the present preferred embodiments, such a condition that a number of smaller pixels within the 7×7 window W7 is smaller than a predetermined threshold value TK2 is used as one condition for detecting the broken line.

Figure 66:
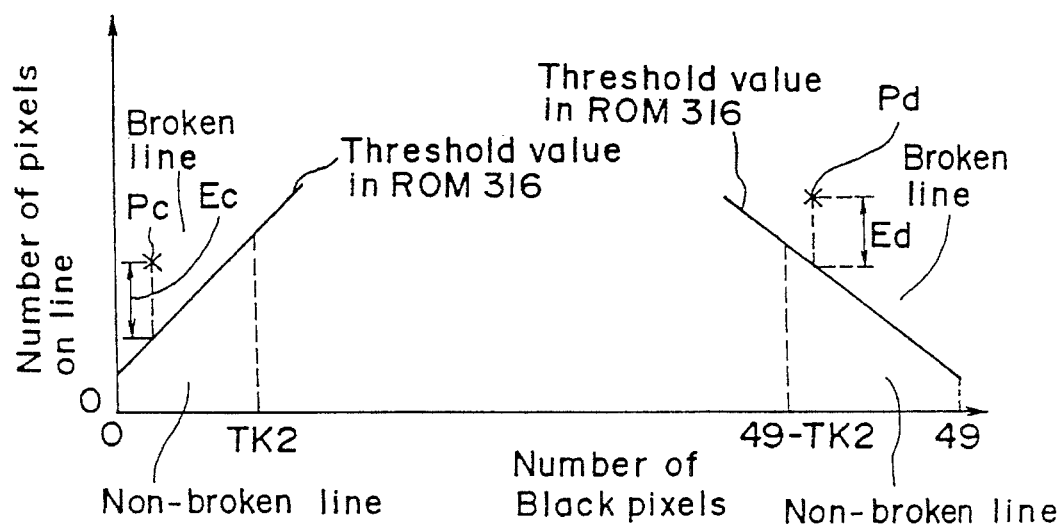
FIG. 66 is a graph showing a number of pixels on like on a number of black pixels, which is provided for explaining a method for obtaining a broken line judgment value in the preferred embodiment.

Further, after counting respective numbers of smaller pixels within detection areas Ai1, Ai2, Ams and Ass shown in FIGS. 61 to 64 each provided for detecting a straight line, the maximum value of the absolute values within the counted numbers of smaller pixels is set as "a number of pixels on line". These counting operations are performed by the pixel number on line counting circuit 312 shown in FIG. 22, and then, such a condition that the counted "pixel number on line" is larger than a predetermined threshold value (previously stored in a table ROM 316) determined based on the number of black pixels counted within the above-mentioned window W7 is used as one condition for detecting a broken line. In the present preferred embodiment, the value of the subtraction result obtained by subtracting the threshold value outputted from the ROM 316 from "the pixel number on line is set as "broken line judgment values" Ec and Ed, as shown in FIG. 66. It is to be noted that, since an image including a broken line has such a feature that the number of smaller pixels is relatively small, the above-defined dotted judgment values are used only when the number of smaller pixels is equal to or smaller than a predetermined threshold value TK2.

Figure 22:
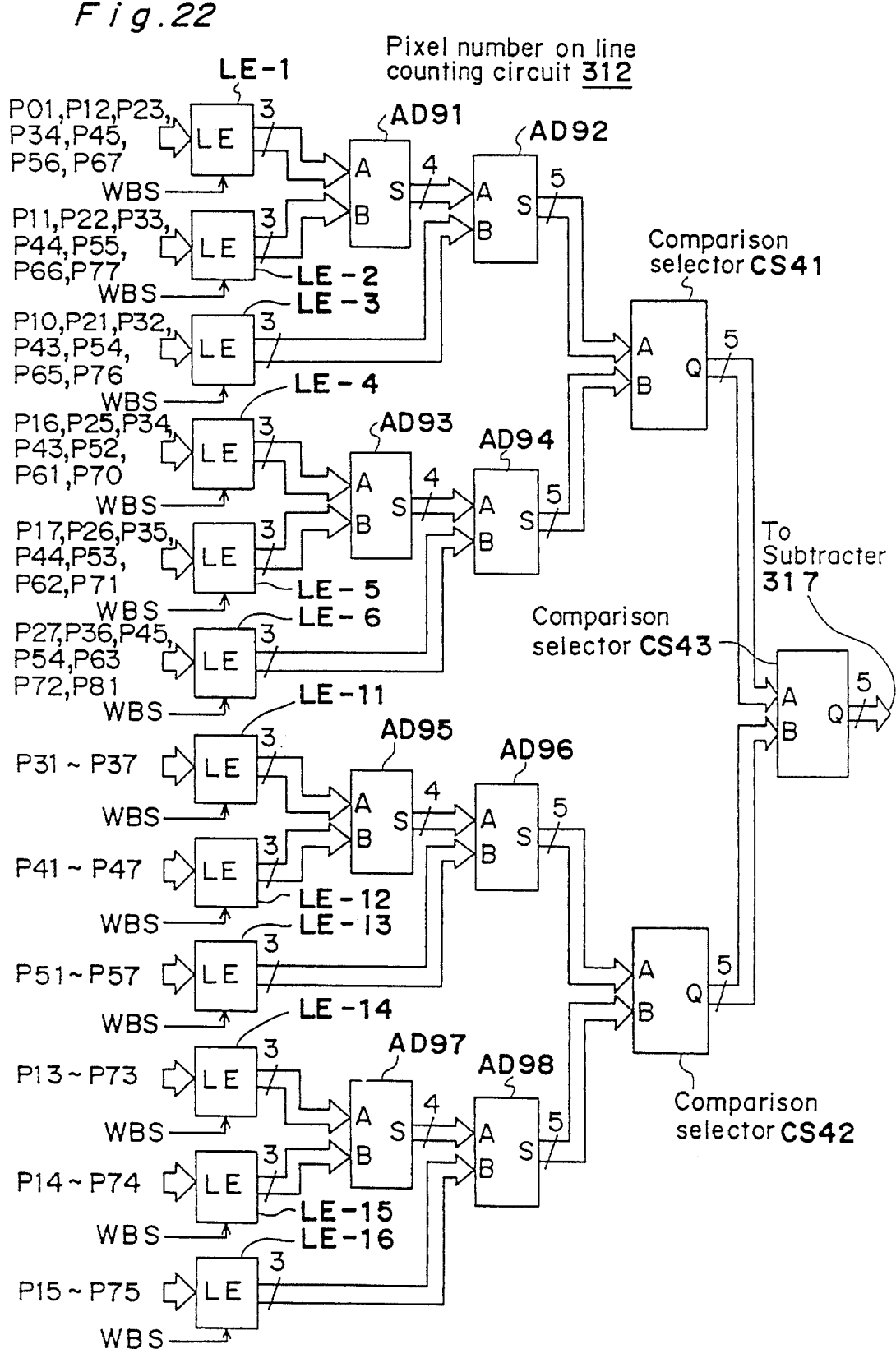
FIG. 22 is a schematic block diagram showing a pixel number on line counting circuit shown in FIG. 16.
Figure 61:
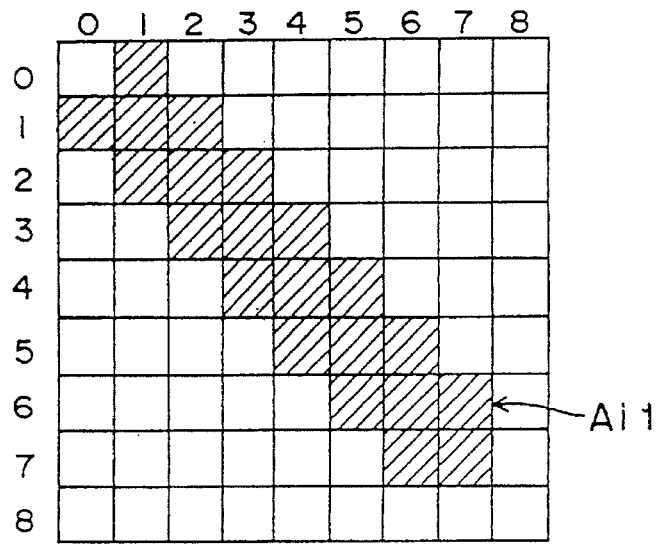
FIG. 61 is a front view showing an area for detecting a straight line in the first oblique direction used in the preferred embodiment.

FIG. 61 shows the detection area Ai1 for detecting the straight line in the first oblique direction. Pixel data within the detection area Ai1 include:

(a) pixel data calculated by a logic E circuit LE-1 shown in FIG. 22 and located continuously each other in the first oblique direction from the pixel data P01 to the pixel P67;

(b) pixel data calculated by a logic E circuit LE-2 shown in FIG. 22 and located continuously each other in the first oblique direction from the pixel data P11 to the pixel P77; and (c) pixel data calculated by a logic E circuit LE-3 shown in FIG. 22 and located continuously each other in the first oblique direction from the pixel data P10 to the pixel P76.

Figure 62:
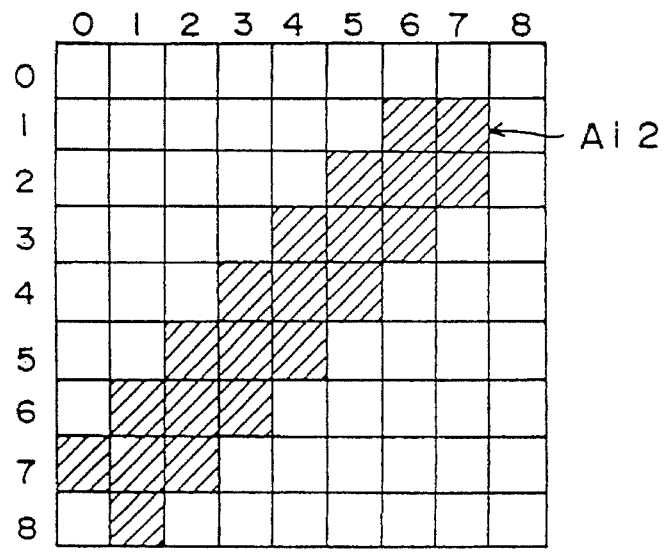
FIG. 62 is a front view showing an area for detecting a straight line in the second oblique direction used in the preferred embodiment.

FIG. 62 shows the detection area Ai2 for detecting the straight line in the second oblique direction. Pixel data within the detection area Ai2 include:

(a) pixel data calculated by a logic E circuit LE-4 shown in FIG. 22 and located continuously each other in the second oblique direction from the pixel data P16 to the pixel P70;

(b) pixel data calculated by a logic E circuit LE-5 shown in FIG. 22 and located continuously each other in the second oblique direction from the pixel data P17 to the pixel P71; and (c) pixel data calculated by a logic E circuit LE-6 shown in FIG. 22 and located continuously each other in the second oblique direction from the pixel data P27 to the pixel P81.

Figure 63:
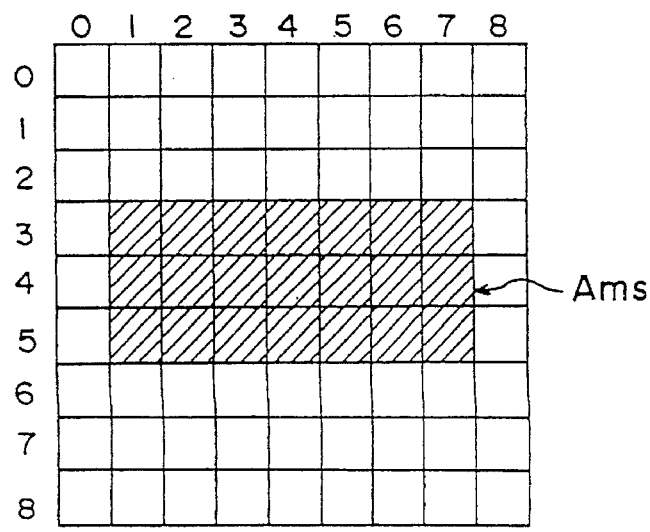
FIG. 63 is a front view showing an area for detecting a straight line in the main scan direction used in the preferred embodiment.
Figure 64:
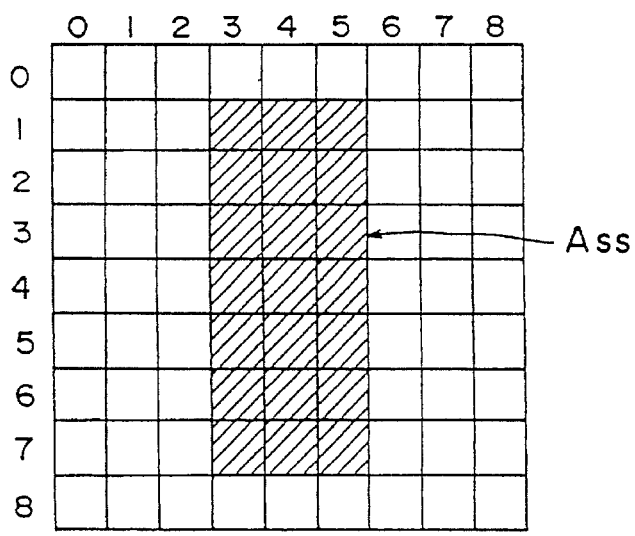
FIG. 64 is a front view showing an area for detecting a straight line in the subscan direction used in the preferred embodiment.

Further, FIG. 63 shows the detection area Ams for detecting the straight line in the main scan direction. Pixel data within the detection area Ams are located within the 3×7 window having the specified pixel P44 in the center thereof, and include pixel data calculated by the logic E circuits LE-11 to LE-13 shown in FIG. 22. Furthermore, FIG. 64 shows the detection area Ass for detecting the straight line in the subscan direction. Pixel data within the detection area Ass are located within the 7×3 window having the specified pixel P44 in the center thereof, and include pixel data calculated by the logic E circuits LE-14 to LE-16 shown in FIG. 22.

Further, means for solving the above-mentioned third problem used in the present preferred embodiment will be described below. It is considered that the image area is often erroneously judged for a minute area since there is not referred the result of the image area judgment with respect to the peripheral pixels located in the periphery of the specified pixel. Therefore, it is considered that the judgment result of the image area judgment of the peripheral pixels is used, however, it is considered that a method for using the judgment result of the non-half-tone area or using the judgment result of the half-tone area is more superior to a method for using a value for representing "the degree of the half-tone" or "the degree of the non-half-tone". Because a probability of judging as the half-tone image an area located in the periphery of the pixels of a complete half-tone image is higher than a probability of judging as the half-tone image another area located in the periphery of the pixels of the like of a half-tone image. Further, in order to prevent from erroneously judging the image area of a minute area, there is considered a method for detecting this minute area and removing the detection area. It is difficult to constitute the circuit therefor. Therefore, in the present preferred embodiment, "the degree of the non-half-tone" is represented by a numeral value, and is defined as a non-half-tone index. The image area is judged by detecting whether or not the non-half-tone index is larger than a predetermined threshold value.

Figure 65:
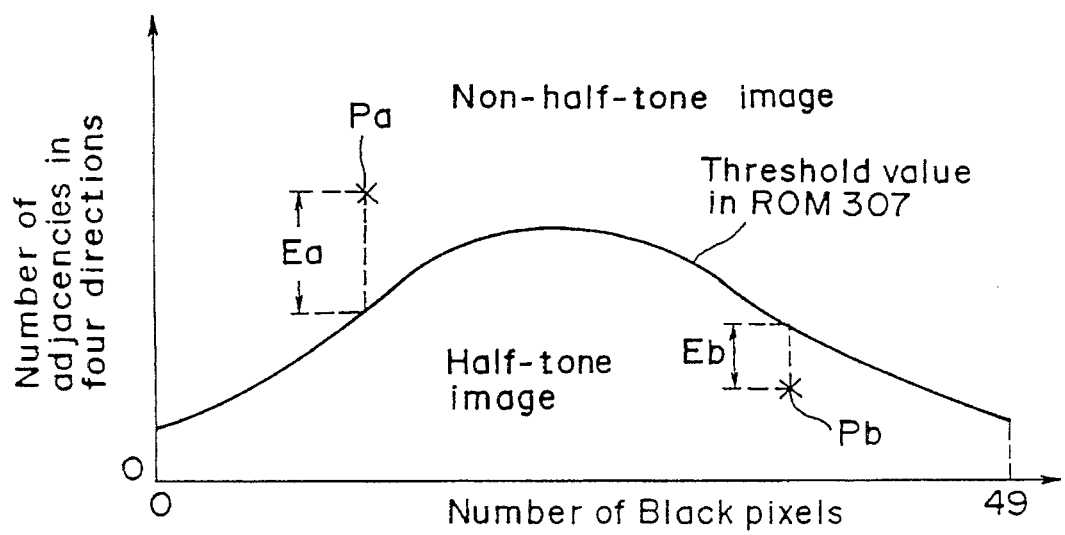
FIG. 65 is a graph showing a number of adjacencies in four directions of the main scan and subscan directions on a number of black pixels, which is provided for explaining a method for obtaining an adjacency judgment value in the preferred embodiment.

FIG. 65 is a graph showing a number of adjacencies in the four directions of the main scan and subscan directions on a number of black pixels, which is provided for explaining a method for obtaining then adjacency judgment value in the preferred embodiment. In FIG. 65, there is shown a boundary line between the half-tone area and the non-half-tone area, and there is also shown the above-mentioned threshold value previously stored in the ROM 307. As shown in FIG. 65, a difference between the adjacency number in the four directions at a point Pa located above the curve of the threshold value and in the left side of the graph from the top of the threshold value and the threshold value is defined as an adjacency judgment value Ea, and a difference between the adjacency number in the four directions at a point Pb located below the curve of the threshold value and in the right side of the graph from the top of the threshold value and the threshold value is defined as an adjacency judgment value –Eb.

Further, in the present preferred embodiment, when the number of smaller pixels is equal to or smaller than the above-mentioned threshold value TK2, the above-mentioned adjacency judgment value is compared with the above-mentioned judgment value by the comparison selector 320 shown in FIG. 16, and then, a larger value is selected as the non-half-tone judgment value for representing "the degree of the non-half-tone". Further, as described above, when the number of smaller pixels is equal to or larger than the threshold value TK2 and is equal to or smaller than a threshold value (49–TK2), it can be judged that there is few possibility of presence of a broken line. Therefore, the above-mentioned adjacency judgment value is selected as the non-half-tone judgment value by a selector 321 shown in FIG. 16.

FIG. 15 shows the first calculation section 102a of the image area judgment section 102 shown in FIG. 3.

Referring to FIG. 15, the 7×7 black pixel number counting circuit 301 counts the number of black pixels based on the pixel data DW7 within the window W7, and then, outputs-data of the number of black pixels to respective input terminals A of comparators 304, 305, 306, 313 and 314, an address terminal of the threshold table ROM 307 for storing the adjacency judgment values, and an address terminal of the threshold value table ROM 316 for storing the broken line judgment values.

Data of "24" are inputted to an input terminal B of the comparator 304. When the data inputted to the input terminal A of the comparator 304 are larger than the data inputted to the input terminal B thereof, the comparator 304 generates and outputs a white and black selection signal WBS having the high level for representing that the larger pixels are black pixels and the smaller pixels are white pixels. On the other hand, when the data inputted to the input terminal A of the comparator 304 are equal to or smaller than the data inputted to the input terminal B thereof, the comparator 304 generates and outputs the white and black selection signal WBS having the low level for representing that the larger pixels are white pixels and the smaller pixels are black pixels.

Data of the predetermined threshold value (49– TK1) are inputted to an input terminal B of the comparator 305. When the data inputted to the input terminal A of the comparator 305 are smaller than the data inputted to the terminal B thereof, the comparator 305 outputs a high level signal to a first input terminal of an AND gate 308. On the other hand, when the data inputted to the input terminal A of the comparator 305 are equal to or larger than the data inputted to the terminal B thereof, the comparator 305 outputs a low level signal to the first input terminal of the AND gate 308.

Further, data of the predetermined threshold value TK1 are inputted to an input terminal B of the comparator 306. When the data inputted to the input terminal A of the comparator 306 are larger than the data inputted to the input terminal B thereof, the comparator 306 outputs a high level signal to a second input terminal of the AND gate 308. On the other hand, when the data inputted to the input terminal A of the comparator 306 are equal to or smaller than the data inputted to the input terminal B thereof, the comparator 306 outputs a low level signal to the second input terminal of the AND gate 308. In the preferred embodiment, the threshold value TK1 is preferably set to 12, and an output terminal of the AND gate 308 is connected to an selection signal input terminal SEL of the selector 310.

Based on the data of the number of black pixels inputted to the address terminal of the table ROM 307, the table ROM 307 outputs data of the predetermined threshold as described with reference to FIG. 65 from the data terminal thereof to an input terminal A of a subtracter 311. The threshold value outputted from the ROM 307 is preferably set to 7 when the number of black pixels is 12 or 37, and is preferably set to 21 when the number of black pixels is 24.

Based on the inputted pixel data DW7, an adjacency number in the main scan and subscan directions counting circuit 302 counts the adjacency number in the main scan and subscan directions, and then, outputs the data of 6 bits of the counted value to an input terminal A of the selector 310 and an adder 309. An adjacency number in the oblique directions counting circuit 303 counts the adjacency number in the above-mentioned oblique directions based on the inputted pixel data DW7, and outputs the data of 6 bits of the counted value to the adder 309. The adder 309 adds the inputted two data to each other, and then, outputs the data of the LSB of 6 bits to an input terminal B of the selector 310.

In response to the high level signal from the AND gate 308 or when the number of black pixels is larger than the threshold value TK1 and is smaller than the threshold value (49–TK1), the selector 310 selects the data of the adjacency number in the main scan and subscan directions, and outputs the selected data to an input terminal B of a subtracter 311. On the other hand, in response to the low level signal from the AND gate 308 or when the number of black pixels is equal to or smaller then the threshold value TK1 and is equal to or larger than the threshold value (49–TK1), the selector 310 selects the sum data outputted from the adder 309, and outputs the selected data to the input terminal B of the subtracter 311. Further, the subtracter 311 subtracts the data inputted to the input terminal B thereof from the data of the threshold value inputted to the input terminal A thereof, and outputs the data of the subtraction thereof as the adjacency judgment value to an input terminal B of the comparison selector 320 shown in FIG. 16 and an input terminal B of the selector 321.

FIG. 16 shows the second calculation section 102b of the image area judgment section 102 shown in FIG. 3.

Referring to FIG. 16, the data of the threshold value (49–TK2) are inputted to an input terminal B of the comparator 313. When the data of the number of black pixel inputted to the input terminal A of the comparator 313 are larger than the threshold value (49–TK2), the comparator 313 outputs a high level signal to a first input terminal of the AND gate 315. On the other hand, when the data of the number of black pixel inputted to the input terminal A of the comparator 313 are equal to or smaller than the threshold value (49–TK2), the comparator 313 outputs a low level signal to the first input terminal of the AND gate 315. Further, the data of the threshold value TK2 are inputted to the input terminal B of the comparator 314. When the data of the number of black pixels inputted to the input terminal A of the comparator 314 are smaller than the threshold value TK2, the comparator 314 outputs a high level signal to a second input terminal of the AND gate 315. On the other hand, when the data of the number of black pixels inputted to the input terminal A of the comparator 314 are equal to or larger than the threshold value TK2, the comparator 314 outputs a low level signal to the second input terminal of the AND gate 315. The signal outputted from the OR gate 315 is inputted through an invertor 322 to a first input terminal of an AND gate 323, and is inputted to a selection signal input terminal SEL of a selector 321.

The pixel number on line counting circuit 312 counts the above-mentioned pixel number on line, and outputs data thereof to an input terminal A of a subtracter 317. On the other hand, based on the inputted data of the number of black pixels, the table ROM 316 outputs the threshold value for judging a broken line as described with reference to FIG. 66 from data terminal thereof to an input terminal B of the subtracter 317. The subtracter 317 subtracts the above-mentioned threshold value from the data of the pixel number on line, and then outputs the data of the subtraction result thereof to an input terminal A of a comparator 318 as the broken line judgment value and an input terminal A of a comparison selector 320. Data of "zero" are inputted to an input terminal B of the comparator 318. When the inputted broken line judgment value is larger than zero, the comparator 318 outputs a high level signal to a third input terminal of the AND gate 323. On the other hand, when the inputted broken line judgment value is equal to or smaller than zero, the comparator 318 outputs a low level signal to the third input terminal of the AND gate 323.

When the broken line judgment value is larger than the adjacency judgment value, the comparison selector 320 outputs a high level signal to a second input terminal of the AND gate 323, and selects data of the broken line judgment value and outputs them to an input terminal A of the selector 321. On the other hand, when the broken line judgment value is equal to or smaller than the adjacency judgment value, the comparison selector 320 outputs a low level signal to the second input terminal of the AND gate 323, and selects data of the adjacency judgment value and outputs them to the input terminal A of the selector 321. When the signal outputted from the OR gate 315 has the high level, the selector 321 selects the data inputted to the input terminal A thereof, and then, outputs the selected data as the non-half-tone judgment value to an input terminal of a flip-flop shown in FIG. 17. On the other hand, when the signal outputted from the OR gate 315 has the low level, the selector 321 selects the data of the adjacency judgment value inputted to the input terminal B thereof, and then, outputs the selected data as the non-half-tone judgment value to the input terminal of the flip-flop. Further, the broken line detection signal is outputted from the output terminal of the AND gate 323.

In the second calculation section 102b constituted as described above, when the following three conditions is satisfied, it is judged that there is a broken line within a predetermined area, and then, the broken line detection signal having the high level is outputted therefrom:

(a) the output signal from the inverter 322 has the high level or the number of black pixels is equal to or larger than the threshold value TK2 and is equal or smaller than the threshold value (49−TK2);

(b) the broken line judgment value outputted from the subtracter 317 is larger than zero; and (c) the broken line judgment value is larger than the adjacency judgment value.

FIG. 17 shows the third calculation section 102c of the image area judgment section 102 shown in FIG. 3, which comprises seven delay type flip-flops 324 to 330 each delaying data inputted in synchronous with a clock CLK1 having the same period as that of one dot by the period and outputting them, seven adders 331 to 337, and a comparator 338.

Referring to FIG. 17, the seven flip-flops 324 to 330 are connected in series to each other. The data of the non-half-tone judgment value inputted from the second calculation section 102b are inputted to the flip-flop 324 of the first stage thereof and the adder 331. Thereafter, after the flip-flop 324 of the first stage delays the inputted data by the period of one dot, and then, outputs the delayed data to the flip-flop 325 of the second stage thereof and the adder 331. In a manner similar to that of above, the flip-flops 325 to 329 of the second to sixth stages delay the inputted data by the period of one dot, and then, output the delayed data to the flip-flops 326 to 330 of the next stage and to the adders 332, 332, 333, 333 and 334, respectively. The flip-flop 330 of the last stage delays the inputted data by the period of one dot, and then, outputs the delayed data to the adder 334. All of the respective data outputted from the flip-flops 324 to 330 and the data of the non-half-tone judgment value of 8 bits inputted to the flip-flop 324 are added to each other by the adders 331 to 337, and the data of the addition result thereof are inputted from the adder 337 to an input terminal A of the comparator 338.

Data of "zero" are inputted to an input terminal B of the comparator 338, which compares the non-half-tone judgment value of the addition result thereof with zero. When the non-half-tone judgment value is larger than zero, the comparator 338 outputs the image area judgment signal having the high level for representing the non-half-tone area. On the other hand, when the non-half-tone judgment value is equal to or smaller than zero, the comparator 338 outputs the image area judgment signal having the low level for representing the half-tone area.

The third calculation section 102c constituted as described above judges the kind of the image area based on the average value of the data of the non-half-tone judgment value of 8 bits in a forward direction of the main scan direction including the specified pixel.

(6-2) Adjacency number in main scan and subscan directions counting circuit

Figure 18:
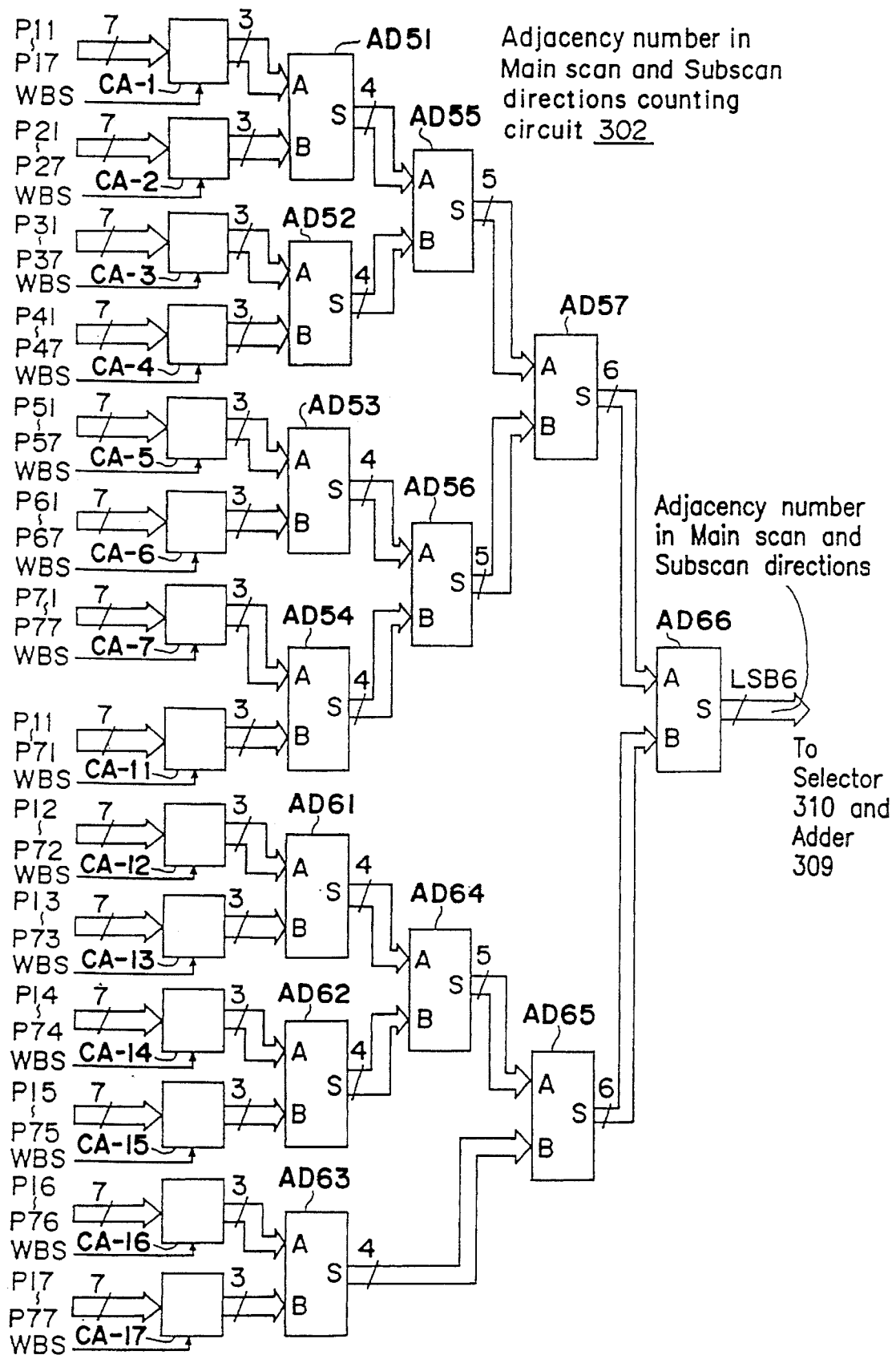
FIG. 18 is a schematic block diagram showing an adjacency number in main scan and subscan directions counting circuit shown in FIG. 15.

FIG. 18 shows the adjacency number in the main scan and subscan directions counting circuit 302 shown in FIG. 15, which comprises 14 adjacency number in the main scan and subscan directions counters CA-1 to CA-7 and CA-11 to CA-17 each counting an adjacency number of smaller pixels in the main scan and subscan directions based on the inputted pixel data of 7 bits and the white and black selection signal WBS, and 13 adders AD51 to AD57 and AD61 to AD66.

As shown in FIG. 18, the respective pixel data, each of 7 bits, on the main scanning lines of i=1 to 7 within the window W7 are inputted to the adjacency number in the main scan and subscan directions counters CA-1 to CA-7, and the respective pixel data, each of 7 bits, on the subscan direction lines of j=1 to 7 within the window W7 are inputted to the adjacency number in the main scan and subscan directions counters CA-11 to CA-17. The data of the respective adjacency numbers outputted from the respective counters CA-1 to CA-7 and CA-11 to CA-17 are added to each other by the adders AD51 to AD57 and AD61 to AD66, and then, data of the LSB of 6 bits of the sum of all the adjacency numbers are outputted from the adder AD66 to the selector 310 and the adder 309 as the adjacency number in the main scan and subscan directions.

Figure 19:
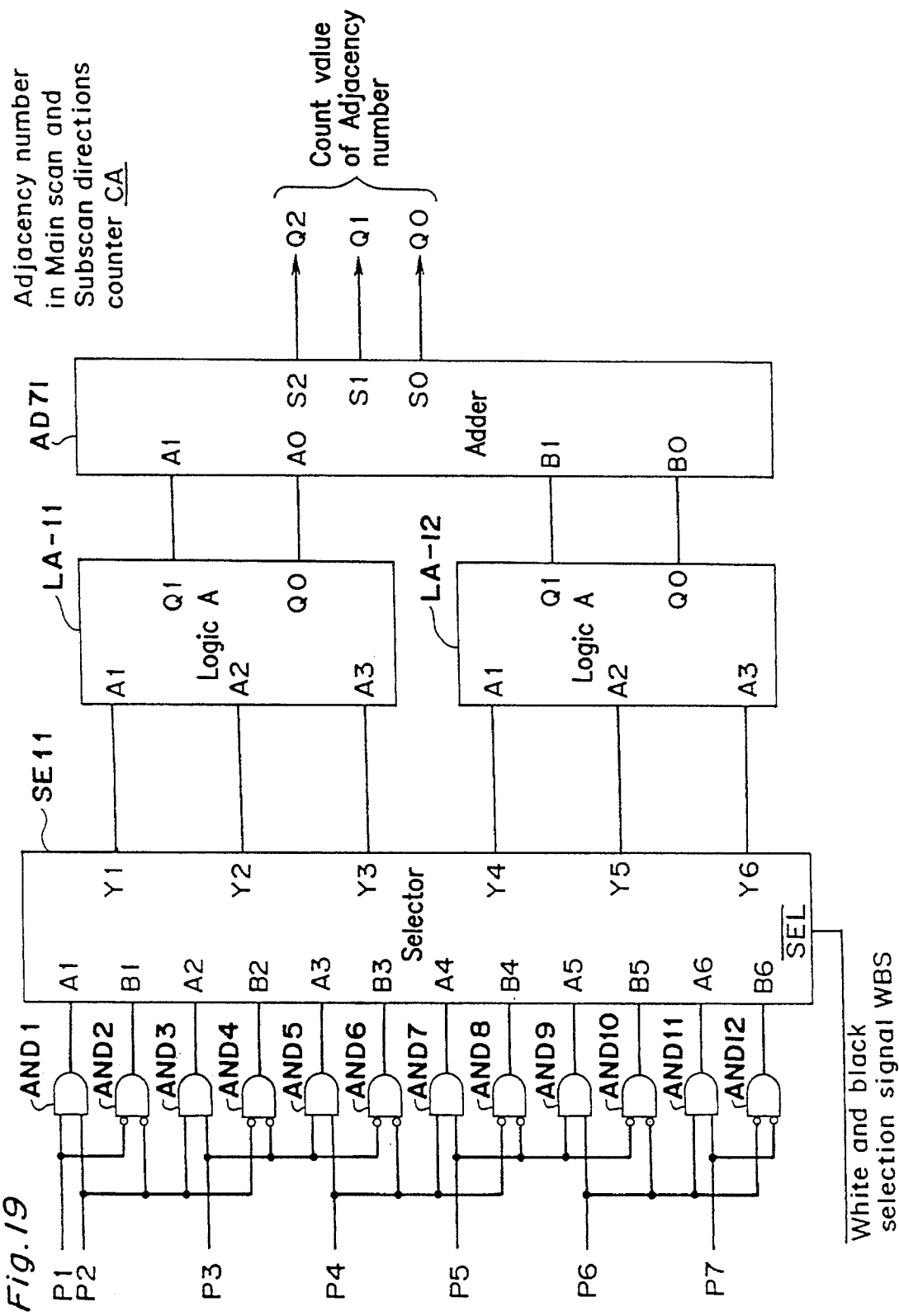
FIG. 19 is a schematic block diagram showing an adjacency number in main scan and subscan directions counter shown in FIG. 18.

FIG. 19 shows the adjacency number in the main scan and subscan directions counter CA shown in FIG. 18.

Referring to FIG. 19, the first bit data P1 of the inputted data of 7 bits are inputted to a first input terminal of an AND gate AND1 and a first inverted input terminal of an AND gate AND2, and also the second bit data P2 thereof are inputted to a second input terminal of the AND gate AND1, a second inverted input terminal of the AND gate AND2, a first input terminal of an AND gate AND3, and a first inverted input terminal of an AND gate AND4. Further, the third bit data P3 thereof are inputted to a second input terminal of the AND gate AND3, a second inverted input terminal of an AND gate AND4, a first input terminal of an AND gate AND5, and a first inverted input terminal of an AND gate AND6, and also the fourth bit data P4 thereof are inputted to a second input terminal of the AND gate AND5, a second inverted input terminal of the AND gate AND6, a first input terminal of the AND gate AND7, and a first inverted input terminal of a AND gate AND8. Further, the fifth data P5 thereof are inputted to a second input terminal of the AND gate AND7, a second inverted input terminal of the AND gate AND8, a first input terminal of an AND gate AND9, and a first inverted input terminal of an AND gate AND10, and also the sixth bit data P6 thereof are inputted to a second input terminal of the AND gate AND9, a second inverted input terminal of the AND gate AND10, a first input terminal of an AND gate AND11, and a first inverted input terminal of an AND gate AND12. Furthermore, the seventh bit data P7 thereof are inputted to a second input terminal of the AND gate AND11, and a second inverted input terminal of the AND gate AND12.

Signals outputted from the respective AND gates AND1 to AND12 are inputted to respective input terminals A1, B1, A2, B2, A3, B3, A4, B4, A5, B5, A6 and B6 of the selector SE11, respectively. In response to the white and black selection signal WBS having the low level, in order to count the adjacency number of the black pixels which are the smaller pixels, the selector SE11 selects the data inputted to the respective input terminals A1 to A6, and outputs the LSB of 3 bits thereof from respective output terminals Y1 to Y3 to respective input terminals of the logic A circuit LA-11, and outputs the MSB of 3 bits thereof from respective output terminals Y4 to Y6 to respective input terminals of the logic A circuit LA-12. On the other hand, in response to the white and black selection signal WBS having the high level, in order to count the adjacency number of the white pixels which are the smaller pixels, the selector SE11 selects the data inputted to the respective input terminals B1 to B6, and outputs the LSB of 3 bits thereof from respective output terminals Y1 to Y3 to respective input terminals of the logic A circuit LA-11, and outputs the MSB of 3 bits thereof from respective output terminals Y4 to Y6 to respective input terminals of the logic A circuit LA-12. The data each of 2 bits outputted from the respective logic A circuit LA-11 and LA-12 are inputted to the adder AD71, and are added to each other by the adder AD71, and then, the data of addition result thereof are inputted as the adjacency number count value in the main scan and subscan directions.

(6-3) Adjacency number in oblique directions counting circuit

Figure 20:
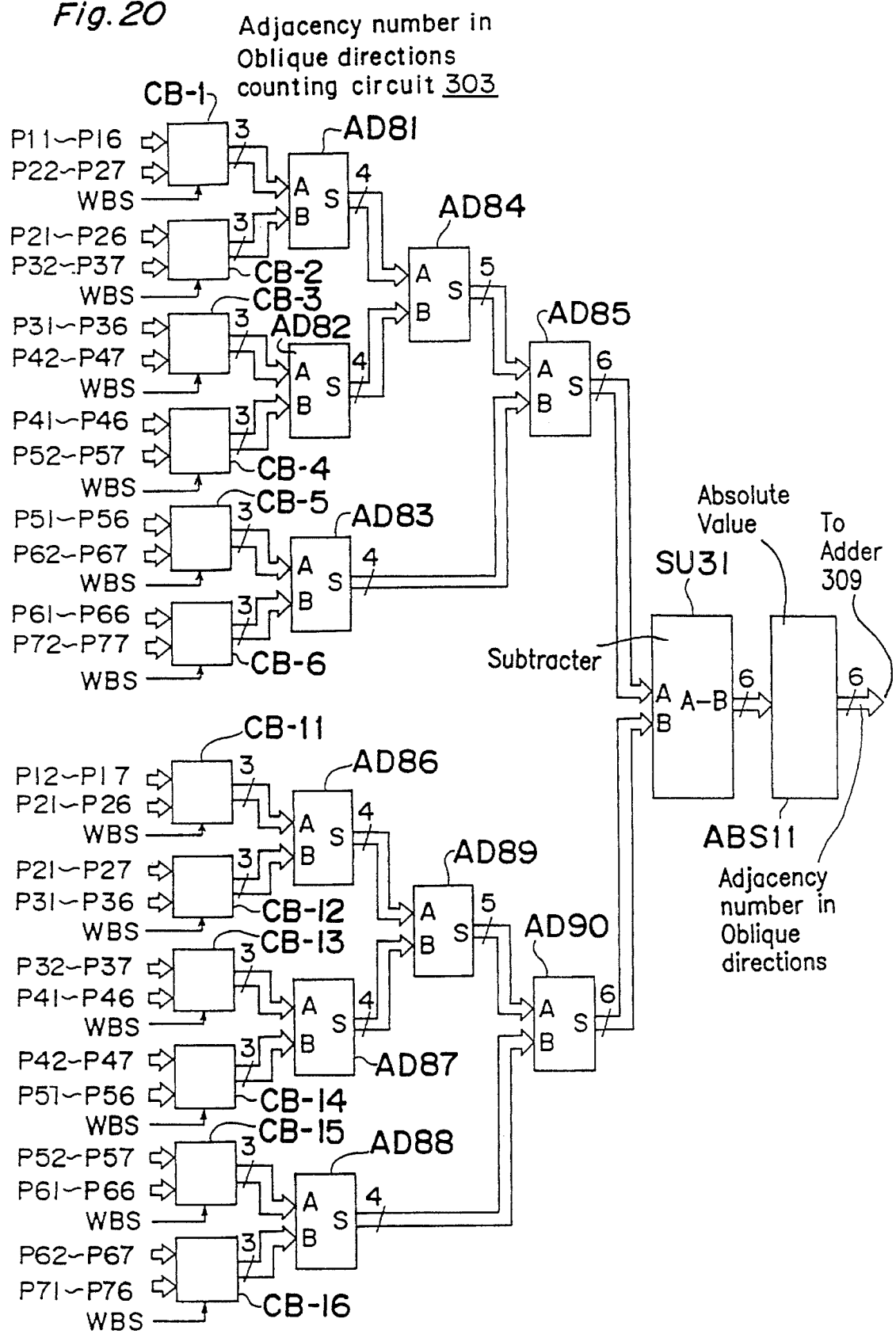
FIG. 20 is a schematic block diagram showing an adjacency number in oblique directions counting circuit shown in FIG. 15.

FIG. 20 shows the adjacency number in the oblique directions counting circuit 303 shown in FIG. 15, which comprises 12 adjacency number in the oblique directions counters CB-1 to CB-6 and CB-11 to CB-16 each counting the adjacent number of the smaller pixels in the oblique directions based on two sets of inputted pixel data each set of 6 bits and the white and black selection signal WBS and outputting the data of the counted adjacency number, four adders AD81 to AD85 each counting the adjacency number in the first oblique direction, five adders AD86 to AD90 each counting the adjacency number in the second oblique direction, a subtracter SU31 for subtracting the adjacency number in the second oblique direction from the adjacency number in the first oblique direction, and an absolute value calculation circuit ABS11 for calculating the absolute value of the data inputted from the subtracter SU31 and outputting the calculated absolute value.

Referring to FIG. 20, a first set of pixel data P11 to P16 and a second set of pixel data P22 to P27 are inputted to the adjacency number in the oblique direction counter CB-1, a first set of pixel data P21 to P26 and a second set of pixel data P32 to P37 are inputted to the adjacency number in the oblique direction counter CB-2, and a first set of pixel data P31 to P36 and a second set of pixel data P42 to P47 are inputted to the adjacency number in the oblique direction counter CB-3. Further, a first set of pixel data P41 to P46 and a second set of pixel data P52 to P57 are inputted to the adjacency number in the oblique direction counter CB-4, a first set of pixel data P51 to P56 and a second set of pixel data P62 to P67 are inputted to the adjacent number in the oblique directions counter CB-5, and a first set of pixel data P61 to P66 and a second set of pixel data P72 to P77 are inputted to the adjacent number in the oblique directions counter CB-6. The respective data of the adjacency numbers outputted from the counters CB-1 to CB-6 are added to each other by the adders AD81 to AD85, and then, the data of the adjacency number in the first oblique direction of the addition result thereof are inputted to an input terminal A of the subtracter SU31.

Further, a first set of pixel data P12 to P17 and a second set of pixel data P21 to P26 are inputted to the adjacency number in the oblique direction counter CB-11, a first set of pixel data P22 to P27 and a second set of pixel data P31 to P36 are inputted to the adjacency number in the oblique direction counter CB-12, and a first set of pixel data P32 to P37 and a second set of pixel data P41 to P46 are inputted to the adjacency number in the oblique direction counter CB-13. Furthermore, a first set of pixel data P42 to P47 and a second set of pixel data P51 to P56 are inputted to the adjacency number in the oblique direction counter CB-14, a first set of pixel data P52 to P57 and a second set of pixel data P61 to P66 are inputted to the adjacent number in the oblique directions counter CB-15, and a first set of pixel data P62 to P67 and a second set of pixel data P71 to P76 are inputted to the adjacent number in the oblique directions counter CB-16. The respective data of the adjacency numbers outputted from the counters CB-11 to CB-16 are added to each other by the adders AD86 to AD90, and then, the data of the adjacency number in the first oblique direction of the addition result thereof are inputted to an input terminal B of the subtracter SU31.

The subtracter SU31 subtracts the data of the adjacency number in the second oblique direction from the data of the adjacency number in the first oblique direction, and then, outputs the data of the subtraction thereof to the absolute value calculation circuit ABS11. Then, the absolute value calculation circuit ABS11 calculates the absolute value of the inputted data, and then, outputs the calculated data as data of the adjacency number in the oblique directions to the adder 309.

Figure 21:
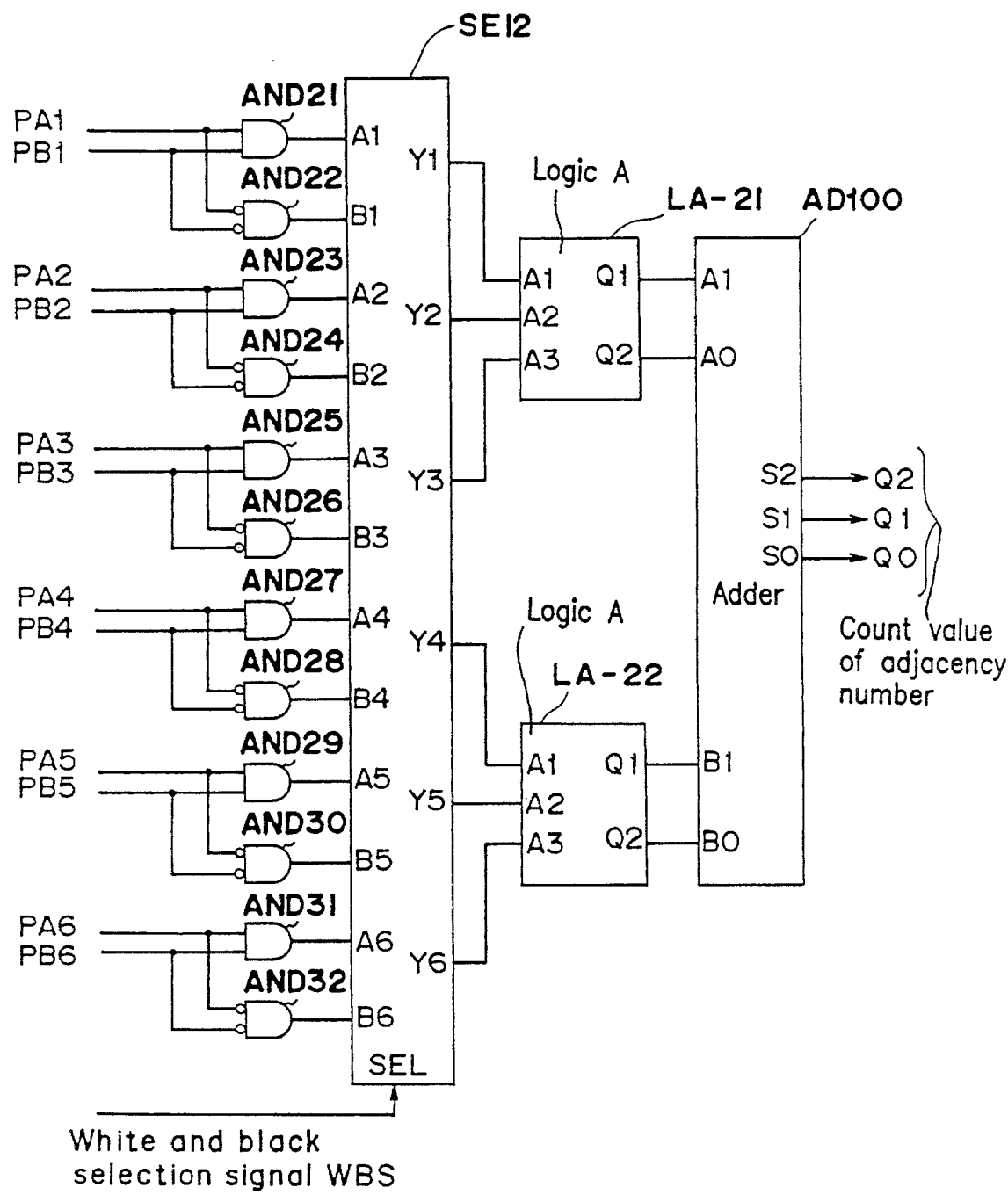
FIG. 21 is a schematic block diagram showing an adjacency number in oblique directions counter shown in FIG. 20.

FIG. 21 shows the adjacency number in the oblique directions counter CB shown in FIG. 20, which comprises 12 AND gates AND21 to AND32, a selector SE12, two logic A circuits LA-12 and LA-22, and an adder AD100.

Referring to FIG. 21, a first set of data PA1 to PA6 of 6 bits are inputted to a first input terminal of the AND gate AND21 and a first inverted input terminal of the AND gate AND22, a first input terminal of the AND gate AND23 and a first inverted input terminal of the AND gate AND24, a first input terminal of the AND gate AND25 and a first inverted input terminal of the AND gate AND26, a first input terminal of the AND gate AND27 and a first inverted input terminal of the AND gate AND28, a first input terminal of the AND gate AND29 and a first inverted input terminal of the AND gate AND30, and a first input terminal of the AND gate AND31 and a first inverted input terminal of the AND gate AND32, respectively. Further, a second set of data PB1 to PB6 of 6 bits are inputted to a second input terminal of the AND gate AND21 and a second inverted input terminal of the AND gate AND22, a second input terminal of the AND gate AND23 and a second inverted input terminal of the AND gate AND24, a second input terminal of the AND gate AND25 and a second inverted input terminal of the AND gate AND26, a second input terminal of the AND gate AND27 and a second inverted input terminal of the AND gate AND28, a second input terminal of the AND gate AND29 and a second inverted input terminal of the AND gate AND30, and a second input terminal of the AND gate AND31 and a second inverted input terminal of the AND gate AND32, respectively.

Respective signal outputted from the AND gates AND21 to AND32 are inputted to respective input terminals A1, B1, A2, B2, A3, B3, A4, B4, A5, B5, A6 and B6 of the selector SE12. In response to the white and black selection signal WBS having the low level, in order to count the adjacency number of the black pixels which are the smaller pixels, the selector SE12 selects data inputted to respective input terminals A1 to A6, outputs the data of the LSB of 3 bits of the selected data from respective output terminals Y1 to Y3 to respective input terminals of the logic A circuit LA-21, and outputs the data of the MSB of 3 bits of the selected data from respective output terminals Y4 to Y6 to respective input terminals of the logic A circuit LA-22. On the other hand, in response to the white and black selection signal WBS having the high level, in order to count the adjacency number of the white pixels which are the smaller pixels, the selector SE12 selects data inputted to respective input terminals B1 to B6, and outputs the data of the LSB of 3 bits of the selected data and the data of the MSB of 3 bits thereof, similarly.

Data each of 2 bits outputted from the logic A circuits LA-21 and LA-22 are inputted to the adder AD100, and are added to each other by the adder AD100. Then, the data of the addition result thereof are outputted as the adjacency number in the oblique directions.

(6-4) Pixel number on line counting circuit

Figure 23:
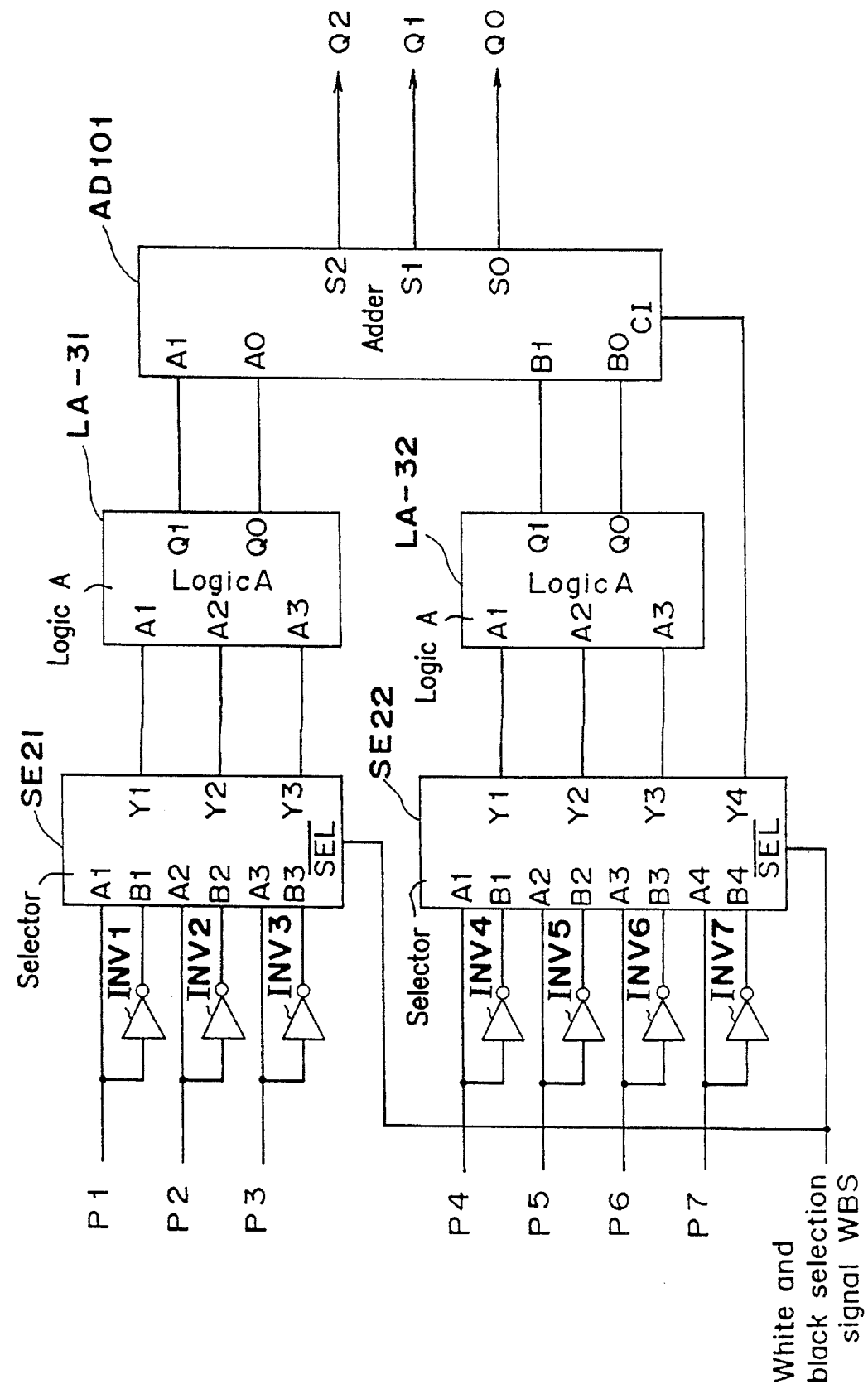
FIG. 23 is a schematic block diagram showing a logic E circuit shown in FIG. 22.

FIG. 22 shows the pixel number on line counting circuit 312 shown in FIG. 16, which comprises 12 logic E circuits LE-1 to LE-6 and LE-11 to LE-16 each having a structure shown in FIG. 23 and counting the number of the smaller pixels included in the inputted pixel data based on the inputted white and black selection signal WBS and the inputted pixel data of 7 bits, 8 adders AD91 to AD98, and three comparison selectors CS41 to CS43 each selecting the data of the maximum value among the inputted two data.

Referring to FIG. 22, the pixel data within the detection area Ai1 for detecting a straight line in the first oblique direction shown in FIG. 61 are inputted to the logic E circuits LE-1 to LE-3 by 7 bits. Then, after the data of the respective counted pixel number outputted from the logic E circuits LE-1 to LE-3 are added to each other by the adders AD91 and AD92, the data of the addition result thereof for representing the number of the smaller pixels within the detection area Ai1 are outputted to the comparison selector CS41. Further, the pixel data within the detection area Ai2 for detecting a straight line in the second oblique direction shown in FIG. 62 are inputted to the respective logic E circuits LE-4 to LE-6 by 7 bits. Then, after data of respective counted pixel numbers outputted from the logic E circuits LE-4 to LE-6 are added to each other by the adders AD93 and AD94, and the data of the addition result thereof for representing the number of smaller pixels within the detection area Ai2 are outputted to the comparison selector CS41. The comparison selector CS41 selects the maximum data among the inputted two data, and then, outputs the selected data to the comparison selector CS43.

The pixel data within the detection area Ams for detecting a straight line in the main scan direction shown in FIG. 63 are inputted to the respective logic E circuits LE-11 to LE-13 by 7 bits. Then, after the data of the respective counted pixel number outputted from the logic E circuits LE-11 to LE-13 are added to each other by the adders AD95 and AD96, the data of the addition result thereof for representing the number of the smaller pixels within the detection area Ams are outputted to the comparison selector CS42. Further, the pixel data within the detection area Ass for detecting a straight line in the subscan direction shown in FIG. 64 are inputted to the respective logic E circuits LE-14 to LE-16 by 7 bits. Then, after data of respective counted pixel numbers outputted from the logic E circuits LE-14 to LE-16 are added to each other by the adders AD97 and AD98, and the data of the addition result thereof for representing the number of smaller pixels within the detection area Ass are outputted to the comparison selector CS42. The comparison selector CS42 selects the maximum data among the inputted two data, and then, outputs the selected data to the comparison selector CS43.

Further, the comparison selector CS43 selects the maximum data among the inputted two data, and then, outputs the selected data to the subtracter 317.

FIG. 23 shows the logic E circuit LE shown in FIG. 22, which comprises seven invertors INV1 to INV7 each invert-ing the pixel data inputted upon counting the white pixels, two selectors SE21 and SE22, two logic A circuits LA-31 and LA-32, and an adder AD101.

Referring to FIG. 23, data P1 to P3 of the LSB of 3 bits of the inputted data of 7 bits are inputted to input terminals A1 to A3 of the selector SE21, and are inputted through the respective invertors INV1 to INV3 to respective input terminals B1 to B3 of the selector SE21, respectively. Further, data P4 to P7 of the MSB of 4 bits thereof are inputted to input terminals A1 to A4 of the selector SE22, and are inputted through the respective invertors INV4 to INV7 to respective input terminals B1 to B4 of the selector SE22, respectively.

In response to the white and black selection signal WBS having the low level, in order to count the number of the black pixels which are the smaller pixels, the selector SE21 selects the data inputted to the respective input terminals A1 to A3, and then, outputs the selected data from respective output terminals Y1 to Y3 to respective input terminals of the logic A circuit LA-31. On the other hand, in response to the white and black selection signal WBS having the high level, in order to count the number of the white pixels which are the smaller pixels, the selector SE21 selects the data inputted to the respective input terminals B1 to B3, and then, outputs the selected data from respective output terminals Y1 to Y3 to respective input terminals of the logic A circuit LA-31. Further, data of 2 bits outputted from the logic A circuit LA-31 are inputted to the adder AD101. Furthermore, in response to the white and black selection signal WBS having the low level, in order to count the number of the black pixels which are the smaller pixels, the selector SE22 selects the data inputted to the respective input terminals A1 to A4, and then, outputs the selected data from respective output terminals Y1 to Y4 to respective input terminals of the logic A circuit LA-32. On the other hand, in response to the white and black selection signal WBS having the high level, in order to count the number of the white pixels which are the smaller pixels, the selector SE22 selects the data inputted to the respective input terminals B1 to B4, and then, outputs the selected data from respective output terminals Y1 to Y4 to respective input terminals of the logic A circuit LA-32. Further, data of 2 bits outputted from the logic A circuit LA-32 are inputted to the adder AD101.

Further, after the two data inputted to the adder AD101 are added to each other, data of 3 bits of the addition result thereof for representing the count value of the smaller pixels are outputted.

(7) Interpolation and smoothing processor

Figure 24:
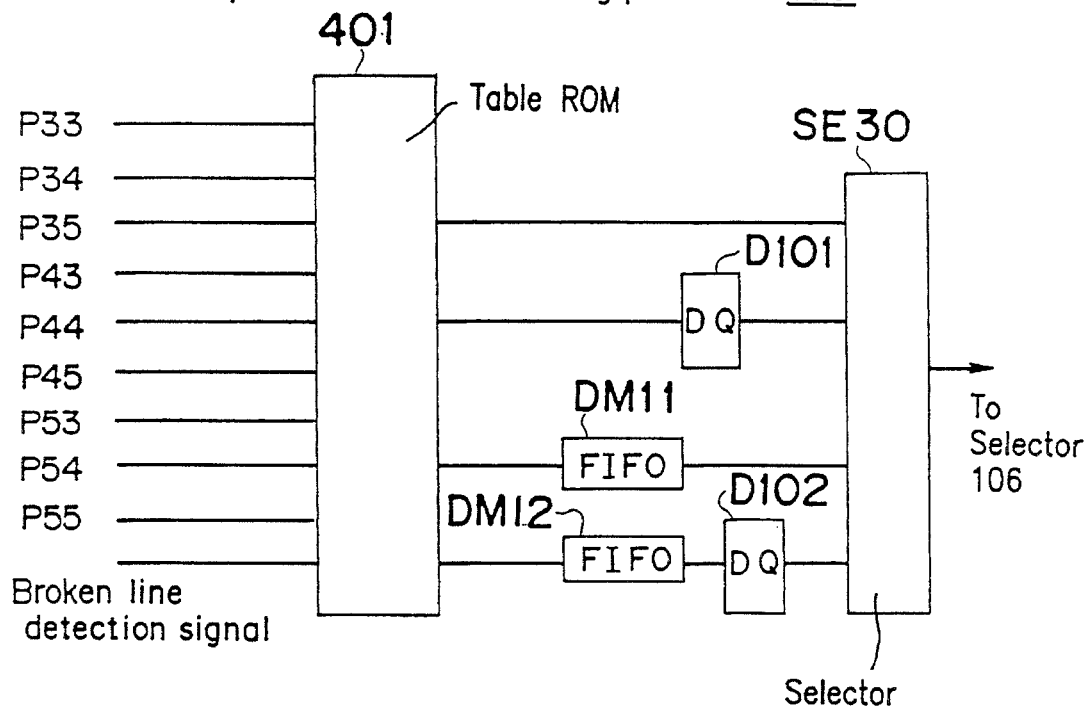
FIG. 24 is a schematic block diagram showing an interpolation and smoothing processor shown in FIG. 3.

FIG. 24 shows the interpolation and smoothing processor 103 shown in FIG. 3, which performs not only an interpolation process with an interpolation magnification coefficient in the main scan direction of two and with an interpolation magnification coefficient in the subscan direction of two, but also a predetermined smoothing process. The smoothing process of the processor 103 is different from the smoothing process of the general filtering process, and is characterized in performing a smoothing process for smoothing a notched portion in an image of the binary image data referring to the pixels in the periphery of the specified pixel. This is effective, in particular, in the case of performing the interpolation process simultaneously.

Referring to FIG. 24, the processor 103 comprises a processing table ROM 401 for performing the interpolation and smoothing process, two delay type flip-flops D101 and D102 each delaying inputted image data by one dot, two FIFO memories DM11 and DM12 each delaying inputted image data by one main scanning line or delaying them by one dot in the subscan direction, and a selector SE30 for selectively outputting inputted image data of 4 bits, sequentially. It is to be noted that each of the circuits except for the ROM 401 is provided for electrically generating pixel data of 4 bits from pixel data of one dot.

The pixel data of 9 bits within the window W3 and the broken line detection signal are inputted to address terminals of the table ROM 401. Based on the inputted pixel data of 9 bits and the inputted broken line detection signal, the ROM 401 performs the interpolation and smoothing process as described in detail later, and then, outputs the processed pixel data of 4 bits from data terminal of the ROM 401. The LSB of one bit of the processed pixel data are directly to a first input terminal of the selector SE30. Further, the second bit from the LSB of the processed data are inputted through the flip-flop D101 to a second input terminal of the selector SE30. Furthermore, the third bit from the LSB of the processed data are input through the FIFO memory DM11 to a third input terminal of the selector SE30. The MSB of one bit of the processed data are inputted through the FIFO memory DM12 and the flip-flop D102 to a fourth input terminal of the selector SE30.

The processor 103 performs not only the interpolation process with an interpolation magnification coefficient in the main scan direction of two and with an interpolation magnification coefficient in the subscan direction of two but also the following interpolation process. For example, when image data within the window W3 to be processed are image data shown in (a) of FIG. 67 which include a specified pixel * of a black pixel on a boundary line of a notched portion between the black pixels and the white pixels, the processor 103 converts them into image data shown in (b) of FIG. 67 which include black pixels of three dots composed of the top right dot, the bottom right dot and the bottom left dot among four dots obtained by dividing the center specified pixel * of the black pixel into four dots. Further, when image data to be processed are image data shown in (a) of FIG. 68 which include a projection portion located at the specified pixel *, the processor 103 performs the interpolation and smoothing process by removing the projection portion located at the specified pixel * as shown in (b) of FIG. 68.

The above-mentioned broken line detection signal is used for a process for processing an isolated point shown in (a) of FIG. 69. The isolated point is unnecessary in binary image data, generally. However, when it is a portion of a broken line, it is necessary to make the isolated point remain therein. Therefore, in the case of not a broken line or when the broken line having the low level is inputted, the processor 103 of the present preferred embodiment removes the isolated point as shown in (b) of FIG. 69. On the other hand, in the case of a broken line or when the broken line detection signal having the high level is inputted, the processor 103 makes the isolated point remain therein as shown in (c) of FIG. 69. The contents of these processes with the isolated point are previously included in the table ROM 401.

In the first preferred embodiment, there is provided the half-tone data interpolation section 104. However, the present invention is not limited to this, and the half-tone interpolation section 104 is not provided depending on the resolution of the image which the laser printer 70 records or prints out.

In the first preferred embodiment, the third calculation section 102c of the image area judgment section 102 judges the image area based on the average value of the data of the non-half-tone judgment values of 8 bits in a forward direction of the main scan direction including the specified pixel. The present invention is not limited to this. The image area may be judged based on the average value of the data of the non-half-tone judgment values of the forward bit and the backward bit in the subscan direction from the specified pixel, or may be judged based on the average value of the data of the non-half-tone judgment values of the forward bit and the backward bit in the main scan direction from the specified pixel and the forward bit and the backward bit in the subscan direction from the specified pixel.

Second Preferred Embodiment

Figure 4:
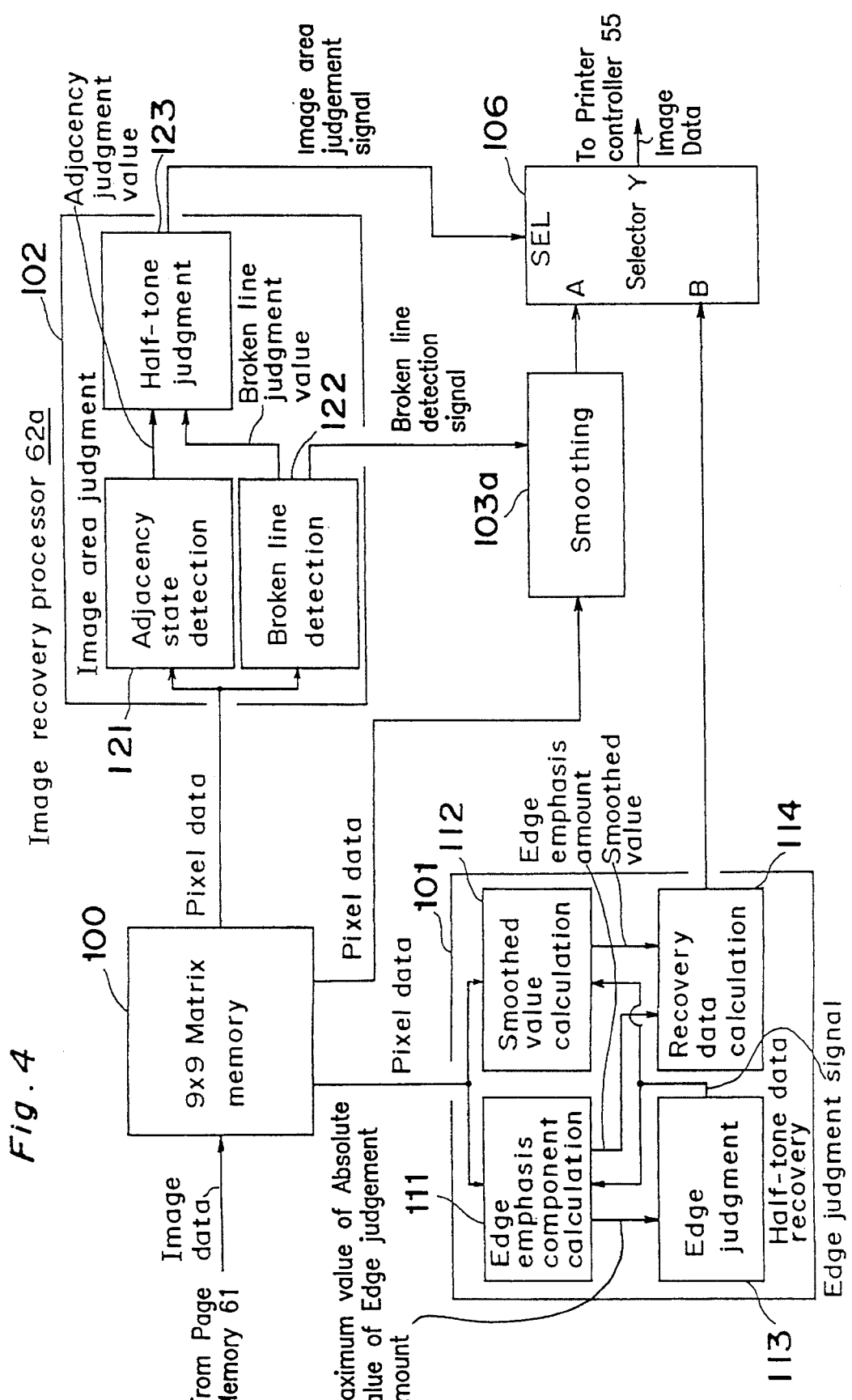
FIG. 4 is a schematic block diagram showing an image recovery processor of a second preferred embodiment.

A facsimile apparatus of the second preferred embodiment according to the present invention is characterized in, as compared with that of the first preferred embodiment, comprising a multi-value laser printer 70, and an image recovery processor 62a shown in FIG. 4 accompanying this.

Referring to FIG. 4, the image recovery processor 62a comprises the 9×9 matrix memory 100, the half-tone data recovery section 101, the image judgment section 102 and the selector 106 each having the same circuit as that of the first preferred embodiment, and further comprises, instead of the interpolation and smoothing processor 103, a smoothing processor 103a for performing only a smoothing process and outputting multi-value image data for representing white pixel or black pixel.

In the image recovery processor 62a constituted as described above, the smoothing processor 103a performs the smoothing process for the pixel data outputted from the 9×9 matrix memory 100, and then, the processed data are inputted to the input terminal A of the selector 106. The recovered multi-value half-tone image data outputted from the recovery data calculation section 114 provided within the half-tone data recovery section 101 are directly inputted to the input terminal B of the selector 106. Thereafter, in a manner similar to that of the first preferred embodiment, when the image area judgment signal has the high level or in the case of the non-half-tone area, the multi-value image data for representing white pixel or black pixel outputted from the smoothing processor 106 are selected by the selector 106, and then, are outputted to the printer controller 55. On the other hand, when the image area judgment signal has the low level or in the case of the half-tone area, the recovered multi-value image data outputted from the half-tone data recovery section 101 are selected by the selector 106, and then, are outputted to the printer controller 55.

Figure 25:
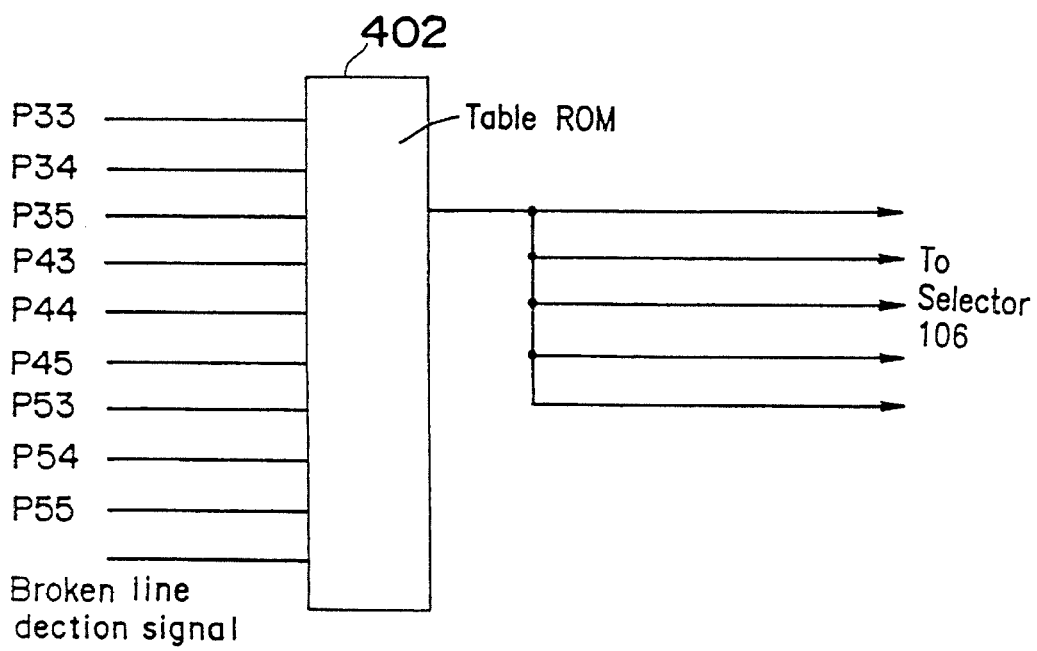
FIG. 25 is a schematic block diagram showing a smoothing processor shown in FIG. 4.

FIG. 25 shows the smoothing processor 103a, which comprises a table ROM 402 for storing the contents of the above-mentioned smoothing process.

Referring to FIG. 25, the pixel data of 9 bits within the window W3 and the broken line detection signal are inputted to the address terminals of the table ROM 402. Based on the inputted pixel data of 9 bits and the inputted broken detection signal, the ROM 402 performs the predetermined smoothing process, and then, outputs the processed image data of 1 bit of white pixel or black pixel from the data terminal thereof. Thereafter, the image data outputted from the ROM 401 are divided into multi-value image data of 5 bits. Namely, when image data of "zero" are outputted from the ROM 401, multi-value image data "00000" of 5 bits for representing white pixel are outputted. On the other hand, when image data of "zero" are outputted from the ROM 401, multi-value image data "11111" of 5 bits for representing black pixel are outputted. It is to be noted that the process of the ROM 402 includes the process for processing the isolated point similar to that of the first preferred embodiment.

Other Preferred Embodiment

In the above preferred embodiments, the facsimile apparatuses are described above. However, the present invention is not limited to this. The present invention can be applied to a filing apparatus, a printer controller, an electronic sorter, or the like, wherein the electronic sorter stores image data composed of a plurality pieces of document images and sorts them. When the recovery technique according to the present invention is used, image data can be stored in a format of binary image data, and the stored image data can be outputted in a format of multi-value image data. Further, there can be connected as an output apparatus to a high resolution display unit, a display unit of multi-gradation stages or the like.

Further, in the present preferred embodiment, image data of single color are described above. However, the present invention is not limited to this, and the present invention can be applied to image data of a plurality of colors. For example, the present invention can be applied to a recovery process for recovering binary image data of three colors of Red, Green and Blue or for recovering binary image data of only one or two colors.

Furthermore, in the present preferred embodiment, multi-value image data are recovered from binary image data. However, the present invention is not limited to this, and can be applied to a recovery process for recovering image data of a natural number M-value from image data of a natural number N-value (N<M). Namely, the processes of the image recovery processors 62 and 62a can be applied to this recovery process as they are. In the image area judgment section 102, after binarizing the N-value image data, the above-mentioned process can be performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus for recovering multi-value image data from inputted binary image data, comprising:

means for receiving binary image data, some of which binary image data has been binarized by a pseudo half-tone binarizing method and a remainder of which binary image data has been binarized by a non-half-tone binarizing method using a predetermined threshold value;

calculation means for calculating a number of adjacencies representing an adjacency state of the same kind of pixels located within a block area comprised of a plurality of pixels including a specified pixel to be processed; and judgement means for judging whether each specified pixel of said inputted binary image data is included in a first area corresponding to the some data or a second area corresponding to the remainder data, based on the number of adjacencies calculated by said calculation means.

2. The apparatus as claimed in claim 1, wherein said calculation means calculates a number of first adjacencies with which the same kind of pixels located within the block area are adjacent to each other both in a main scan direction and in a subscan direction perpendicular to the main scan direction; and said judgment means judges whether each pixel thereof is included in said first area or said second area based on said number of first adjacencies calculated by said calculation means.

3. The apparatus as claimed in claim 2, further comprising counting means for counting a number of the same kind of pixels located within the block area;

wherein said calculation means further calculates a number of second adjacencies with which the same kind of pixels located within the block area are adjacent to each other in respective oblique directions inclined from the main scan and subscan directions; and said judgment means judges whether each pixel thereof is included in said first area or said second area based on the number of first adjacencies calculated by said calculation means when the number of the same kind of pixels counted by said counting means is larger than a first predetermined threshold value, while said judgment means judges whether each pixel thereof is included in said first area or said second area based on the numbers of first and second adjacencies calculated by said calculation means when the number of the same kind of pixels counted by said counting means is equal to or smaller than the first predetermined threshold value.

4. The apparatus as claimed in claim 3, wherein said respective oblique directions include a first oblique direction and a second oblique direction different from said first oblique direction, and the number of second adjacencies is an absolute value of a difference between a number of adjacencies with which the same kind of pixels located within the block area are adjacent to each other in said first oblique direction and a number of adjacencies with which the same kind of pixels located within the block area are adjacent to each other in said second oblique direction.

5. The apparatus as claimed in claim 1, wherein said judgment means calculates area judgment data with respect to respective pixels within an area including said specified pixel and pixels located in the periphery of said specified pixel, and judges whether each pixel thereof is included in said first area or said second area based on a plurality of calculated area judgment data corresponding to said plurality of pixels.

6. The apparatus as claimed in claim 5, wherein said area judgment data are multi-value image data.

7. The apparatus as claimed in claim 1, wherein the number of adjacencies represents an adjacency state of those pixels which are of a lesser quantity within the block area being examined.

8. The apparatus as claimed in claim 1, further comprising processing means for recovering multi-value image data from image data of respective pixels located within said second area judged by said judgment means.

9. An image processing apparatus for recovering multi-value image data from inputted binary image data, comprising:

means for receiving binary image data, some of which binary image data has been binarized by a pseudo half-tone binarizing method and a remainder of which binary image data has been binarized by a non-half-tone binarizing method using a predetermined threshold value;

calculation means for calculating a number of adjacencies for representing an adjacency state of the same kind of pixels located within a block area comprised of a plurality of pixels including a specified pixel to be processed;

detecting means for detecting a broken line within the block area based on said inputted binary image data, and outputting a broken line detection signal when detecting said broken line; and judgment means for judging whether each pixel of said inputted binary image data is included in a first area corresponding to the some data or a second area corresponding to the remainder data, based on the number of adjacencies calculated by said calculation means, and for judging that each pixel thereof is included in said second area independent of said judgment result based on the number of calculated adjacencies when said broken line detection signal is outputted from said detection means.

10. The apparatus as claimed in claim 9, wherein the number of adjacencies represents an adjacency state of those pixels which are of a lesser quantity within the block area being examined.

11. The image processing apparatus as claimed in claim 2, further comprising:

recovery means for recovering image data of multi-gradation stages from said inputted binary image data when it is judged by said judgment means that said specified pixel is included in said first area, and for outputting said inputted binary image data without recovering them when it is judged by said judgement means that said specified pixel is included in said second area.

12. The apparatus as claimed in claim 11, further comprising binarizing means for binarizing said image data of multi-gradation stages recovered by said recovery means by a predetermined pseudo half-tone binarizing method when it is judged by said judgement means that each pixel of said inputted binary image data is included in said first area.

13. The apparatus as claimed in claim 12, further comprising conversion means provided between said recovery means and said binarizing means, said conversion means converting said image data of multi-gradation stages recovered by said recovery means into image data having a higher pixel density and outputting the converted image data to said binarizing means by performing a predetermined interpolation process.

14. The apparatus as claimed in claim 11, further comprising processing means for performing a predetermined image processing process for said inputted image data without recovering said inputted binary image data when it is judged by said judgment means that each pixel of said inputted binary image data is included in said second area.

* * * * *